United States Patent [19]

Tochigi

[11] Patent Number: 5,530,592
[45] Date of Patent: Jun. 25, 1996

[54] ZOOM LENS OF REAR FOCUS TYPE

[75] Inventor: Nobuyuki Tochigi, Kanagawa-ken, Japan

[73] Assignee: Canon Kabushiki Kaisha, Tokyo, Japan

[21] Appl. No.: 231,177

[22] Filed: Apr. 22, 1994

[30] Foreign Application Priority Data

Apr. 30, 1993 [JP] Japan ............................ 5-128209
Apr. 30, 1993 [JP] Japan ............................ 5-128211
May 26, 1993 [JP] Japan ............................ 5-148489

[51] Int. Cl.$^6$ .................................................. G02B 15/14
[52] U.S. Cl. ............................................ 359/687; 359/684
[58] Field of Search ..................................... 359/687, 684

[56] References Cited

U.S. PATENT DOCUMENTS 5,341,243  8/1994  Okuyama et al. .................. 359/687

FOREIGN PATENT DOCUMENTS

| 57-111507 | 7/1982 | Japan . |
| 58-136012 | 8/1983 | Japan . |
| 58-160913 | 9/1983 | Japan . |
| 62-24213 | 2/1987 | Japan . |
| 63-44614 | 2/1988 | Japan . |
| 63-247316 | 10/1988 | Japan . |
| 63-278013 | 11/1988 | Japan . |
| 3158813 | 7/1991 | Japan . |
| 3200113 | 9/1991 | Japan . |
| 3215810 | 9/1991 | Japan . |

Primary Examiner—David C. Nelms
Assistant Examiner—Andrew Q. Tran
Attorney, Agent, or Firm—Fitzpatrick, Cella, Harper & Scinto

[57] ABSTRACT

A zoom lens is disclosed comprising, from front to rear, a first lens unit of positive refractive power, a second lens unit of negative refractive power, a third lens unit of positive refractive power and a fourth lens unit of positive refractive power, wherein the back focal distance is made long by giving proper ranges for the refractive powers of the lens units and with the use of a technical idea on the zooming and focusing movements of the lens units.

6 Claims, 25 Drawing Sheets

ZOOM LENS OF REAR FOCUS TYPE

BACKGROUND OF THE INVENTION

1. Field of the Invention

This invention relates to zoom lenses of the rear focus type and, more particularly, to large relative aperture, high range zoom lenses of the rear focus type whose zoom ratio is 8 to 12 and F-number is 1.6 to 2 with a long back focal distance for use in photographic cameras, video cameras, or broadcasting cameras.

2. Description of the Related Art

For the zoom lenses in a photographic camera or a video camera, there have been previous proposals for focusing by moving other than the front or first lens unit. The so-called rear focus type has thus found its use in a variety of zoom lenses.

As compared with the zoom lens of the type in which focusing is performed by moving the first lens unit, the zoom lenses of the rear focus type generally have the advantages that the first lens unit gets a smaller effective diameter so as to facilitate minimization of the bulk and size of the entire lens system, and also that close-up photography, particularly photomacrography, becomes easy to do, and further that, since focusing movement is imparted to a lens unit of relatively small size and light weight, a smaller incentive suffices for driving it, making it possible to adjust the focus rapidly.

In application of such a rear focus type to the so-called 4-unit zoom lens, an example is shown in Japanese Laid-Open Patent Application No. Sho 63-44614 where a zoom lens comprises, from front to rear, a first lens unit of positive refractive power, a second lens unit of negative refractive power for varying the focal length, a third lens unit of negative refractive power for compensating for the image shift with zooming and a fourth lens unit of positive refractive power, totaling four lens units, whereby the third lens unit is used for focusing. However, this zoom lens has to secure a space in which the third lens unit moves. So, there is a tendency to increase the physical length.

In Japanese Laid-Open Patent Application No. Sho 58-136012, the zooming section is constructed with three or more lens units, one of which is moved for focusing purposes.

In Japanese Laid-Open Patent Applications Nos. Sho 63-247316 and Sho 62-24213, a first lens unit of positive refractive power, a second lens unit of negative refractive power, a third lens unit of positive refractive power and a fourth lens unit of positive refractive power are arranged in this order from the object side, wherein the second lens unit is moved to vary the focal length and the fourth lens unit is moved to compensate for the image shift with zooming, whereby focusing is performed by moving the fourth lens unit.

In Japanese Laid-Open Patent Application No. Sho 58-160913, a first lens unit of positive refractive power, a second lens unit of negative refractive power, a third lens unit of positive refractive power and a fourth lens unit of positive refractive power are arranged in this order from the object side, wherein the first and second lens units are moved to vary the focal length, while simultaneously moving the fourth lens unit to compensate for the image shift. Of these lens units, one or two or more lens units are moved for focusing purposes.

In Japanese Laid-Open Patent Application No. Sho 63-278013, a first lens unit of positive refractive power, a second lens unit of negative refractive power, a third lens unit of negative refractive power and a fourth lens unit of positive refractive power are arranged in this order from the object side, wherein the second lens unit is moved to vary the focal length and the fourth lens unit is moved to compensate for the image shift with zooming and also to effect focusing.

Another form of the 4-unit zoom lens is proposed in Japanese Laid-Open Patent Application No. Sho 57-111507, comprising, from front to rear, a first lens unit of positive refractive power which is stationary during zooming and movable for focusing, a second lens unit of negative refractive power and a third lens unit of positive refractive power, wherein the second and third lens units move in opposite directions to each other during zooming, whereby the third lens unit has two positive lens units arranged to move in differential relation to each other. With such a 4-unit zoom lens of plus-minus-plus-plus refractive power arrangement, according to this document, location of an aperture stop is made within the third lens unit.

Since, in this configuration, however, the second and third lens units move always in opposite directions, there is need to make wider room for the separation between the second and third lens units at the wide-angle end. Also, since the stop lies within the third lens unit, as this implies that at the wide-angle end, the position of the entrance pupil is nearest to the image side, such a zoom lens is not suited to a use for minimizing the diameter of the front lens members and the size of the entire lens system.

Then, because focusing is performed by the first lens unit, the diameter of the front lens members must be increased in order to admit a light beam going to the corners of the image frame at the minimum object distance. If attempts are made to minimize the bulk and size by adapting this zooming configuration to the rear focus type, however, a problem arises in that the refractive power arrangement is not found optimum, or the variation of aberrations with focusing is not corrected sufficiently well, as the rear focus type is used.

Also, even in Japanese Laid-Open Patent Application No. Hei 3-200113, a zoom lens of similar form is shown comprising, from front to rear, a positive first lens unit which is stationary during zooming, a negative second lens unit which moves back and forth to vary the focal length from one end to another, a positive third lens unit which moves in associative relation to the movement of the second lens unit, and a positive fourth lens unit which moves in part or in whole to compensate for the shift of the image plane with zooming.

According to this document, what is meant by the associative movement of the positive third lens unit with the movement of the second lens unit is done in order to reduce that amount of compensation for the image shift which is required for the fourth lens unit, in other words, to let the third lens unit share part of the compensating function. Concretely speaking, it is taken as desired that, when zooming in a region of from a middle focal length position to the telephoto end, the third lens unit moves from the image side to the object side.

With this arrangement, however, because the second and third lens units move in opposite directions, there is need to make wider room for the separation between the second and third lens units at the wide-angle end. As this implies that at the wide-angle end, the entrance pupil takes its place nearest to the image plane, there is a difficult problem of minimizing the diameter of the front lens member and the size of the entire lens system.

Again, Japanese Laid-Open Patent Application No. Hei 3-158813, too, discloses a similar zoom lens as comprising, from front to rear, a positive first lens unit, a negative second lens unit, a positive third lens unit and a positive fourth lens unit, the second and third lens units being axially moved to vary the focal length, and the aperture stop being moved in unison with the third lens unit.

According to this document, during zooming from the wide-angle end to the telephoto end, the separation between the second and third lens units decreases. The third lens unit carrying the aperture stop also takes the rearmost possible position when in the wide-angle end. So, that neighborhood of the third lens unit which contains the stop approaches nearest to the image plane in the wide-angle end, or in a slightly zoomed position therefrom, where the front lens members necessarily have a largest diameter. As this means that the entrance pupil goes up deep, a disadvantage is produced at reducing the diameter of the front members. Moreover, distortion gets large in the wide-angle end. With this distortion removed for good optical performance, therefore, a problem arises in that it is very difficult to shorten the diameter of the front members and reduce the size of the entire lens system.

In another Japanese Laid-Open Patent Application No. Hei 3-215810, a zoom lens of the rear focus type is proposed comprising, from front to rear, a first lens unit of positive refractive power, a second lens unit of negative refractive power, a stop, a third lens unit of positive refractive power and a fourth lens unit of positive refractive power, totaling four lens units, wherein during zooming from the wide-angle end to the telephoto end, the second lens unit moves toward the image side, while simultaneously moving the stop, the third lens unit and the fourth lens unit independently of each other so that each depicts a locus convex toward the object side, and wherein focusing is performed by moving the fourth lens unit.

In general, the use of the rear focus type in zoom lenses gives the advantages that, as has been described before, the entire lens system is minimized in bulk and size, and rapid focusing can be carried out, and further close-up photography becomes easy to do.

For the counterpart, however, the variation of aberrations with focusing increases largely, giving rise to a problem in that it becomes very difficult to obtain high optical performance throughout the entire focusing range in such a manner that the bulk and size of the entire lens system are limited to a minimum.

At the present time, for the video camera for public use, the image sensor is in the form of a single chip. In this case, the color separation prism is not needed that is commonly used in the multiple chip type cameras for professional use. The zoom lens for the single chip type camera has a relatively short back focal distance.

In the case of the multiple chip type, the color separation prism and its associated parts are arranged behind the photographic lens (zoom lens). For this reason, the zoom lens for the multiple chip type camera necessitates a relatively long back focal distance compared with the zoom lens for the single chip type video camera for public use.

SUMMARY OF THE INVENTION

The present invention employs the rear focus type to make a good compromise between the requirements of increasing the aperture ratio and zoom ratio and of minimizing the bulk and size of the entire lens system. It is, therefore, an object of the invention to provide a zoom lens of the rear focus type which maintains good stability of optical performance throughout the entire zooming range and throughout the entire focusing range, and whose back focal distance is made as long as needed.

$\Delta S$: Sagittal Image Focus $\Delta M$: Meridional Image Focus d: Spectral d-line g: Spectral g-line

DETAILED DESCRIPTION OF THE PREFERRED EMBODIMENTS

Figure 1:
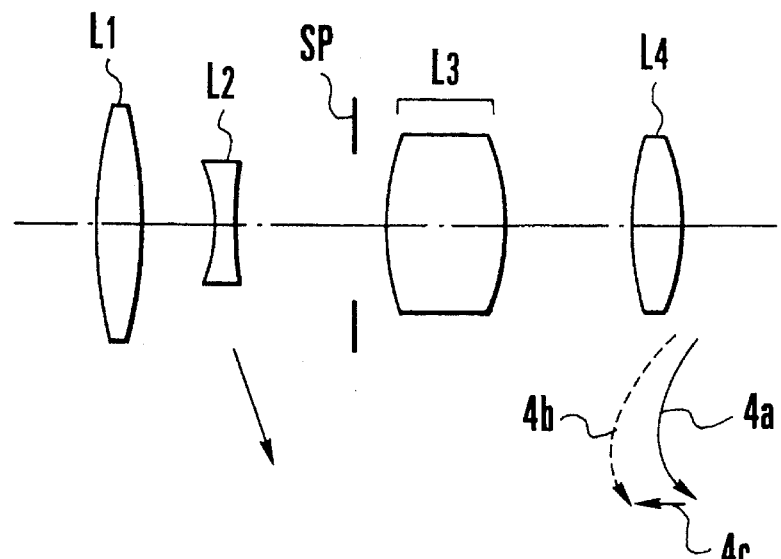
FIG. 1 is a diagram of the paraxial refractive power arrangement of a zoom lens according to the invent ion.
Figure 2:
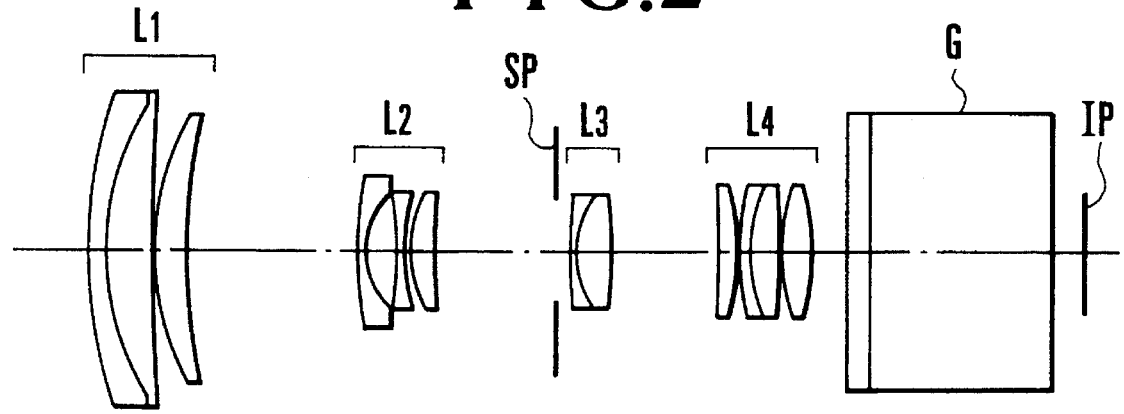
FIG. 2 is a longitudinal section view of a numerical example 1 of a zoom lens of the invention.
Figure 3:
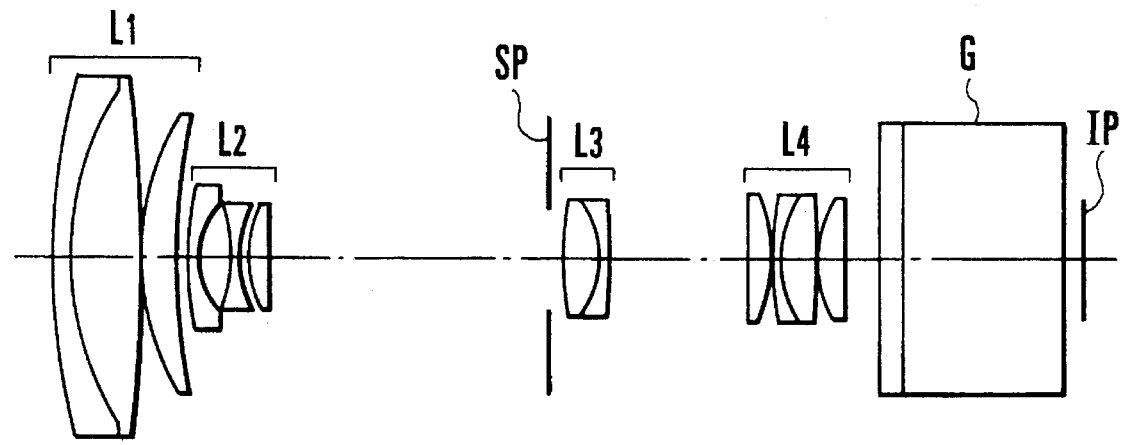
FIG. 3 is a longitudinal section view of a numerical example 2 of a zoom lens of the invention.
Figure 4:
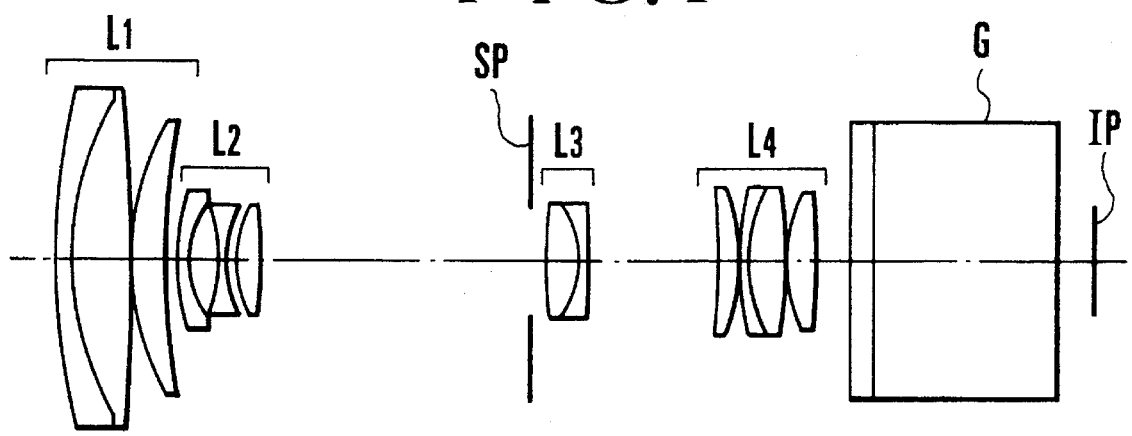
FIG. 4 is a longitudinal section view of a numerical example 3 of a zoom lens of the invention.
Figure 5:
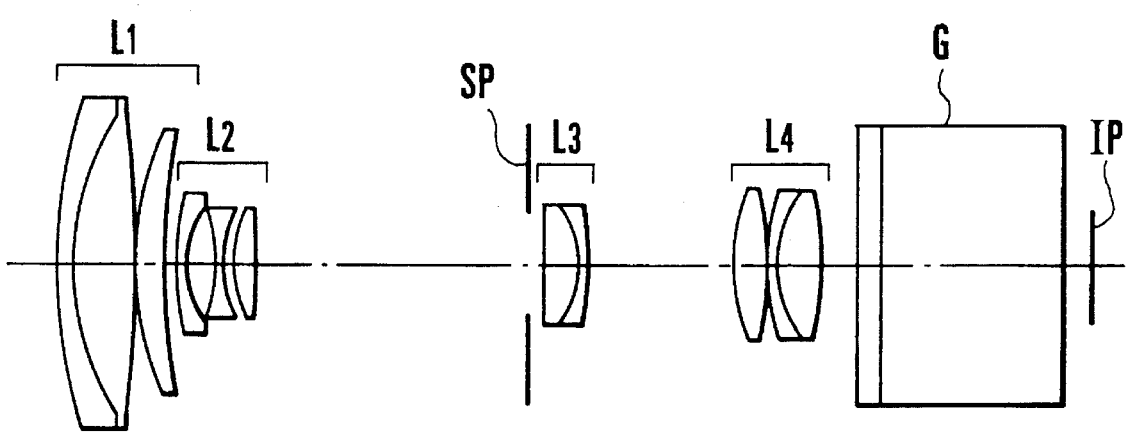
FIG. 5 is a longitudinal section view of a numerical example 4 of a zoom lens of the invention.
Figure 6:
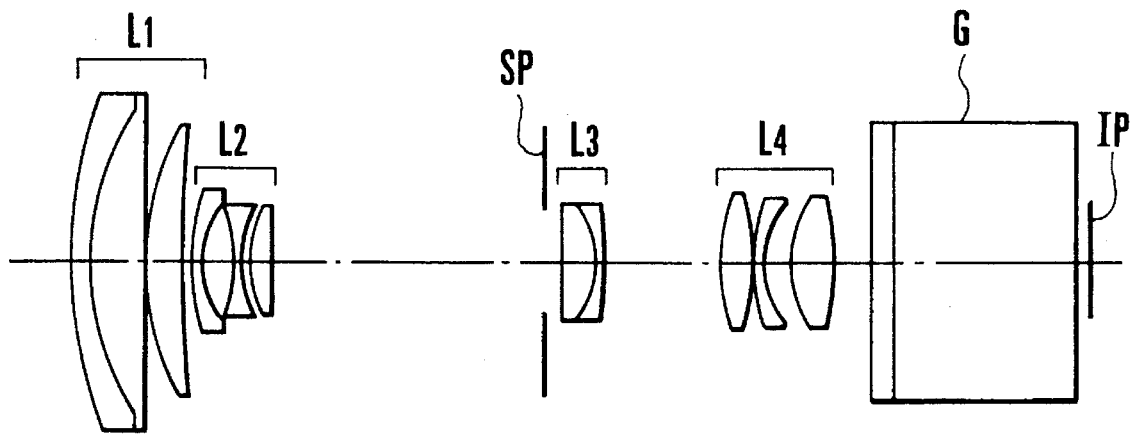
FIG. 6 is a longitudinal section view of a numerical example 5 of a zoom lens of the invention.
Figure 7:
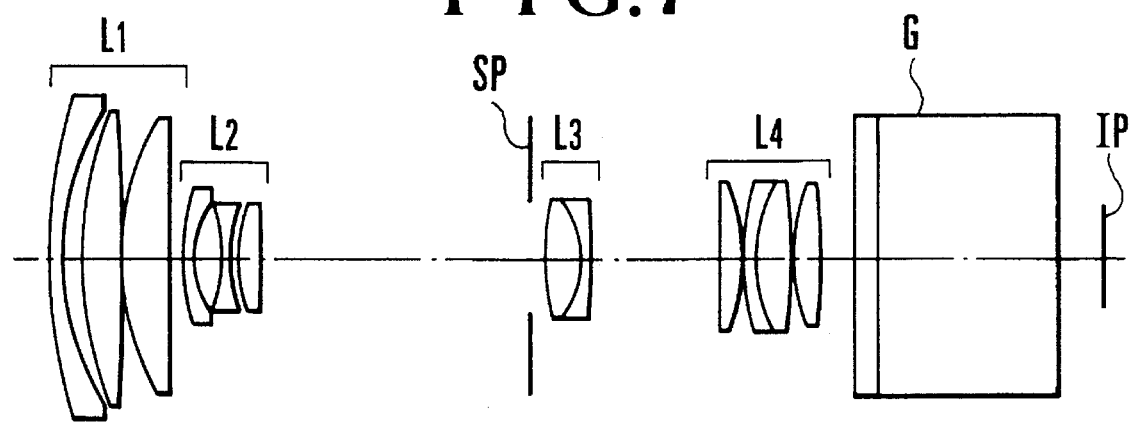
FIG. 7 is a longitudinal section view of a numerical example 6 of a zoom lens of the invention.
Figure 8:
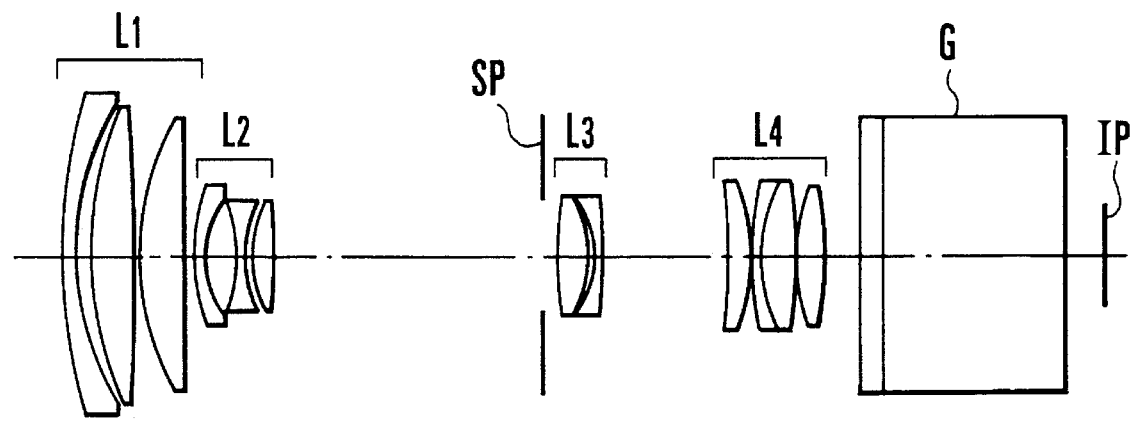
FIG. 8 is a longitudinal section view of a numerical example 7 of a zoom lens of the invention.
Figure 9:
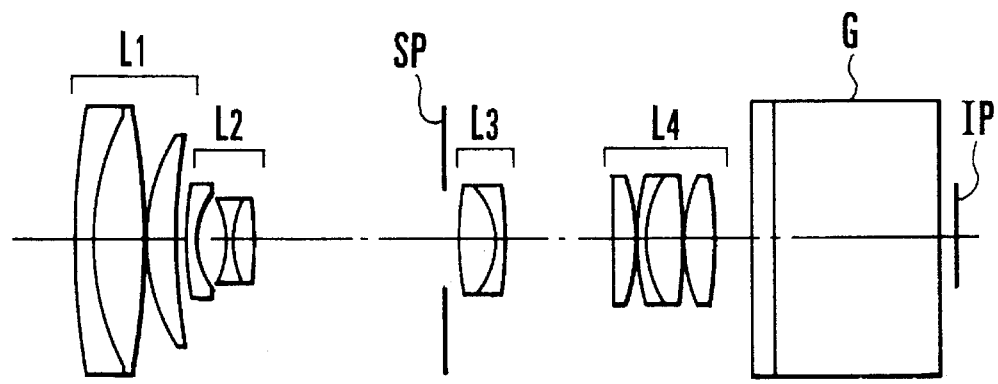
FIG. 9 is a longitudinal section view of a numerical example 8 of a zoom lens of the invention.
Figure 10A:
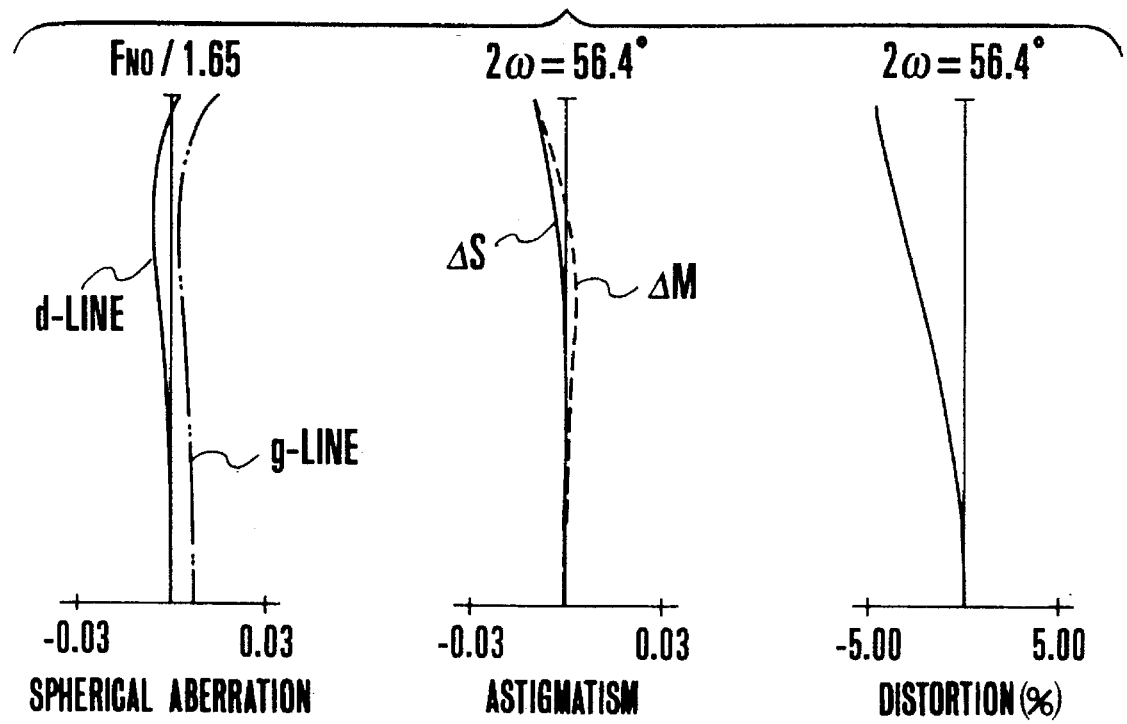
FIGS. 10(A) and 10(B) are graphic representations of the aberrations of the numerical example 1 of the zoom lens of the invention.
Figure 10B:
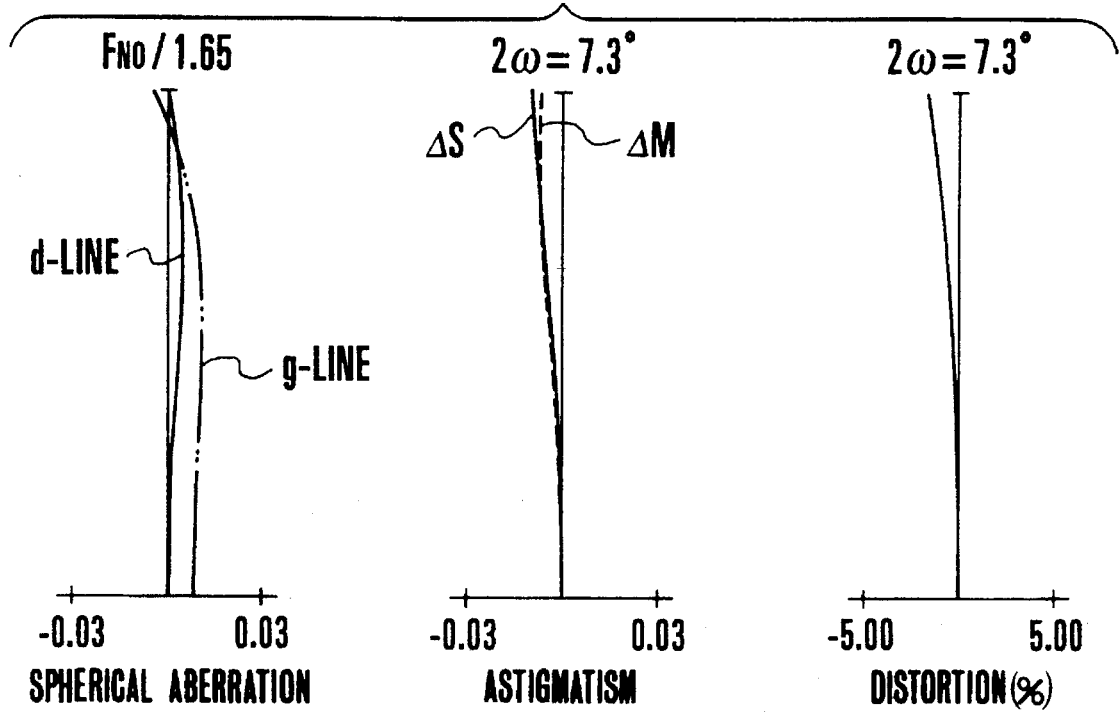
Figure 11A:
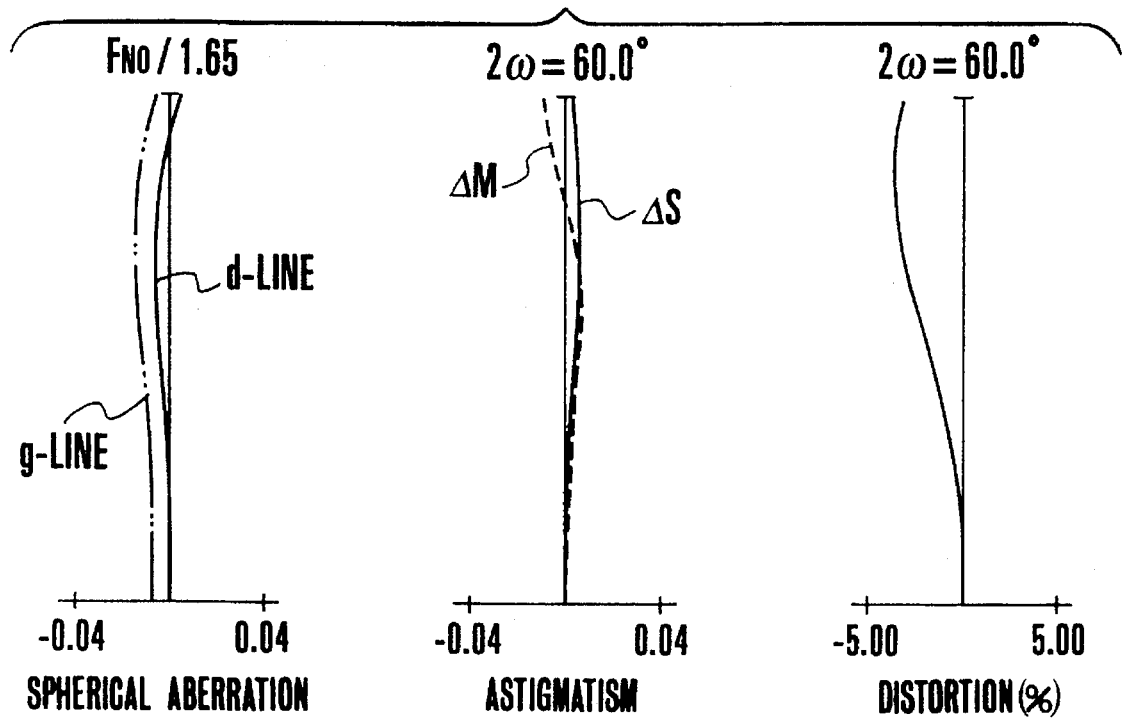
FIGS. 11(A) and 11(B) are graphic representations of the aberrations of the numerical example 2 of the zoom lens of the invention.
Figure 11B:
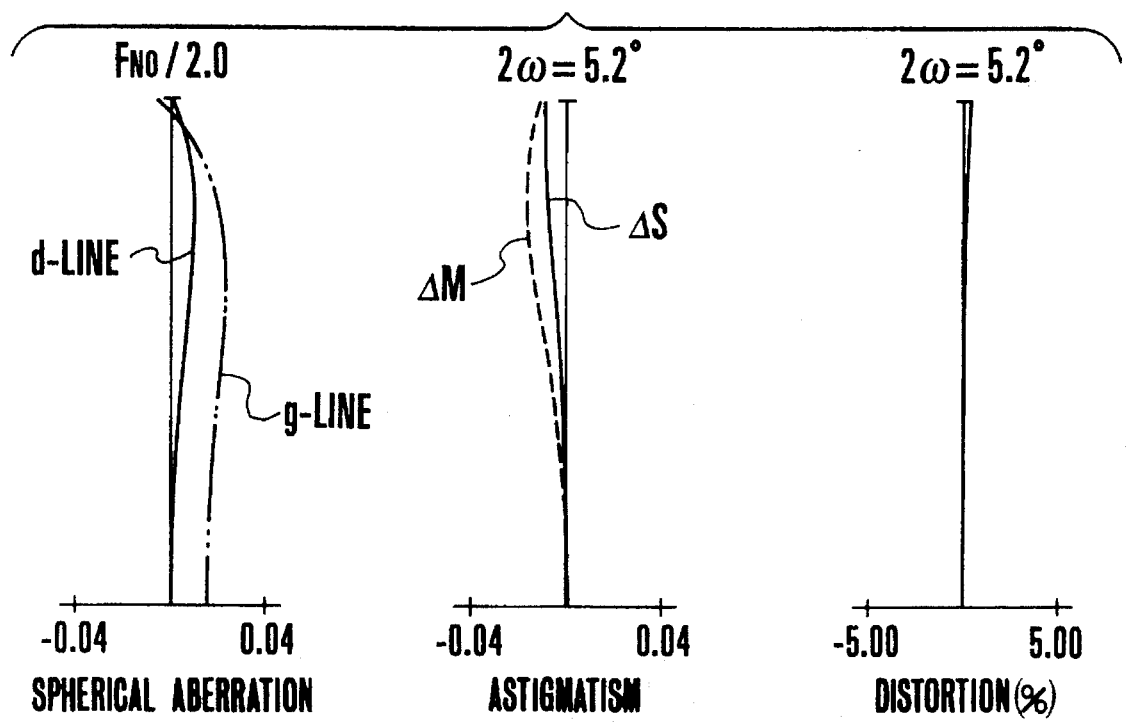
Figure 12A:
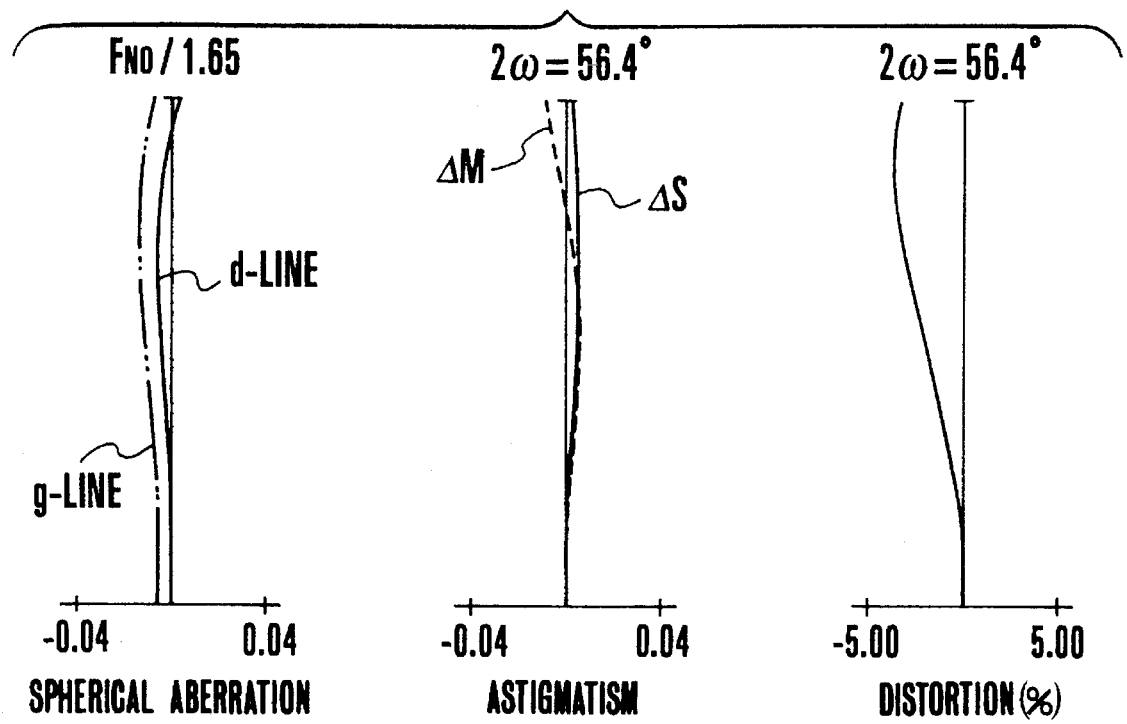
FIGS. 12(A) and 12(B) are graphic representations of the aberrations of the numerical example 3 of the zoom lens of the invention.
Figure 12B:
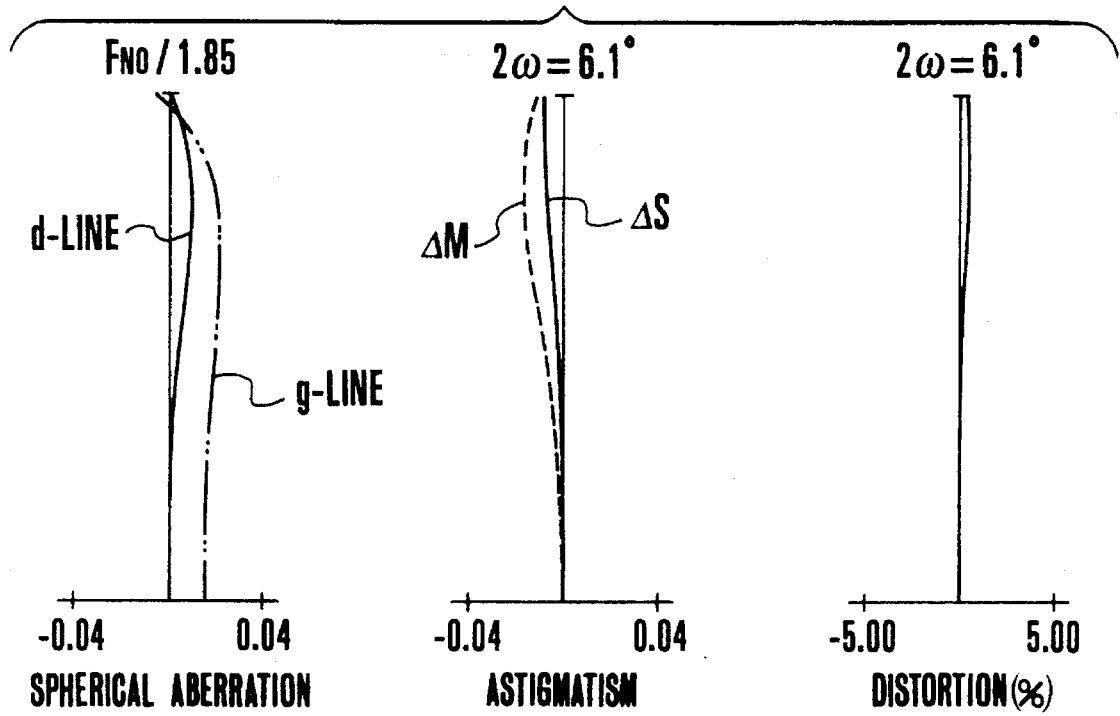
Figure 13A:
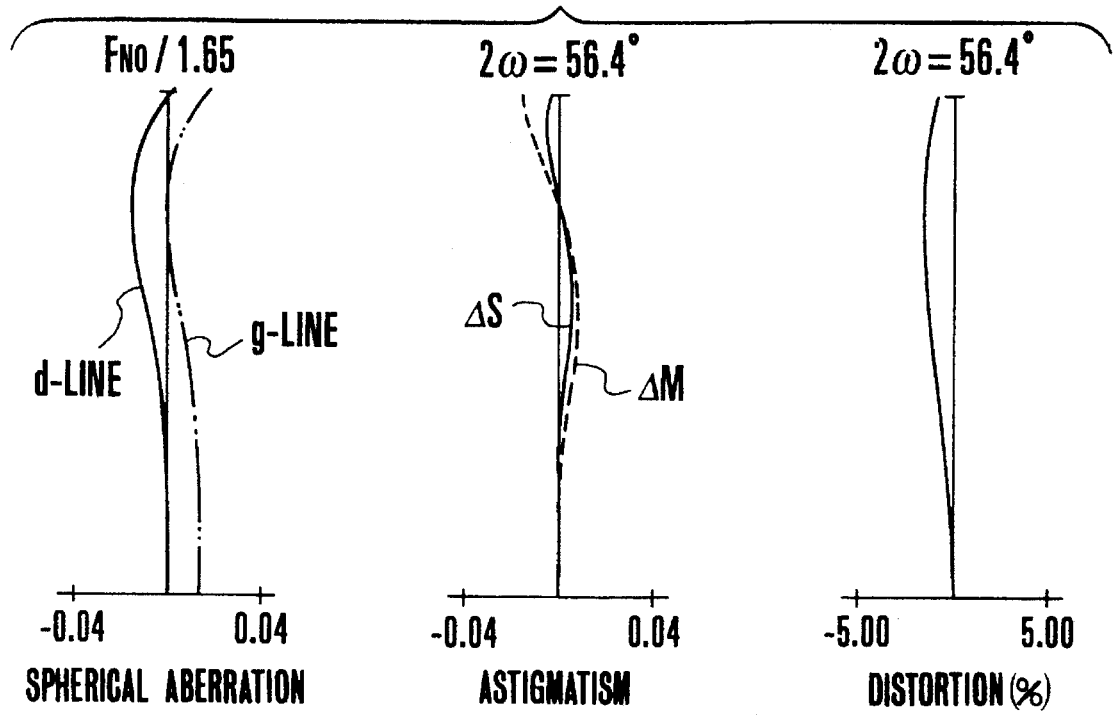
FIGS. 13 (A) and 13(B) are graphic representations of the aberrations of the numerical example 4 of the zoom lens of the invention.
Figure 13B:
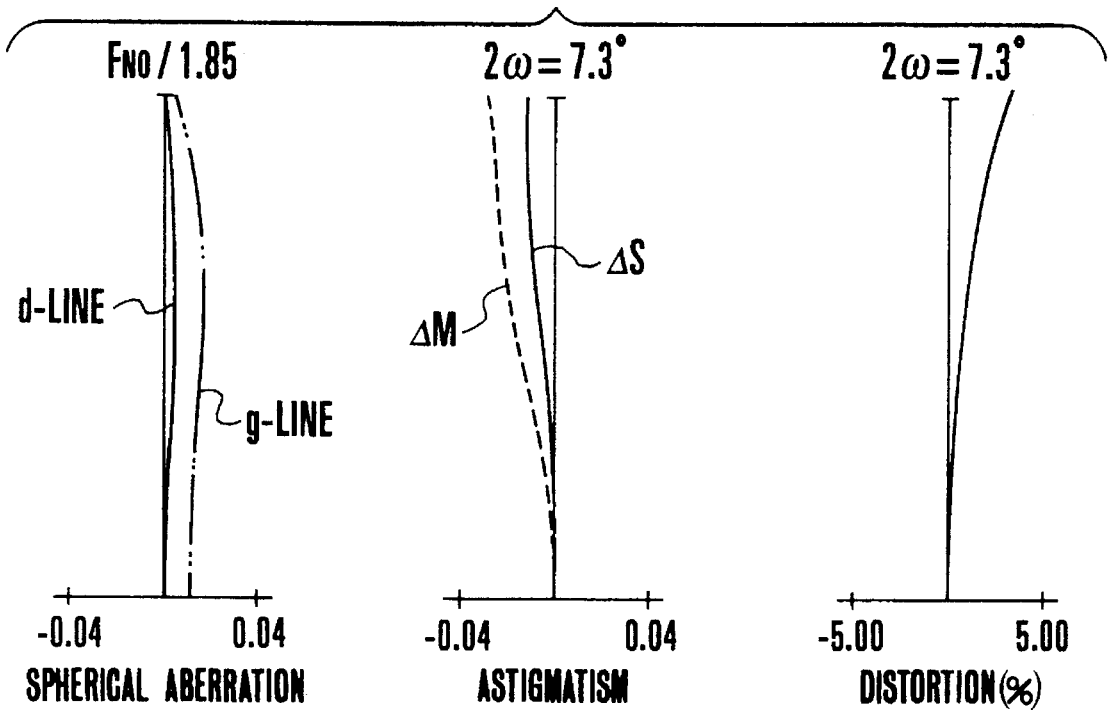
Figure 14A:
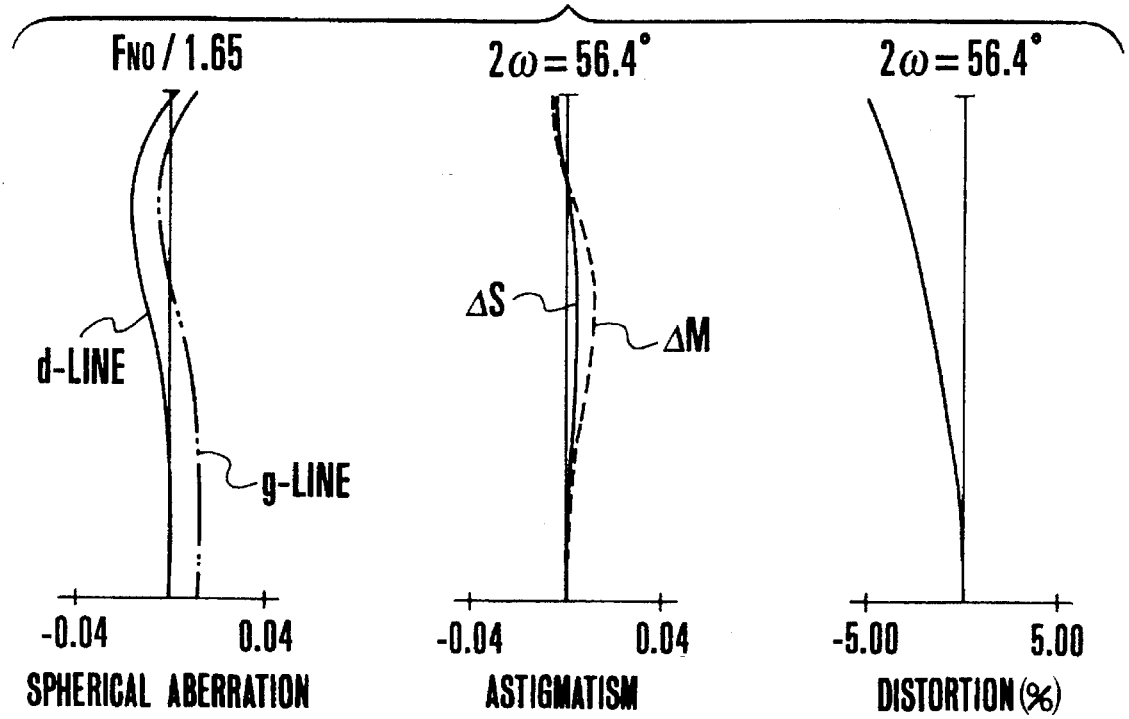
FIGS. 14(A) and 14(B) are graphic representations of the aberrations of the numerical example 5 of the zoom lens of the invention.
Figure 14B:
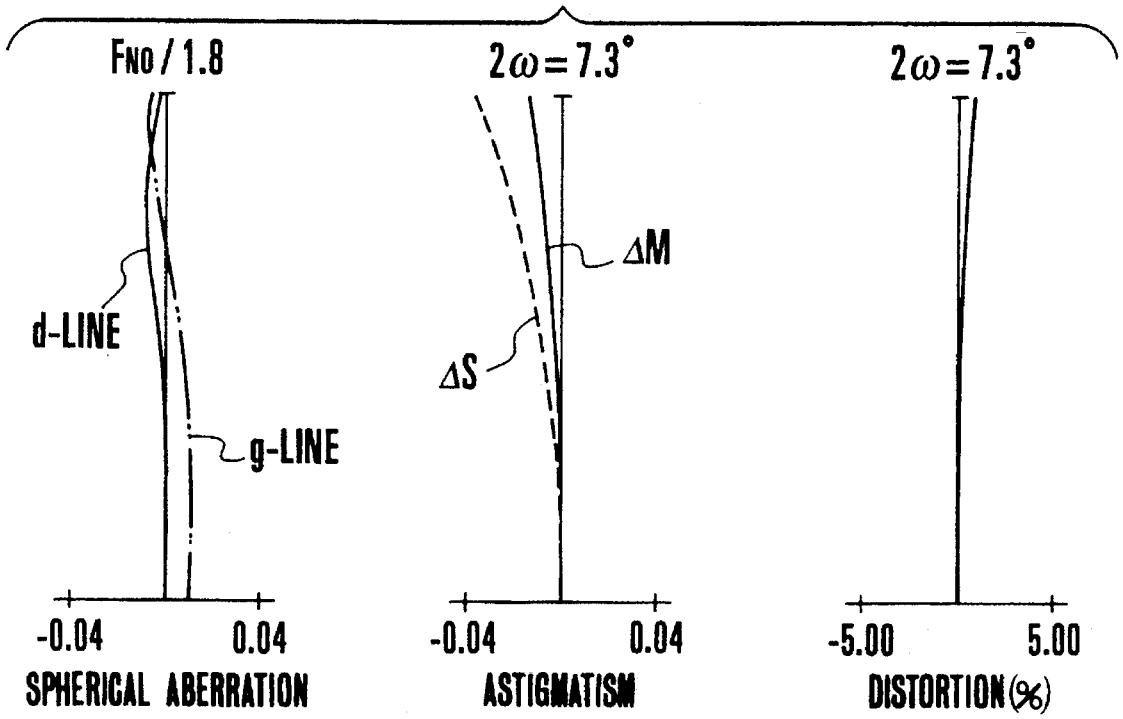
Figure 15A:
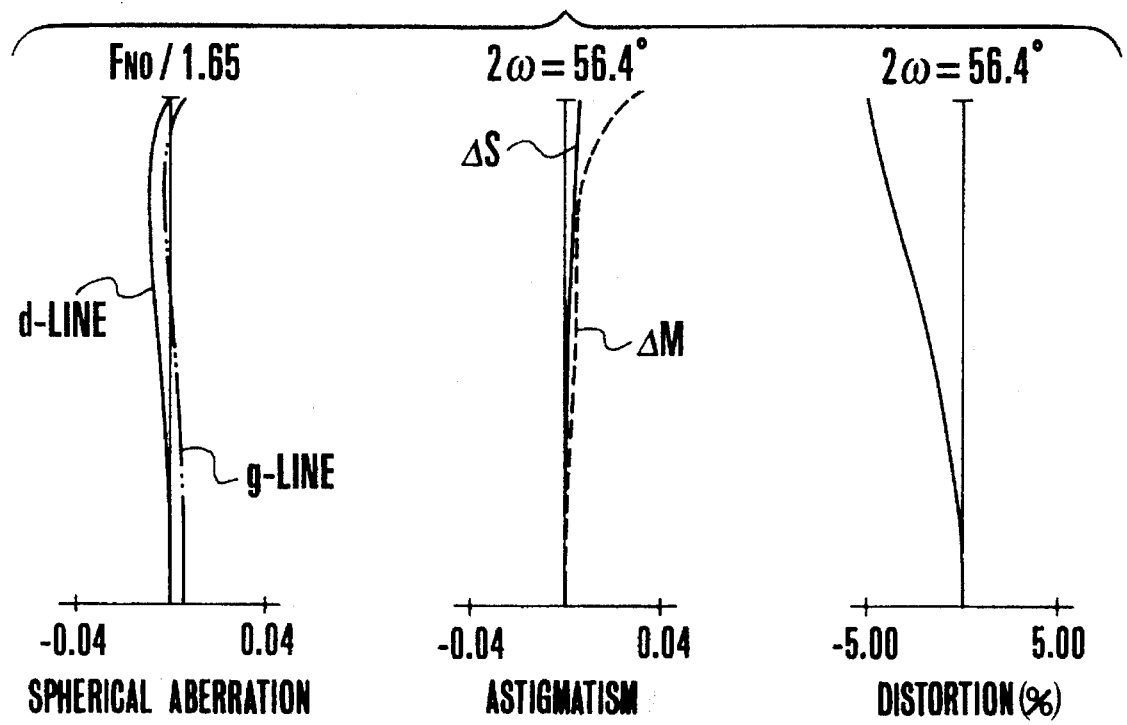
FIGS. 15(A) and 15(B) are graphic representations of the aberrations of the numerical example 6 of the zoom lens of the invention.
Figure 15B:
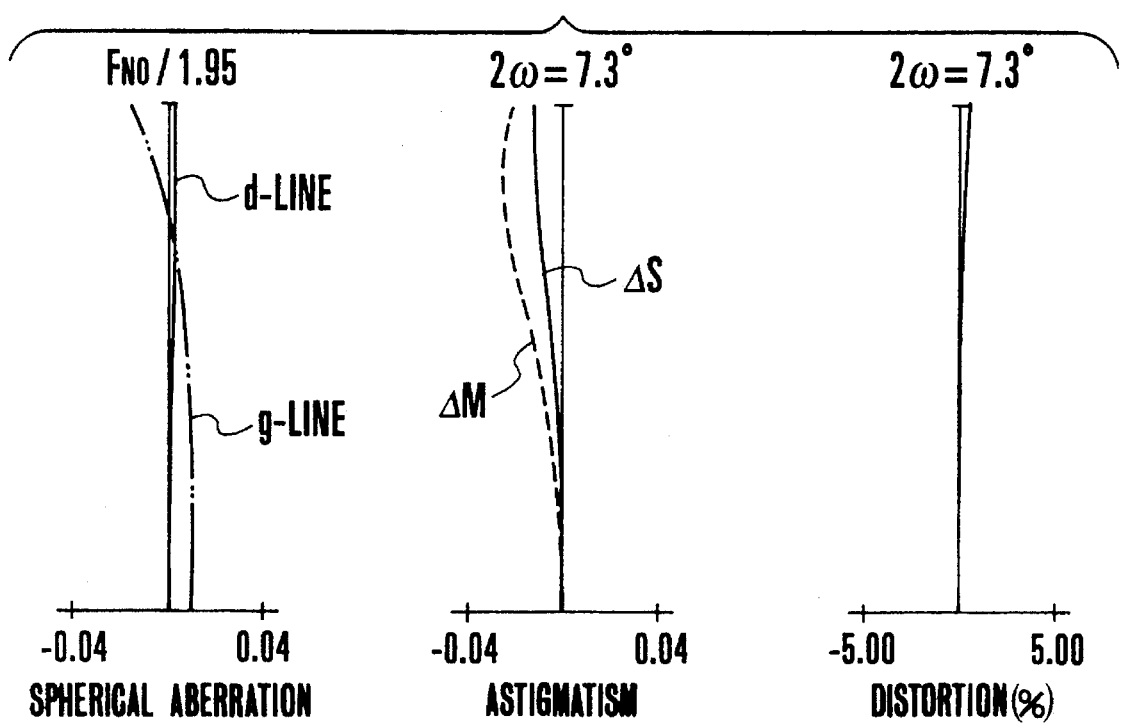
Figure 16A:
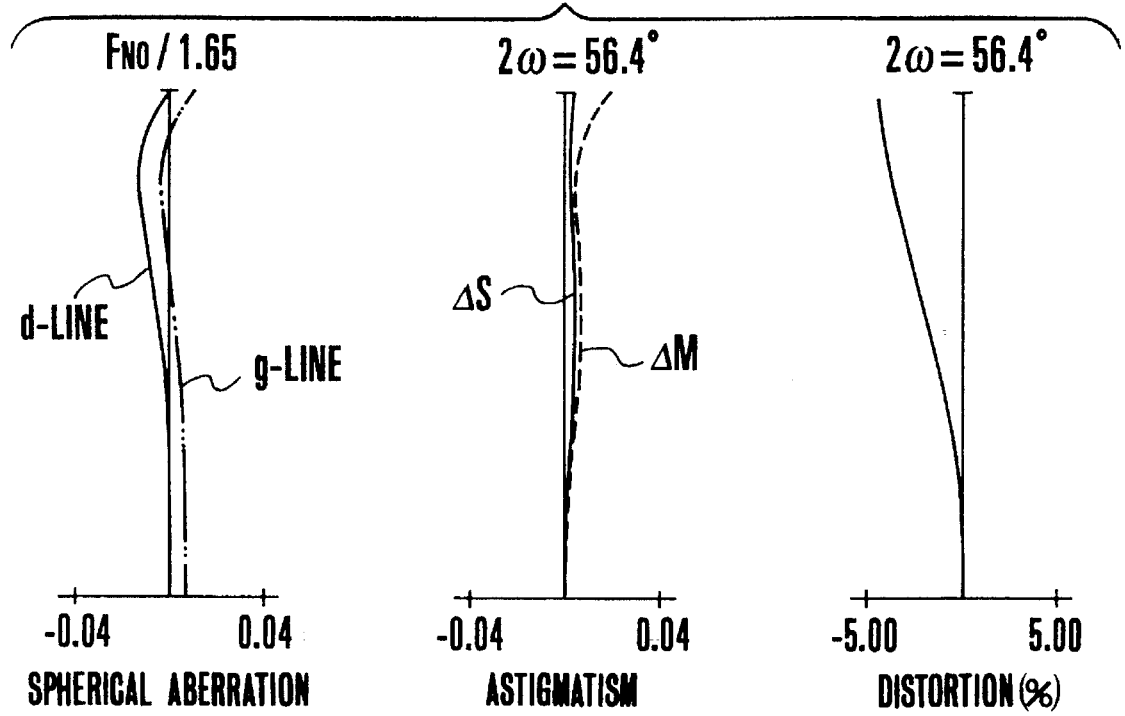
FIGS. 16(A) and 16(B) are graphic representations of the aberrations of the numerical example 7 of the zoom lens of the invention.
Figure 16B:
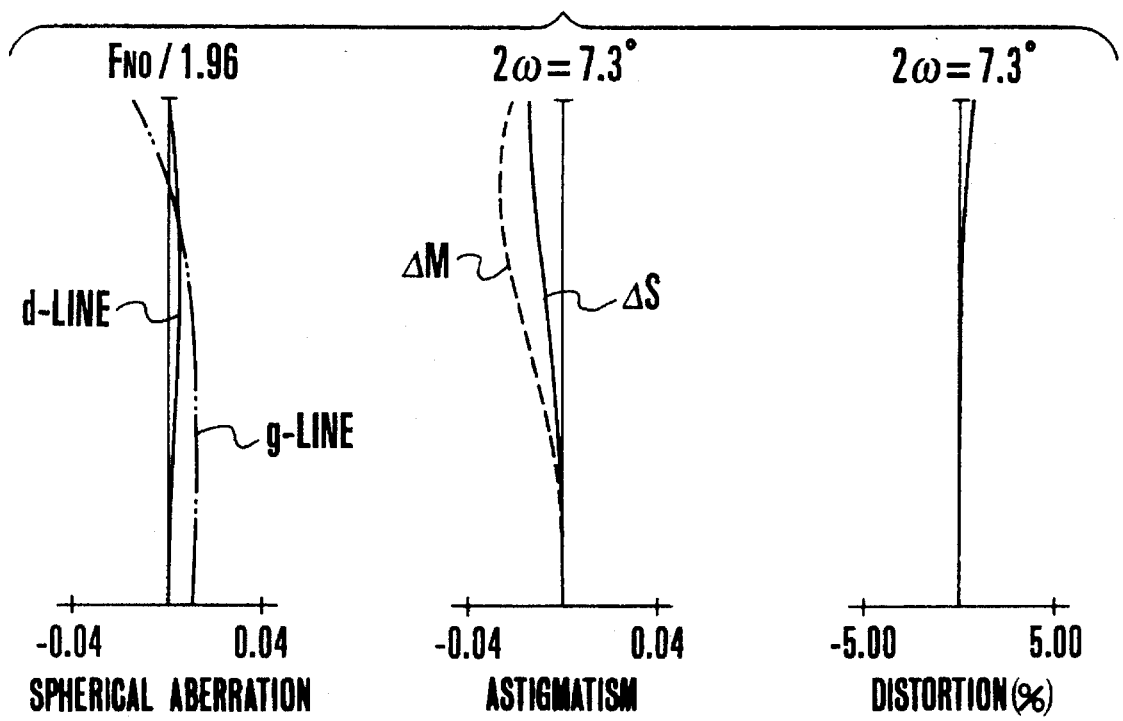
Figure 17A:
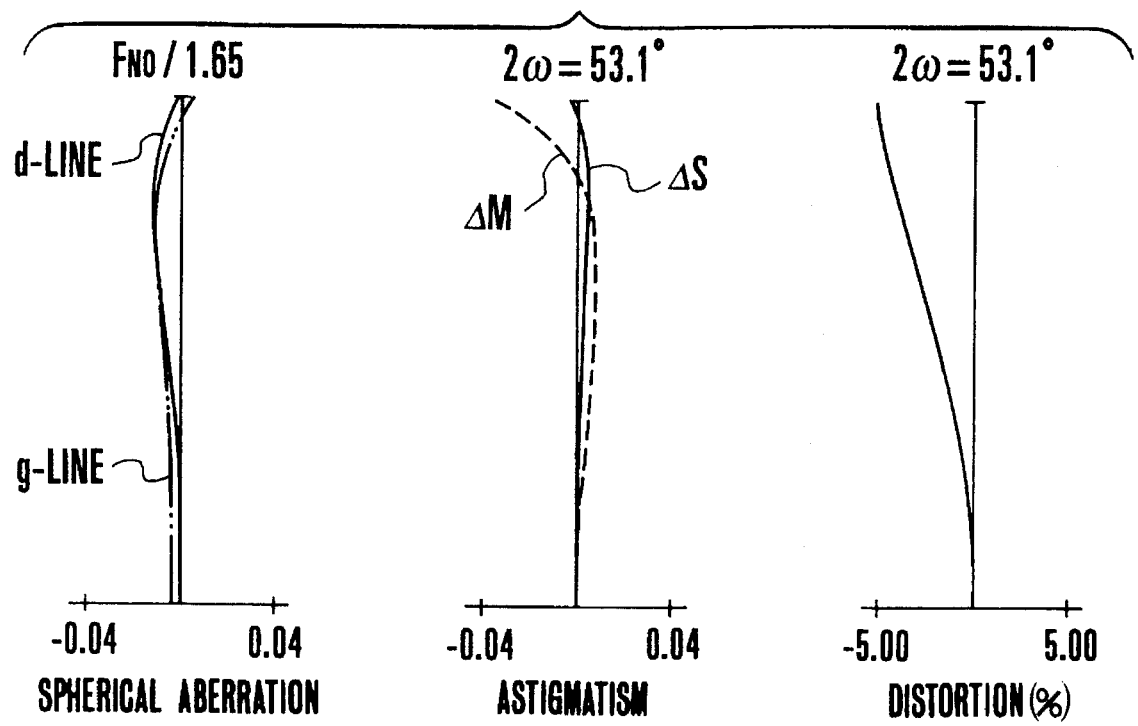
FIGS. 17(A) and 17(B) are graphic representations of the aberrations of the numerical example 8 of the zoom lens of the invention.
Figure 17B:
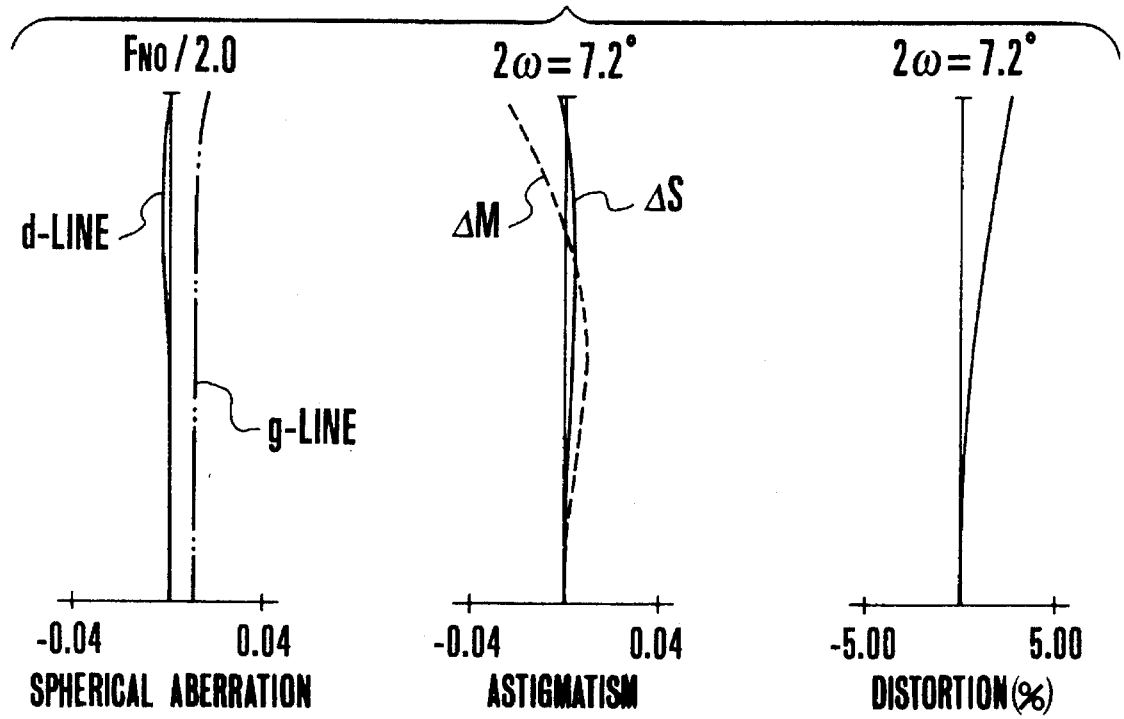
Figure 18:
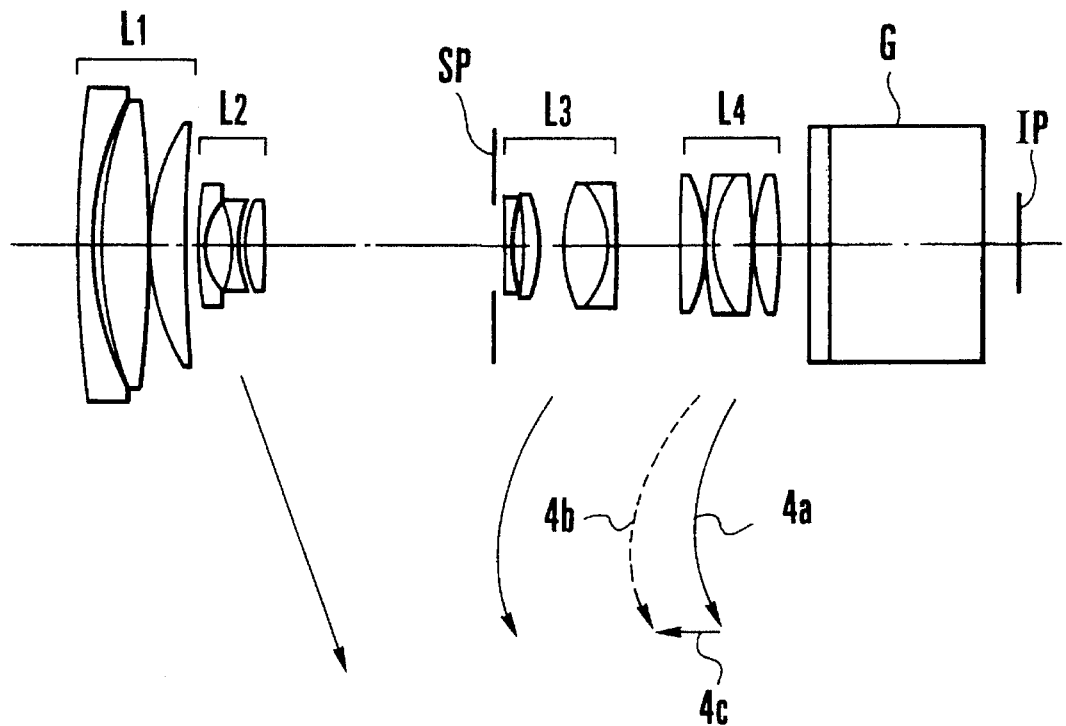
FIG. 18 is a longitudinal section view of a numerical example 9 of a zoom lens of the invention.
Figure 19:
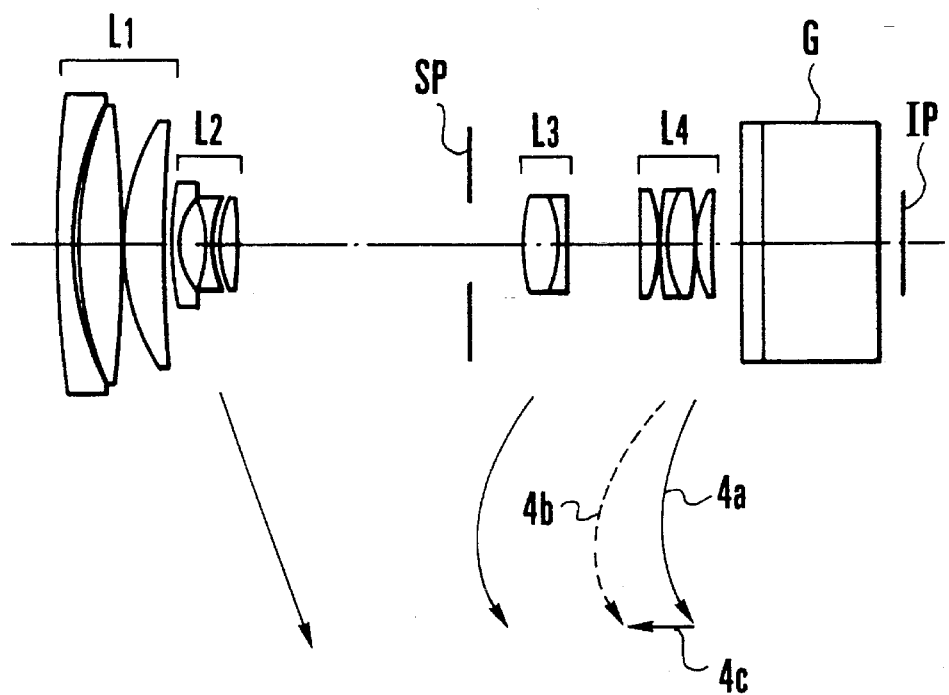
FIG. 19 is a longitudinal section view of a numerical example 10 of a zoom lens of the invention.
Figure 20:
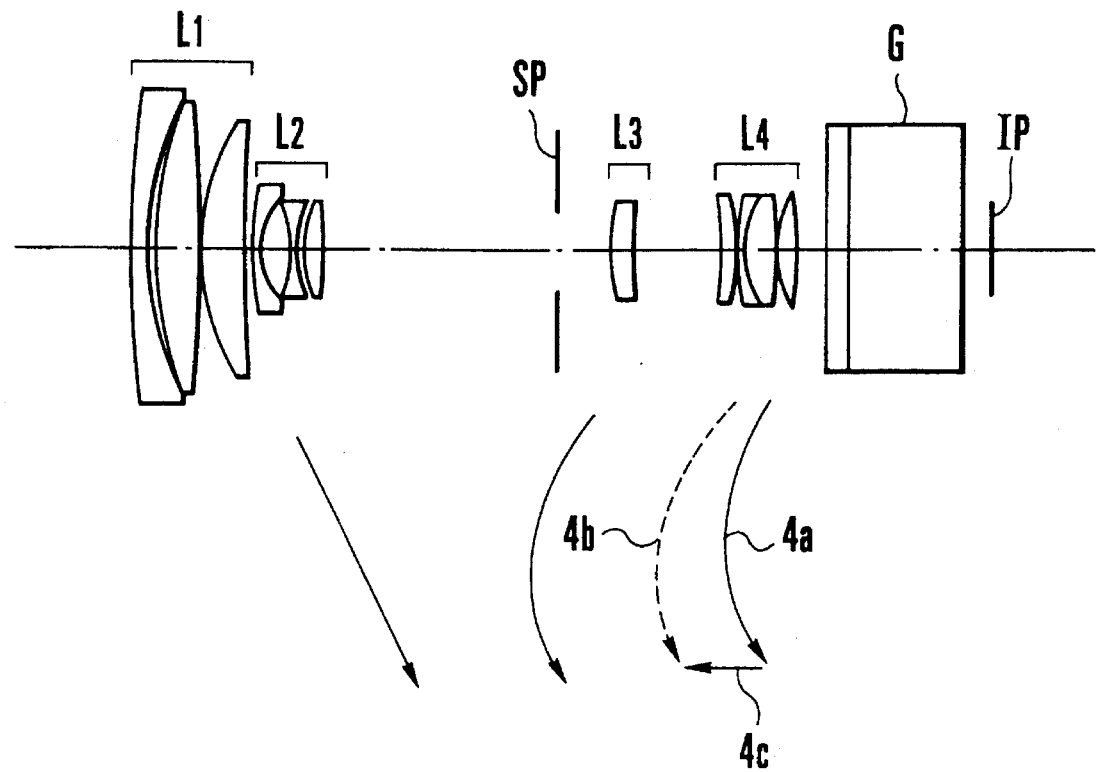
FIG. 20 is a longitudinal section view of a numerical example 11 of a zoom lens of the invention.
Figure 21:
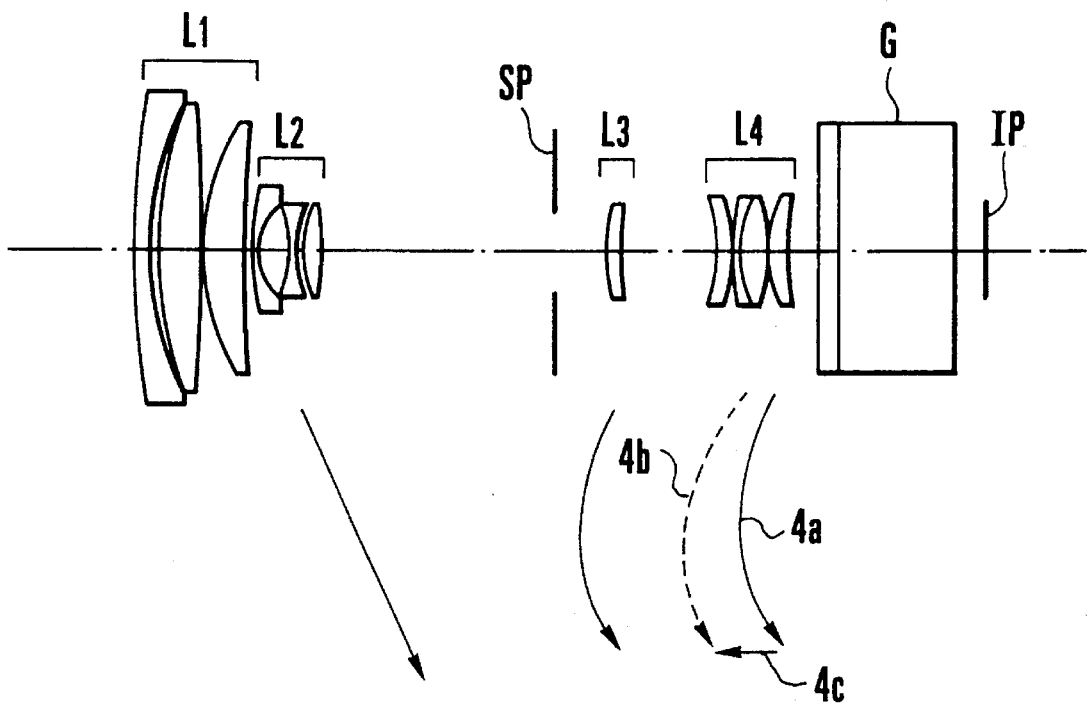
FIG. 21 is a longitudinal section view of a numerical example 12 of a zoom lens of the invention.
Figure 22:
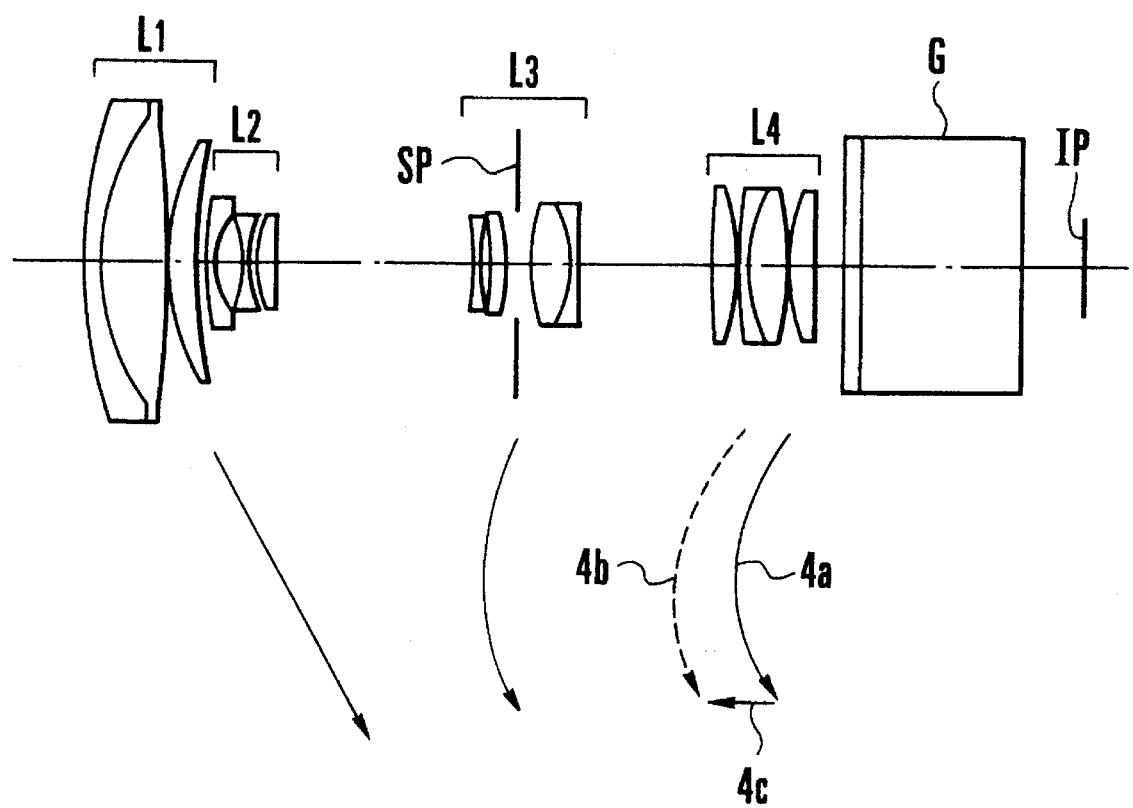
FIG. 22 is a longitudinal section view of a numerical example 13 of a zoom lens of the invention.
Figure 23A:
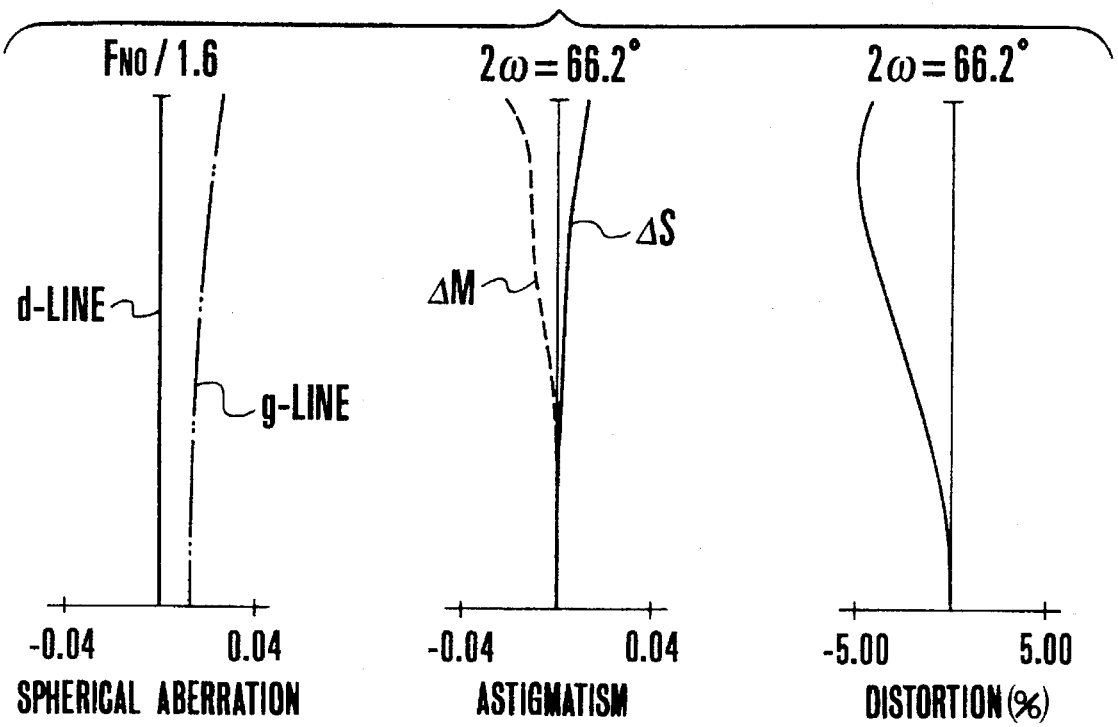
FIGS. 23(A) and 23(B) are graphic representations of the aberrations of the numerical example 9 of the zoom lens of the invention.
Figure 23B:
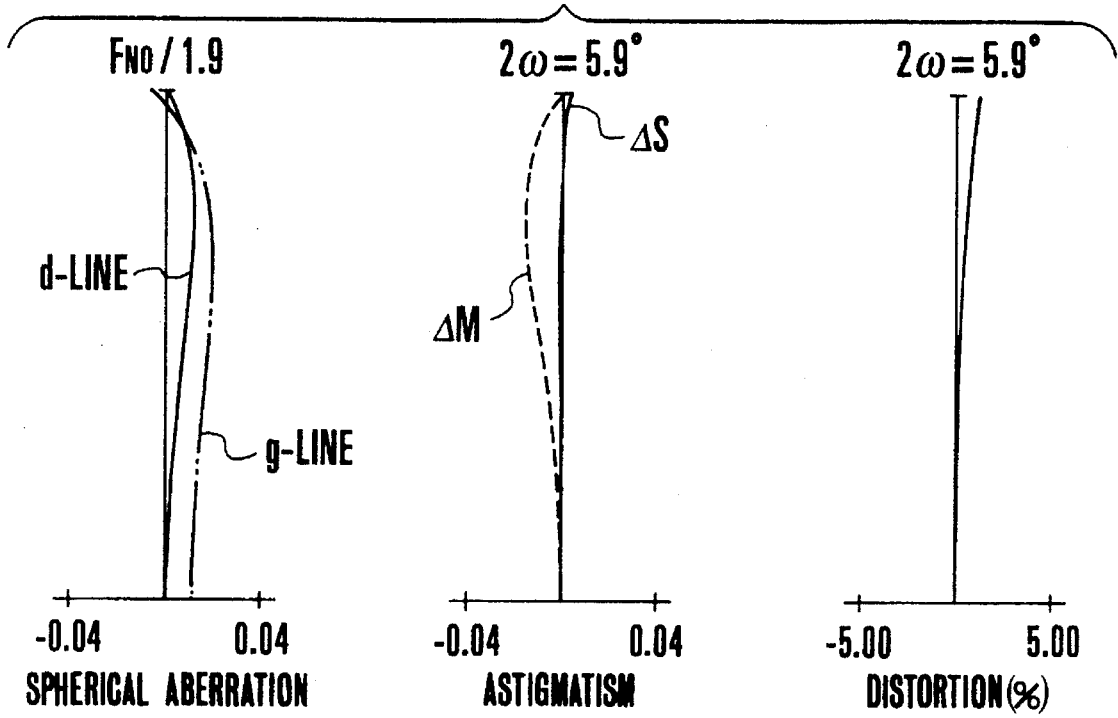
Figure 24A:
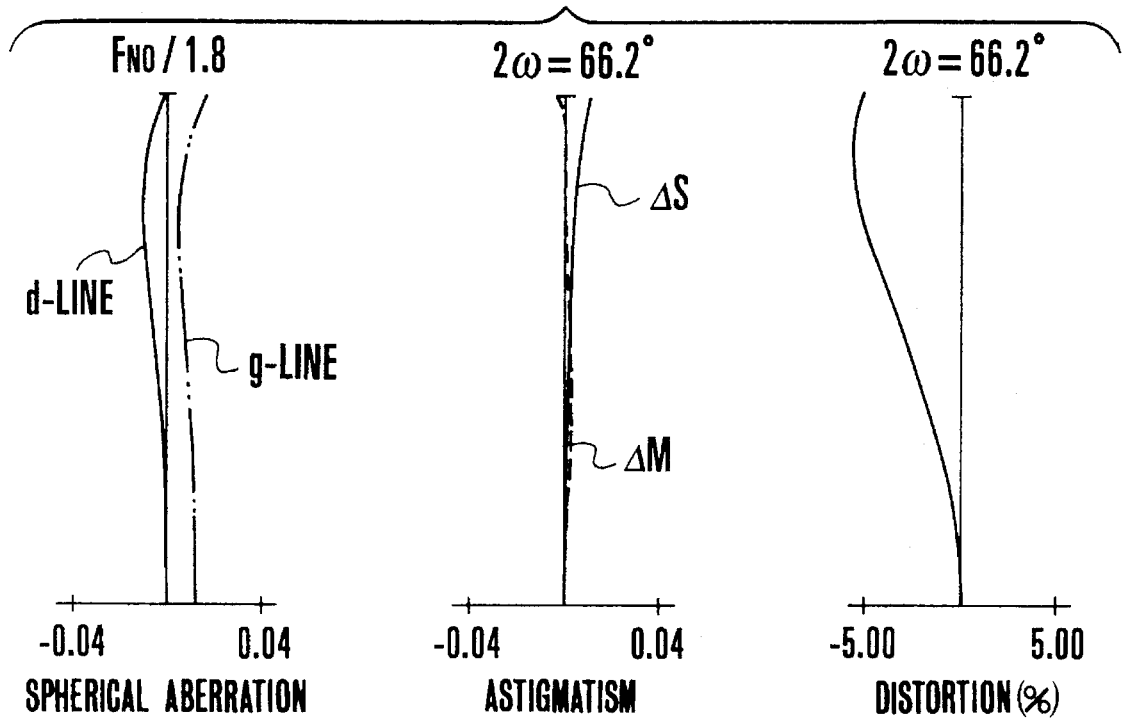
FIGS. 24(A) and 24(B) are graphic representations of the aberrations of the numerical example 10 of the zoom lens of the invention.
Figure 24B:
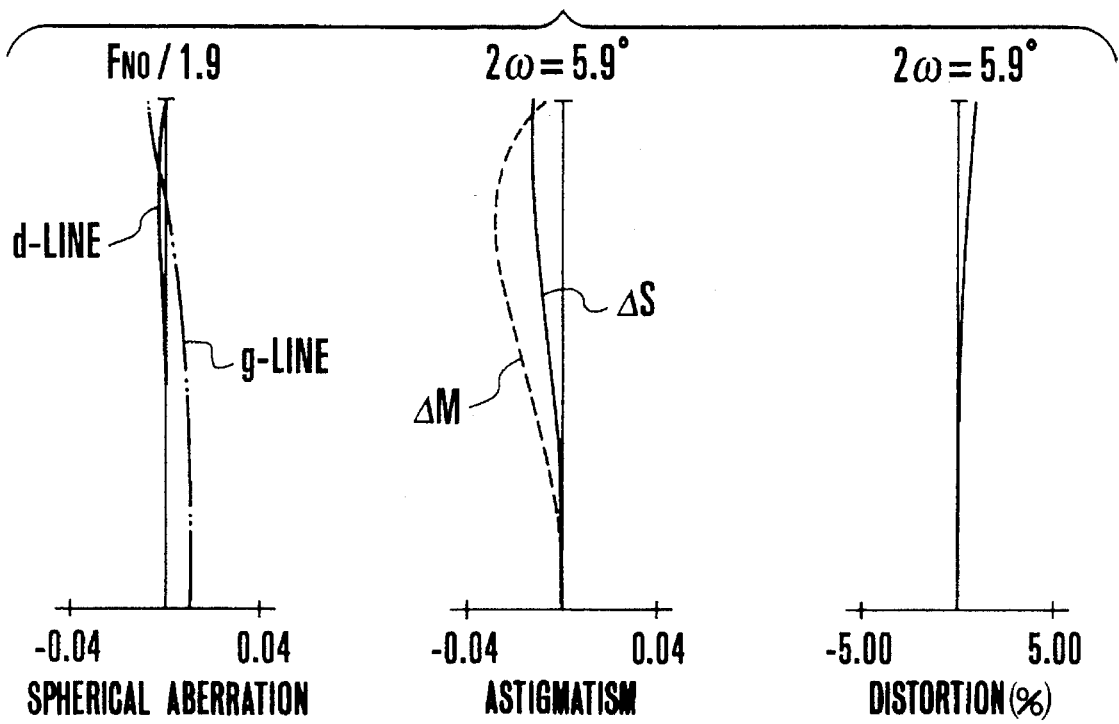
Figure 25A:
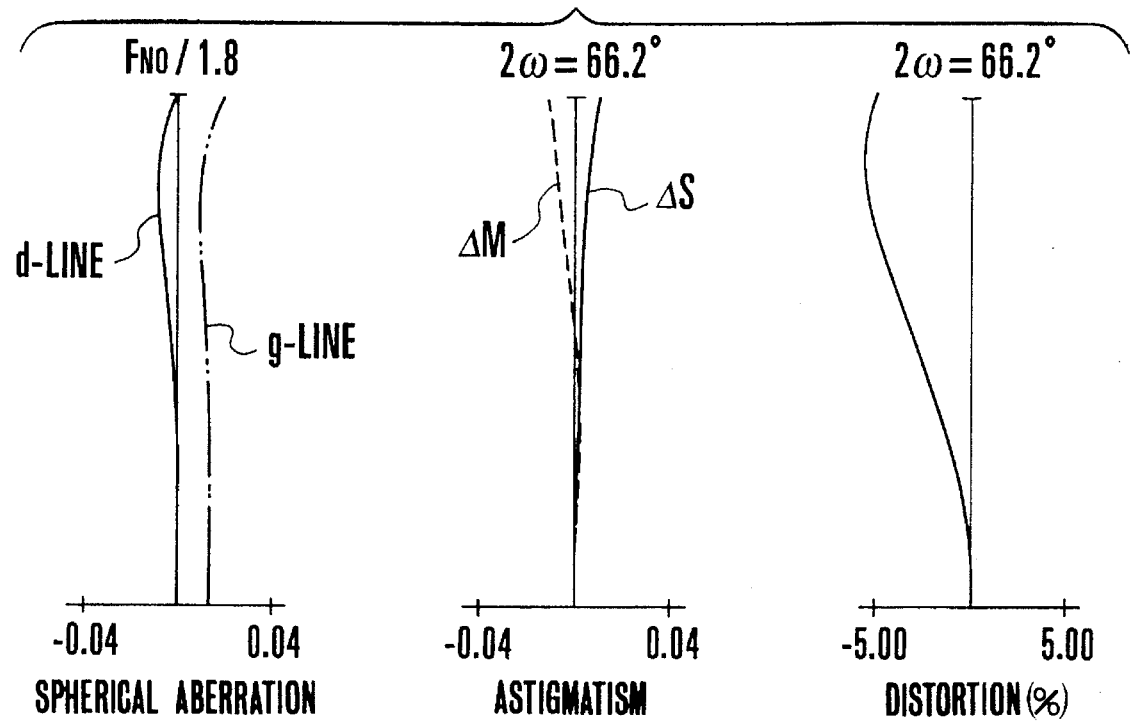
FIGS. 25(A) and 25(B) are graphic representations of the aberrations of the numerical example 11 of the zoom lens of the invention.
Figure 25B:
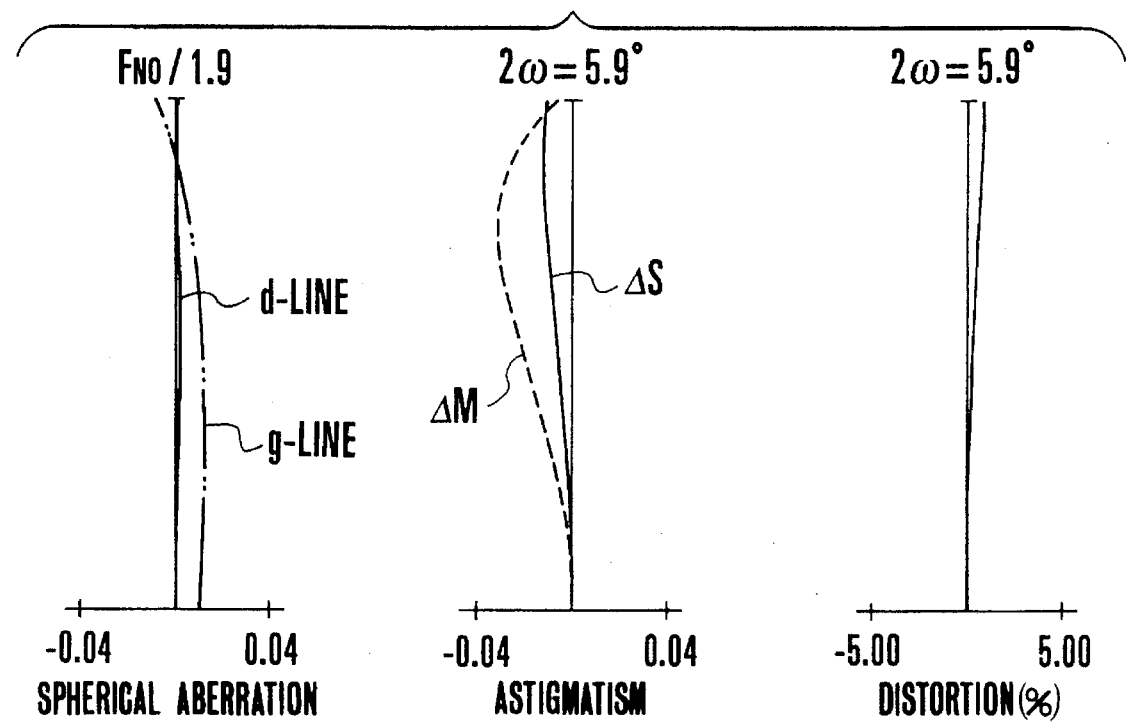
Figure 26A:
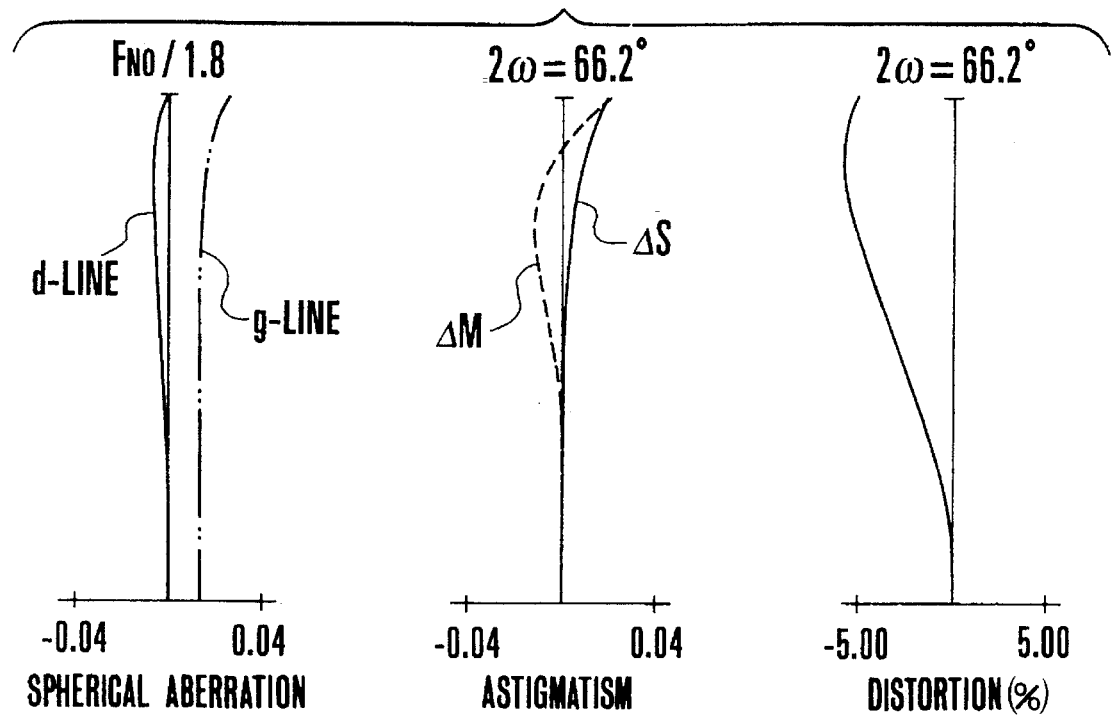
FIGS. 26(A) and 26(B) are graphic representations of the aberrations of the numerical example 12 of the zoom lens of the invention.
Figure 26B:
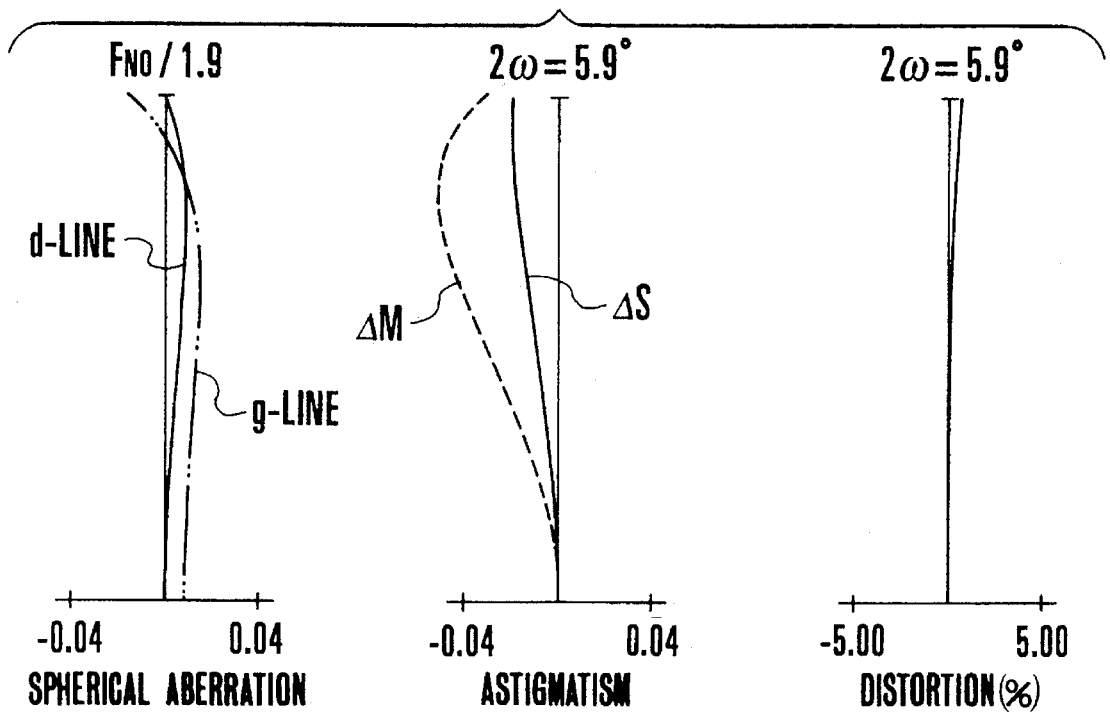
Figure 27A:
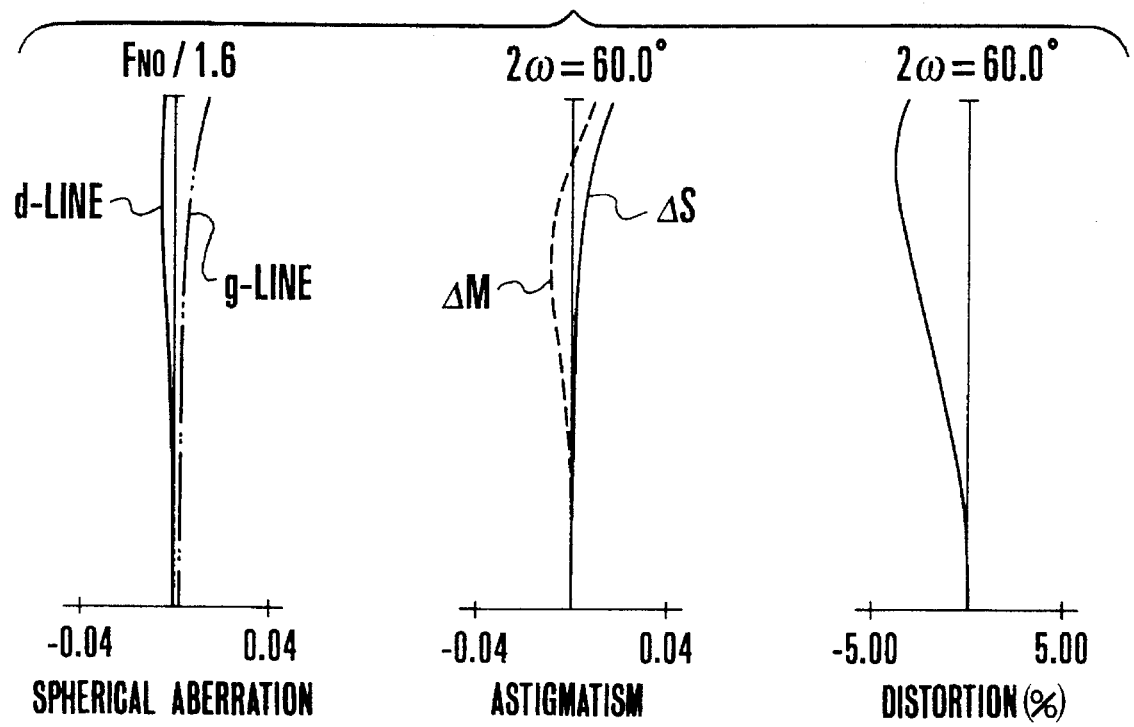
FIGS. 27(A) and 27(B) are graphic representations of the aberrations of the numerical example 13 of the invention.
Figure 27B:
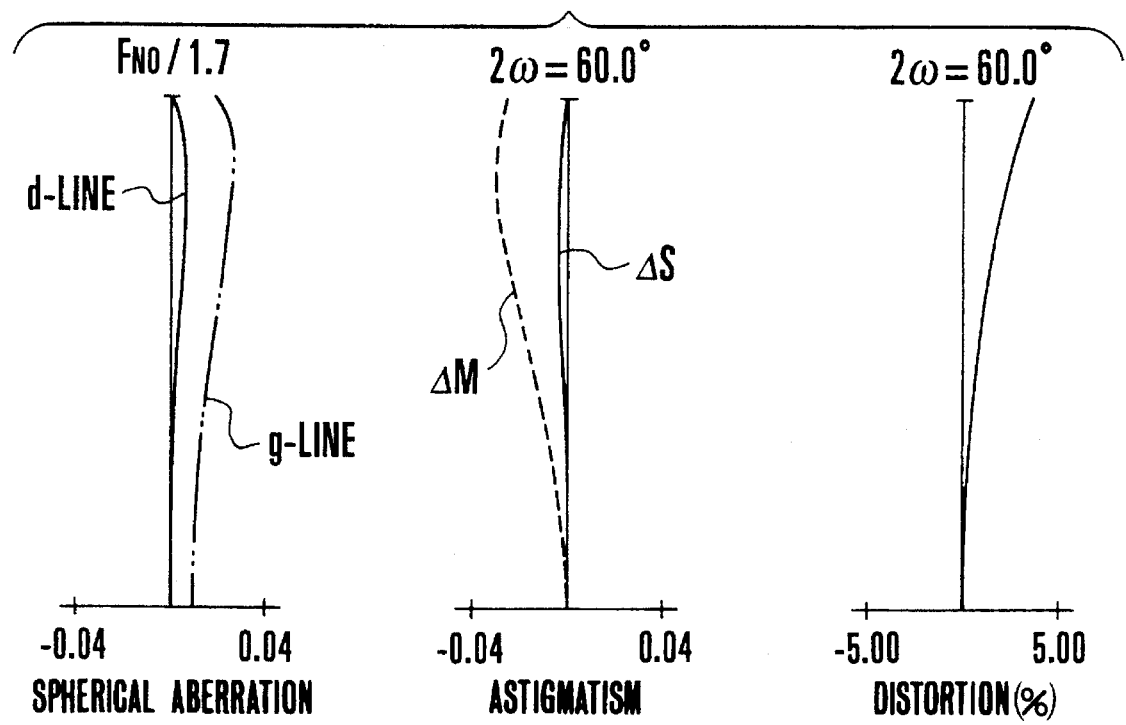
Figure 28:
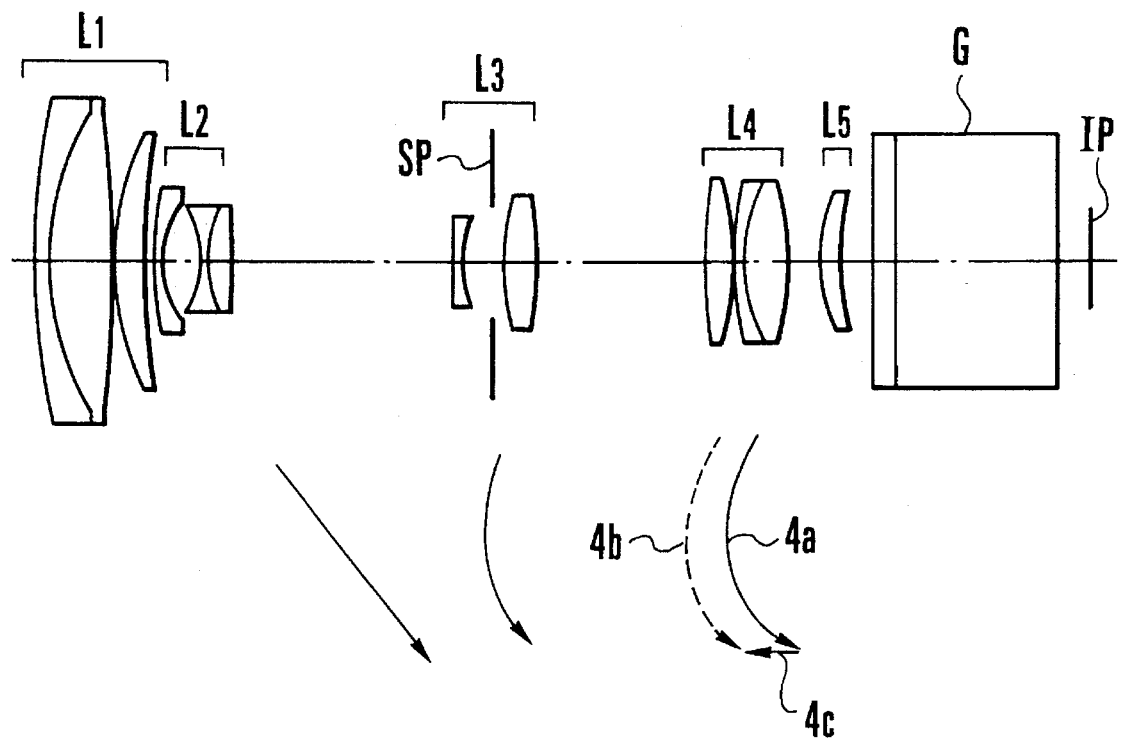
FIG. 28 is a longitudinal section view of a numerical example 14 of a zoom lens of the invention.
Figure 29:
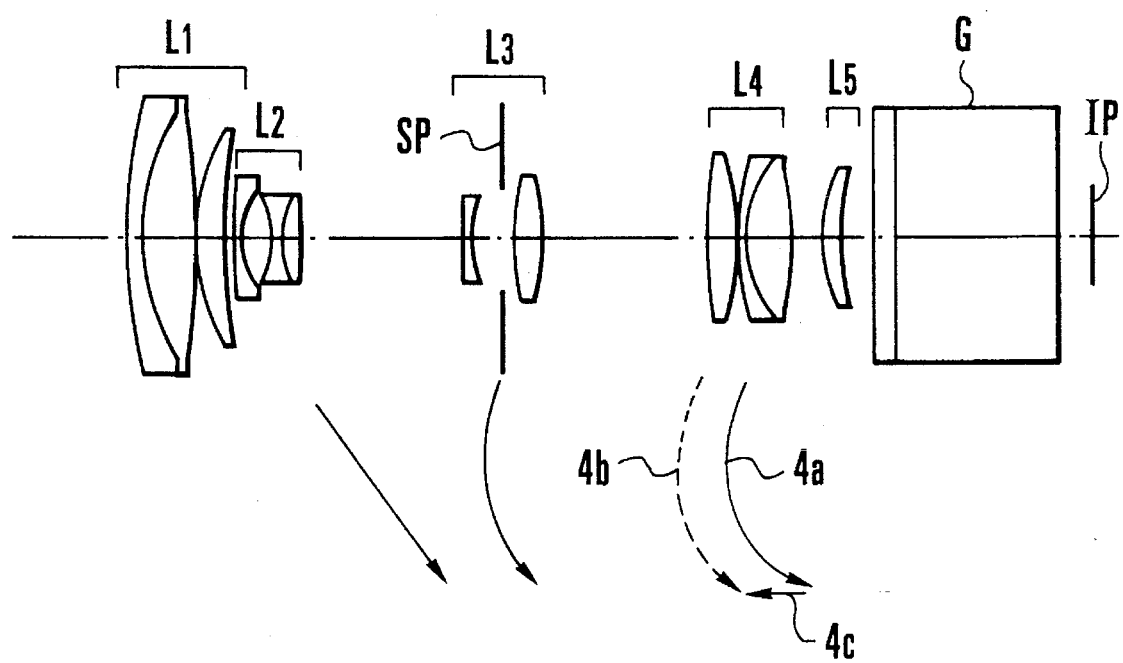
FIG. 29 is a longitudinal section view of a numerical example 15 of a zoom lens of the invention.
Figure 30:
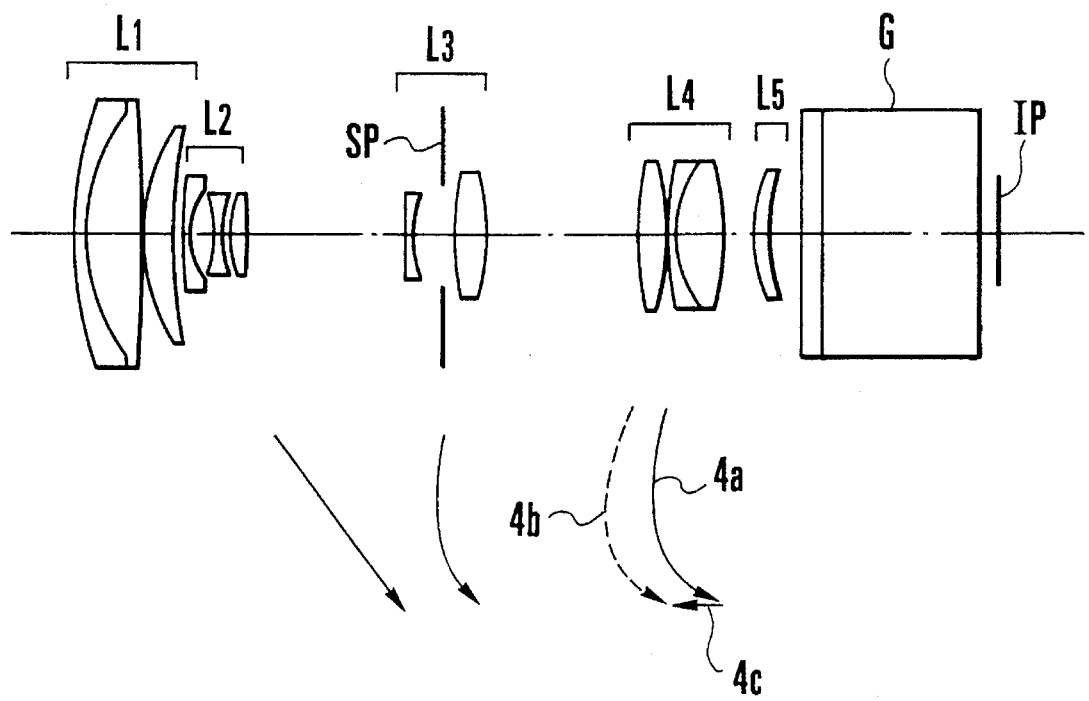
FIG. 30 is a longitudinal section view of a numerical example 16 of a zoom lens of the invention.
Figure 31:
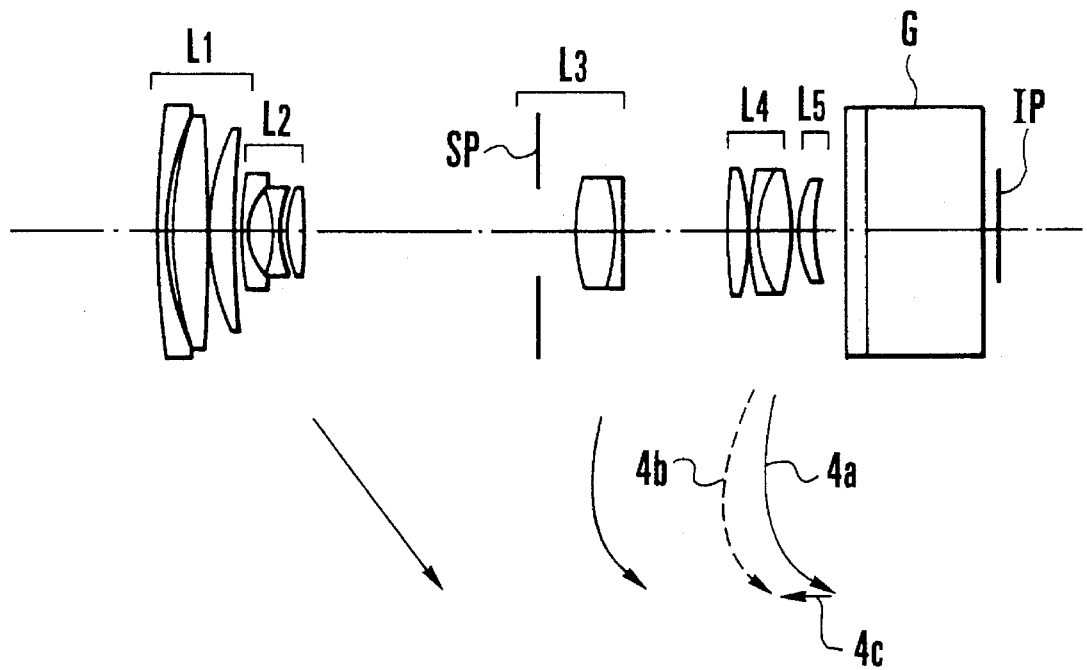
FIG. 31 is a longitudinal section view of a numerical example 17 of a zoom lens of the invention.
Figure 32A:
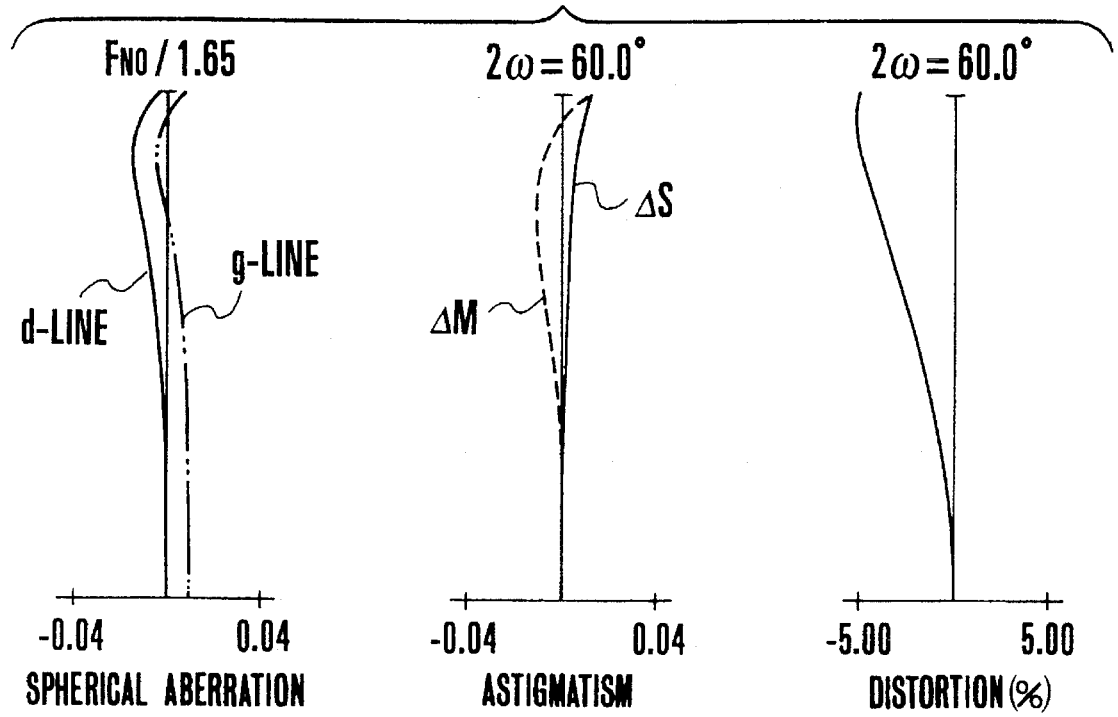
FIGS. 32(A) and 32(B) are graphic representations of the aberrations of the numerical example 14 of the zoom lens of the invention.
Figure 32B:
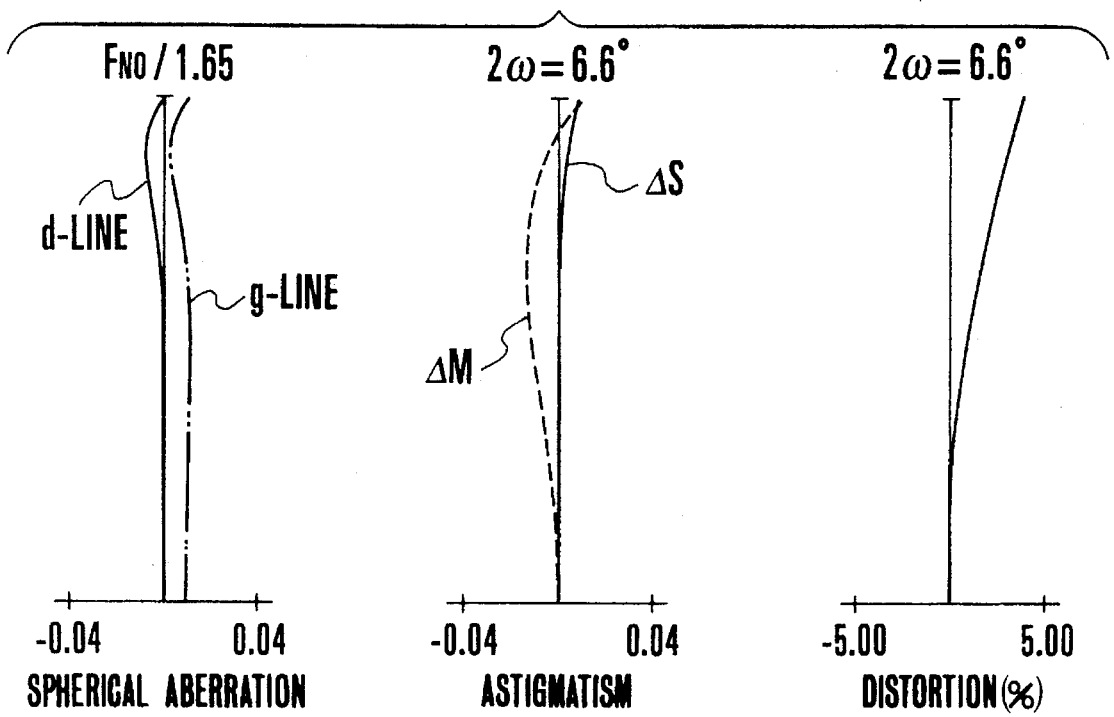
Figure 33A:
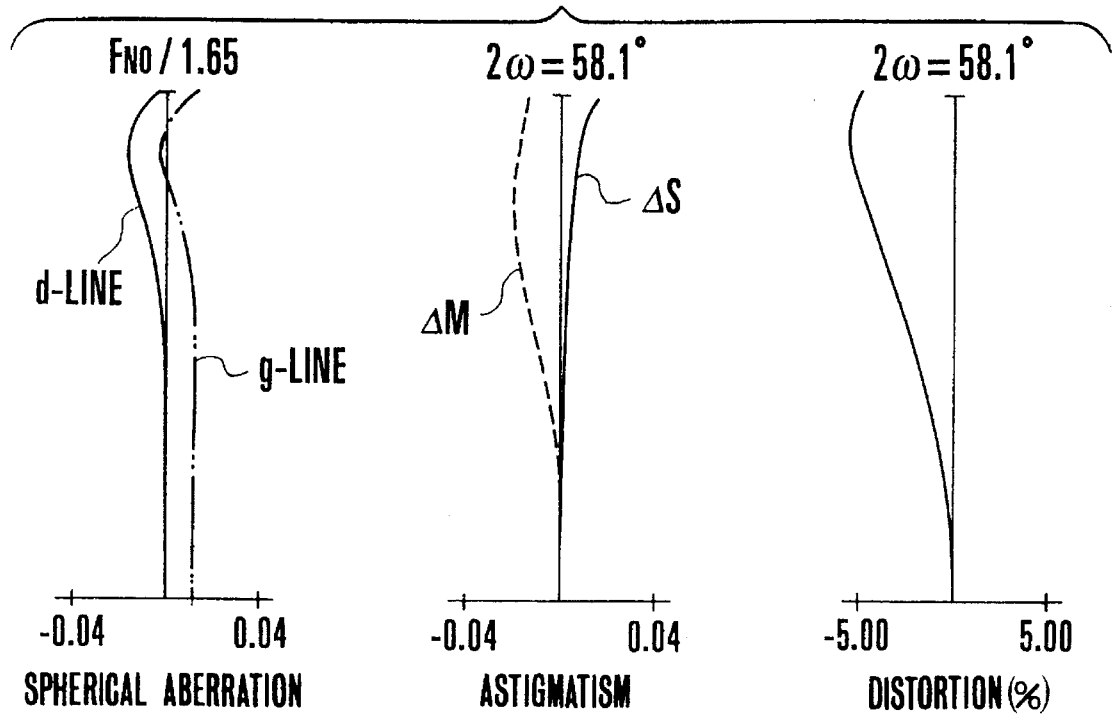
FIGS. 33(A) and 33(B) are graphic representations of the aberrations of the numerical example 15 of the zoom lens of the invention.
Figure 33B:
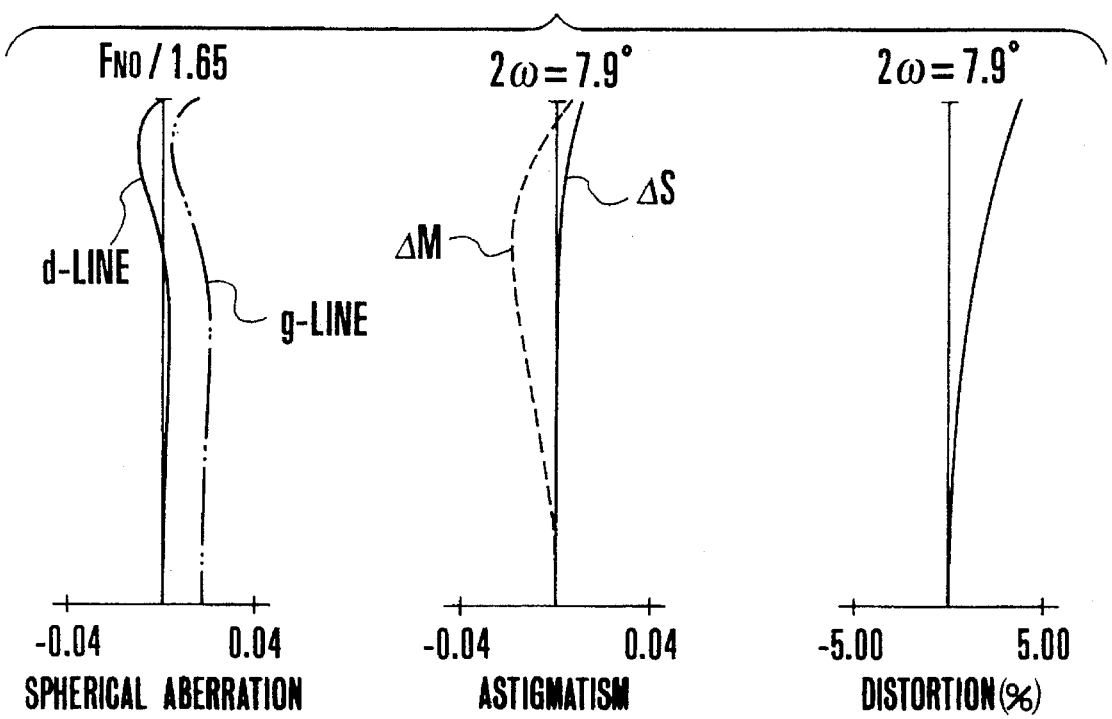
Figure 34A:
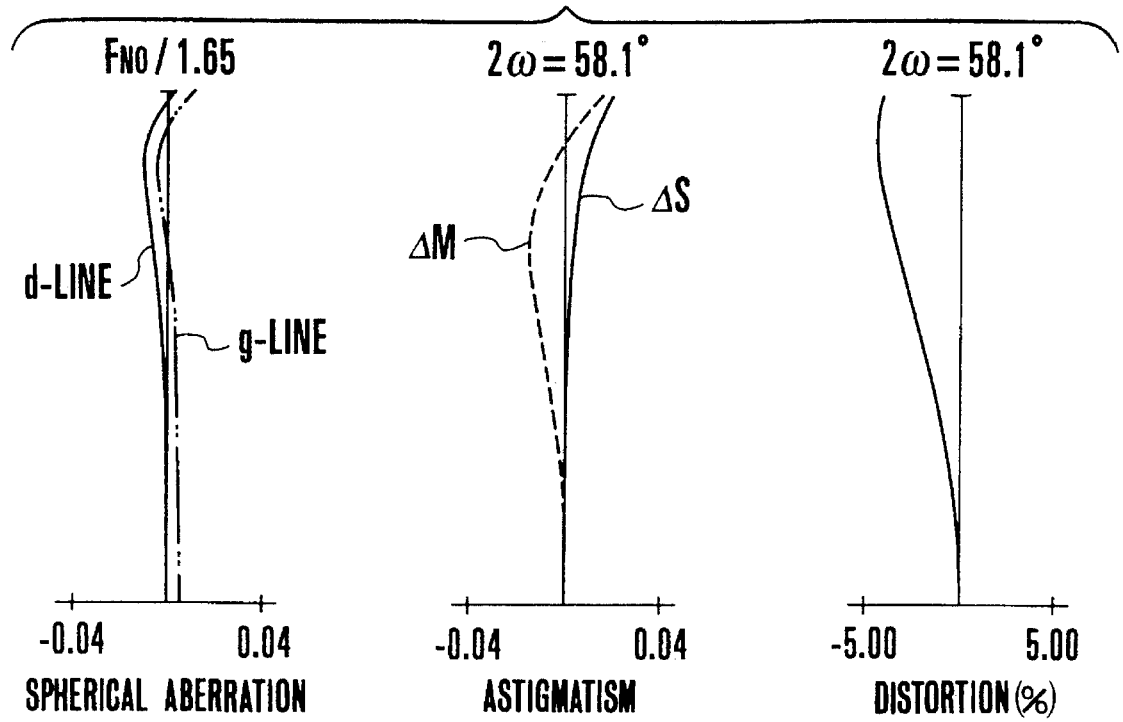
FIGS. 34(A) and 34(B) are graphic representations of the aberrations of the numerical example 16 of the zoom lens of the invention.
Figure 34B:
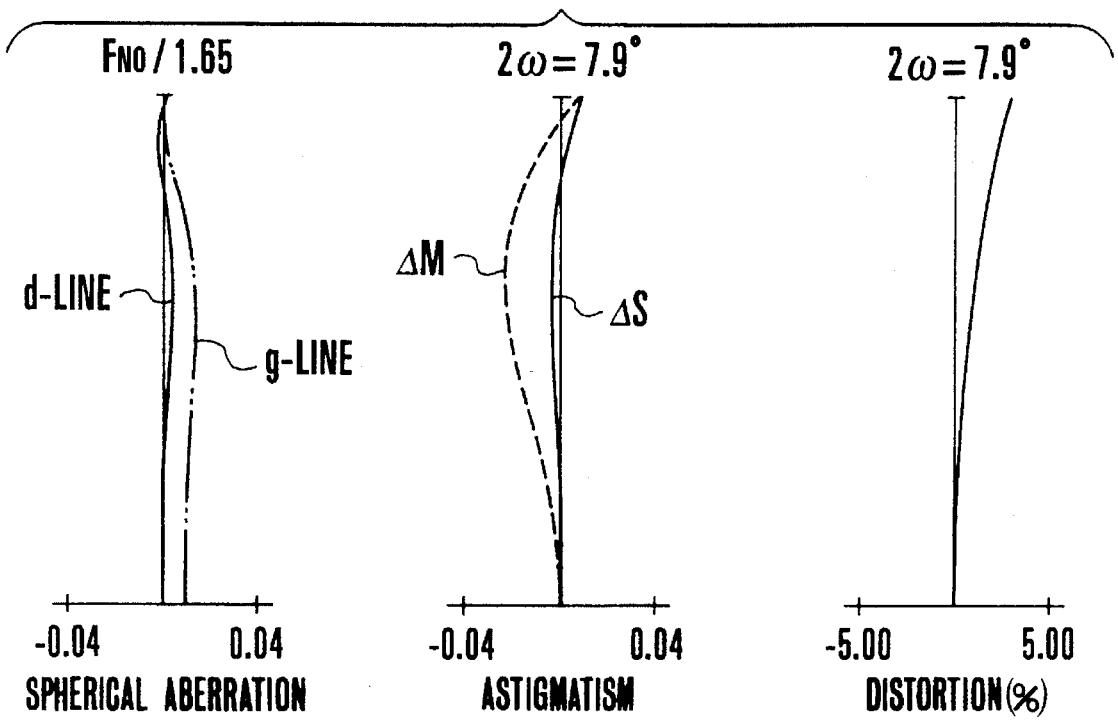
Figure 35A:
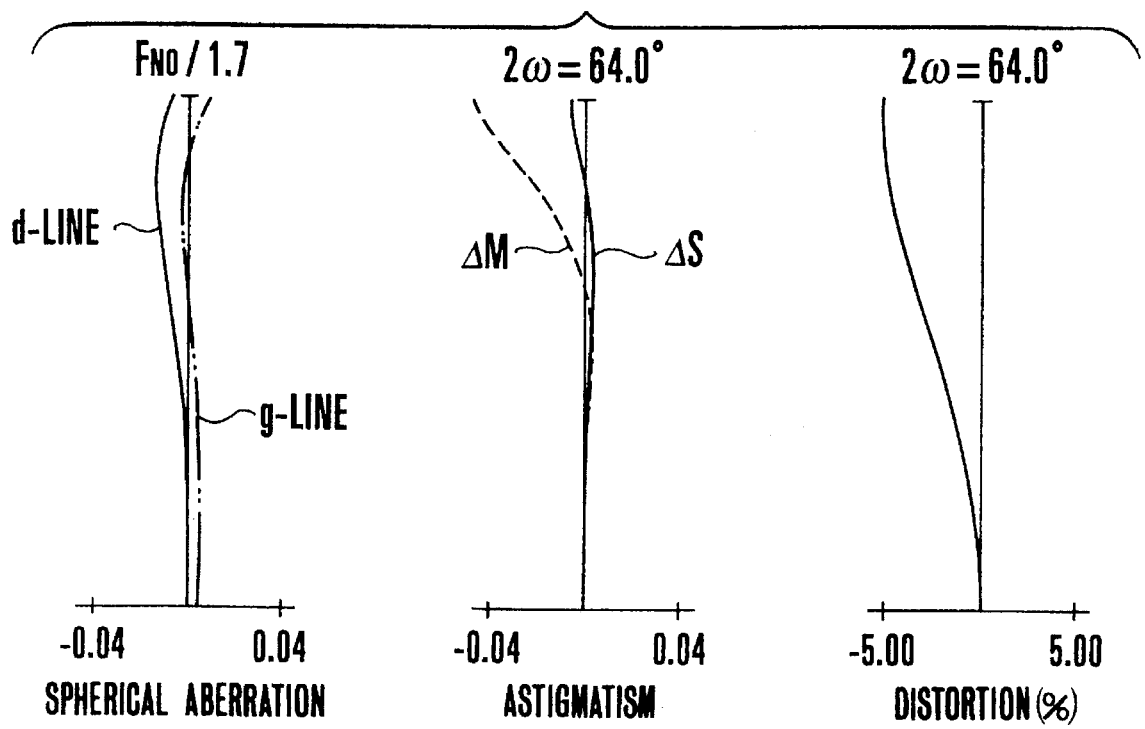
FIGS. 35(A) and 35(B) are graphic representations of the aberrations of the numerical example 17 of the zoom lens of the invention.
Figure 35B:
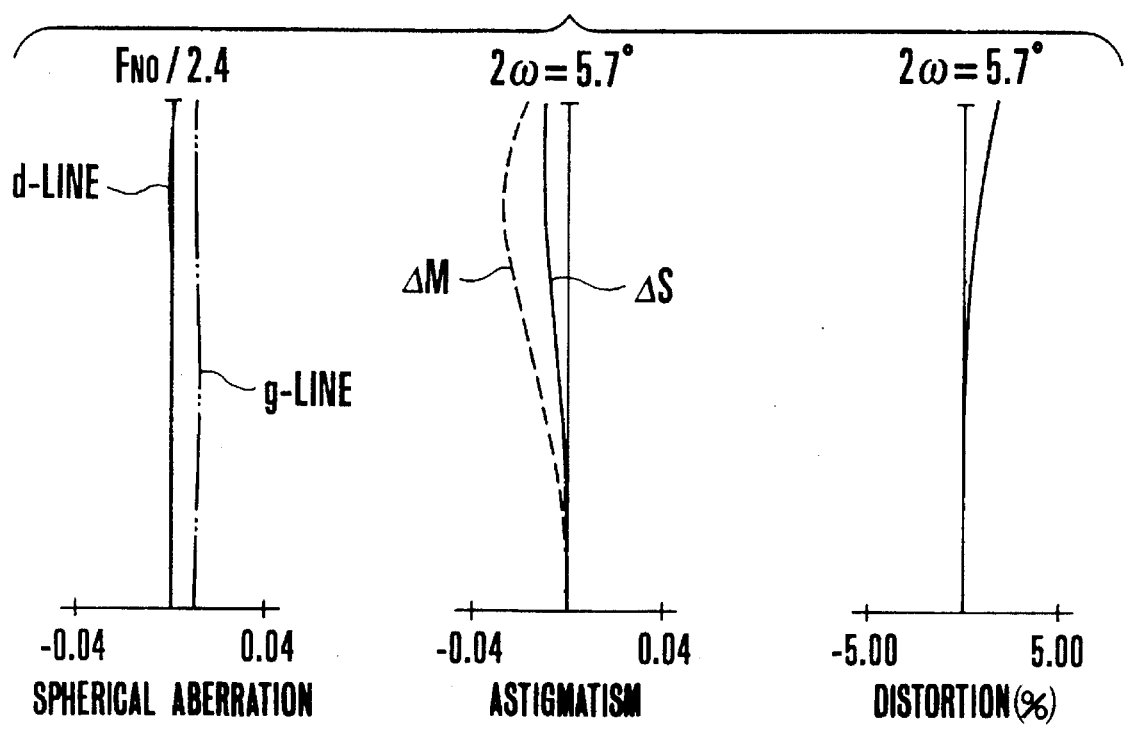

FIG. 1 is a schematic diagram of an embodiment of a zoom lens of the rear focus type according to the invention with the paraxial refractive power arrangement shown. FIGS. 2 to 9 are lens block diagrams of the numerical examples 1 to 8 to be described later. FIGS. 10(A) and 10(B) to FIGS. 17(A) and 17(B) show the aberrations of the numerical examples 1 to 8 of the invention.

In the drawings, reference character L1 denotes a first lens unit of positive refractive power, reference character L2 denotes a second lens unit of negative refractive power, reference character L3 denotes a third lens unit of positive refractive power, reference character L4 denotes a fourth lens unit of positive refractive power. Reference character SP denotes an aperture stop arranged in front of the third lens unit. Reference character G denotes a glass block such as a color separation prism or filter. Reference character IP is an image plane.

During zooming from the wide-angle end to the telephoto end, as indicated by the arrows, the second lens unit is moved toward the image side and the shift of the image plane resulting from the variation of the focal length is compensated for by moving the fourth lens unit.

The fourth lens unit is made axially movable also for focusing, as the rear focus type is employed. Such a combination of the zooming and focusing movements of the fourth lens unit is shown by the loci of the solid line curve 4a and the dashed line curve 4b in FIG. 1 when focused on an infinitely distant object and an object at the minimum distance, respectively, as the image shift with zooming from the wide-angle end to the telephoto end is compensated for. It is to be noted that the first and third lens units remain stationary during zooming and focusing.

In the present embodiment, as the function of compensating for the image shift with zooming and the focusing function are provided in the fourth lens unit, particular feature is made such that, as shown by the curves 4a and 4b in FIG. 1, the locus of zooming movement from the wide-angle end to the telephoto end is convex toward the object side. This affords to efficiently utilizing the space between the third and fourth lens units. With the help of this feature, a shortening of the physical length of the complete lens is achieved advantageously.

In the present embodiment, it is in the forward direction that the fourth lens unit moves to effect focusing to suit from an infinitely distant object to an object at the minimum distance as shown by, for example, a straight line 4c of FIG. 1 with the setting in the telephoto end.

In the present embodiment, as compared with the conventional 4-unit zoom lens in which the first lens unit moves forward to produce the same focusing effect, the effective diameter of the first lens unit is prevented from unduly increasing by employing such a form of the rear focus type as described above.

Another feature is that the aperture stop is positioned just in front of the third lens unit to thereby decrease the variation of aberrations due to the movable lens units. Also, the separations between the lens units that precede the stop are shortened to thereby achieve the shortening of the diameter of the front lens members with ease.

Yet another feature is, in the specific embodiment of the invention, that the refractive powers of the lens units are determined with respect to the following condition:

$$3.5 < F3/F4 \quad \ldots (1)$$

where F3 and F4 are the focal lengths of the third and fourth lens units, respectively.

With the help of these features, a high range zoom lens is obtained which has fulfilled the three requirements at once of minimizing the bulk and size of the entire system, of securing the predetermined back focal distance and nonetheless of maintaining a good optical performance throughout the entire zooming range and throughout the entire focusing range.

The technical significance of the condition (1) described above is explained below.

The inequality of condition (1) is concerned with the ratio of the focal lengths of the third and fourth lens units and has an aim to maintain good optical performance in such a manner that the back focal distance is made sufficiently long, while still permitting an improvement of the compact form of that part of the system which follows the stop to be achieved.

When the focal length of the third lens unit is shorter than the lower limit of the condition (1), it becomes difficult to correct the variation of spherical aberration with zooming or focusing. Additional problems are produced that it also becomes difficult to secure the sufficient back focal distance and that the total movement of the fourth lens unit is increased largely, causing large variation of aberrations with zooming or focusing.

To achieve further improvements of the compromise between the minimization of the bulk and size of the entire lens system and the maintenance of good stability of optical performance throughout the entire zooming range and throughout the entire focusing range, the following conditions are set forth:

$$3 < Bfw/Fw < 5 \quad \ldots (2)$$

$$-0.8 < Fw/F2 < -0.4 \quad \ldots (3)$$

$$5 < F1/Fw < 12 \quad \ldots (4)$$

where F1 and F2 are the focal lengths of the first and second lens units, respectively, Fw is the shortest focal length of the entire lens system, and Bfw is the back focal distance in the wide-angle end.

The inequalities of condition (2) are concerned with the ratio of the back focal distance Bfw to the focal length Fw for the wide-angle end. When the back focal distance is shorter than the lower limit of the condition (2), it becomes impossible in some cases to arrange the color separation prism. In other cases, the telecentric system fails to form so that the light beam is incident on the color separation prism at a tight angle, causing color shading to arise objectionably.

Conversely when the back focal distance is too long as exceeding the upper limit, the fourth lens unit gets a large effective diameter and a heavy weight. This is an obstacle to smooth focusing, or like problems arise.

The inequalities of condition (3) are concerned with the ratio of the focal length for the wide-angle end to the focal length of the second lens unit. When the focal length of the second lens unit is too short as exceeding the upper limit of the condition (3), the Petzval sum increases in the under direction, causing inclination of the image plane. This and other aberrations become difficult to correct well.

Conversely when the focal length of the second lens unit is too long as exceeding the lower limit, the total zooming movement of the second lens unit increases largely, giving rise to a problem in that the diameter of the front lens members becomes too large.

The inequalities of condition (4) are concerned with the object point relative to the second lens unit, or its magnification. To set the entire lens system to a minimum size, it is preferable that the second lens unit zooms across the unity of magnification. If this occurs in a middle region, the fourth lens unit reciprocates almost perfectly when zooming from one terminal end to the other. Thus, it becomes possible to obtain a high zoom ratio with a most advantageous space efficiency.

Concretely speaking, when the upper limit of this condition (4) is exceeded, the object point for the second lens unit goes far away, so that the second lens unit is given a lower magnification, thus producing an adverse effect of minimizing the size of the lens system. In addition, the separation between the first and second lens units increases largely. Therefore, it becomes difficult to achieve the minimization of the size of the entire lens system.

When the lower limit is exceeded, the magnification of the second lens unit becomes too large to achieve the increase of the zoom ratio with ease.

Another feature is that the second lens unit is preferably constructed as comprising, from front to rear, a negative first lens whose rear surface is concave and has a stronger refracting power than that of the front surface thereof, an air space, a negative second lens whose surfaces both are concave, an air space and a positive third lens whose front surface is convex and has a stronger refracting power than that of the rear surface thereof.

By this, the front principal point of the second lens unit is set to a more frontal position so as to shorten its principal point interval from the first lens unit. In turn, the height of incidence from the optical axis of the off-axial light beam on the first lens unit is lowered to reduce the diameter of the first lens unit.

Also, from front to rear, the first lens unit is constructed from a negative first lens, a positive second lens and a positive third lens; the second lens unit from a negative first lens, a negative second lens and a positive third lens; the third lens unit either from a positive first lens and a negative second lens or from a negative first lens and a positive second lens; and the fourth lens unit either from a positive first lens, a negative second lens and a positive third lens or from a positive first lens, a negative second lens, a positive third lens and a positive fourth lens.

By this, a high optical performance is obtained throughout the entire zooming range and over the entire area of the image frame.

A further feature is to satisfy the following conditions:

$$1 < (1/R_{22,F} - 1/R_{21,R}) \cdot F_2 < 2 \quad \ldots (5)$$

$$-0.55 < FT/FT_{1,3} < 0 \quad \ldots (6)$$

where $R_{21,R}$ is the radius of curvature of the rear surface of the first lens in the second lens unit; $R_{22,F}$ is the radius of curvature of the front lens surface of the second lens in the second lens unit; FT is the longest focal length of the entire lens system; $FT_{1,3}$ is the overall focal length of the first to third lens units in the telephoto end.

Here, the inequalities of condition (5) are concerned with the air lens and the focal length of the second lens unit. When the lower limit is exceeded, distortion tends to become barrel type in the wide-angle end.

Meanwhile, when the upper limit is exceeded, distortion tends to become pincushion type in the telephoto end.

The inequalities of condition (6) are concerned with the axial light beam emerging from the third lens unit in the telephoto end. When the lower limit is exceeded, the axial beam emerging from the third lens unit gets a strong divergence. Therefore, the diameter of the fourth lens unit has to be increased. Another problem arises in that spherical aberration varies to a large extent with focusing.

Meanwhile, when the upper limit is exceeded, the axial beam emerging from the third lens unit gets a strong convergence, giving rise to problems in that the sufficient back focal distance and exit pupil can no longer be obtained.

Next, numerical examples 1 to 8 of the invention are shown. In the numerical data for the examples 1 to 8, Ri is the radius of curvature of the i-th lens surface, when counted from the object side; Di is the i-th lens thickness or air separation, when counted from the object side; and Ni and vi are respectively the refractive index and Abbe number of the glass of the i-th lens element, when counted from the object side. The last three lens surfaces in the numerical examples 1 to 8 are glass blocks such as a color separation prism and a filter or the like. The values of the factors in the above-described conditions (1) to (6) for the numerical examples 1 to 8 are also listed in Table-1.

The shape of an aspheric surface is expressed in the coordinates with an X axis in the axial direction and an H axis in the direction perpendicular to the optical axis, the direction in which light advances being taken as positive, by the following equation:

$$X = (1/R)H^2/(1 + \sqrt{1 - (1+K)(H/R)^2}) + AH^2 + BH^4 + CH^6 + DH^8 + EH^{10}$$

where R is the radius of the osculating sphere, and K, A, B, C, D and E are the aspheric coefficients. Also, the notation "e-0X" means "$10^{-X}$".

Numerical Example 1:

f = 1–8.0   Fno = 1:1.65   2ω = 56.4°–7.3°

| | | | |
|---|---|---|---|
| R1 = 9.760 | D1 = 0.305 | N1 = 1.80518 | ν1 = 25.4 |
| R2 = 5.255 | D2 = 0.915 | N2 = 1.60311 | ν2 = 60.7 |
| R3 = 57.424 | D3 = 0.033 | | |
| R4 = 5.401 | D4 = 0.559 | N3 = 1.69680 | ν3 = 55.5 |
| R5 = 14.080 | D5 = Variable | | |
| R6 = 6.644 | D6 = 0.152 | N4 = 1.88300 | ν4 = 40.8 |
| R7 = 1.421 | D7 = 0.593 | | |
| R8 = −7.409 | D8 = 0.135 | N5 = 1.69680 | ν5 = 55.5 |
| R9 = 3.188 | D9 = 0.169 | | |
| R10 = 2.673 | D10 = 0.423 | N6 = 1.84666 | ν6 = 23.8 |
| R11 = 19.594 | D11 = Variable | | |
| R12 = (Stop) | D12 = 0.254 | | |
| R13 = 16.349 | D13 = 0.152 | N7 = 1.80400 | ν7 = 46.6 |
| R14 = 1.863 | D14 = 0.644 | N8 = 1.60342 | ν8 = 38.0 |
| R15 = −5.937 | D15 = Variable | | |
| R16 = −90.322 | D16 = 0.423 | N9 = 1.48749 | ν9 = 70.2 |
| R17 = −4.286 | D17 = 0.025 | | |
| R18 = 8.585 | D18 = 0.169 | N10 = 1.80518 | ν10 = 25.4 |
| R19 = 2.706 | D19 = 0.576 | N11 = 1.48749 | ν11 = 70.2 |
| R20 = −19.124 | D20 = 0.025 | | |
| R21 = 3.892 | D21 = 0.542 | N12 = 1.48749 | ν12 = 70.2 |
| R22 = −5.134 | D22 = 0.678 | | |
| R23 = ∞ | D23 = 0.423 | N13 = 1.51633 | ν13 = 64.2 |
| R24 = ∞ | D24 = 3.389 | N14 = 1.60342 | ν14 = 38.0 |
| R25 = ∞ | | | |

| | Focal Length | | |
|---|---|---|---|
| Variable Separation | 1.00 | 2.80 | 8.00 |
| D5 | 0.17 | 3.19 | 5.20 |
| D11 | 5.29 | 2.27 | 0.25 |
| D15 | 2.25 | 1.93 | 2.25 |

R15: Aspheric Surface:

K = −4.801 e−01   A = 1.002 e−03   B = −9.996 e−04
C = −1.090 e−04   D = 1.947 e−04

Numerical Example 2:

f = 1–12.65   Fno = 1:1.65–2   2ω = 60.0°–5.2°

| | | | |
|---|---|---|---|
| R1 = 15.833 | D1 = 0.346 | N1 = 1.80518 | ν1 = 25.4 |
| R2 = 6.746 | D2 = 1.500 | N2 = 1.60311 | ν2 = 60.7 |
| R3 = −38.377 | D3 = 0.038 | | |
| R4 = 6.039 | D4 = 0.730 | N3 = 1.69680 | ν3 = 55.5 |
| R5 = 15.975 | D5 = Variable | | |
| R6 = 7.024 | D6 = 0.173 | N4 = 1.88300 | ν4 = 40.8 |
| R7 = 1.692 | D7 = 0.786 | | |
| R8 = −3.073 | D8 = 0.153 | N5 = 1.69680 | ν5 = 55.5 |
| R9 = 2.791 | D9 = 0.192 | | |
| R10 = 3.248 | D10 = 0.423 | N6 = 1.84666 | ν6 = 23.8 |
| R11 = −36.211 | D11 = Variable | | |
| R12 = (Stop) | D12 = 0.288 | | |
| R13 = 7.387 | D13 = 0.807 | N7 = 1.62588 | ν7 = 35.7 |
| R14 = −2.053 | D14 = 0.173 | N8 = 1.77250 | ν8 = 49.6 |
| R15 = −13.939 | D15 = Variable | | |
| R16 = 84.254 | D16 = 0.480 | N9 = 1.51633 | ν9 = 64.2 |
| R17 = −4.349 | D17 = 0.028 | | |
| R18 = 8.629 | D18 = 0.192 | N10 = 1.80518 | ν10 = 25.4 |
| R19 = 2.482 | D19 = 0.769 | N11 = 1.48749 | ν11 = 70.2 |
| R20 = −22.864 | D20 = 0.028 | | |
| R21 = 2.808 | D21 = 0.538 | N12 = 1.48749 | ν12 = 70.2 |
| R22 = 47.595 | D22 = 0.769 | | |
| R23 = ∞ | D23 = 0.480 | N13 = 1.51633 | ν13 = 64.2 |
| R24 = ∞ | D24 = 3.461 | N14 = 1.60342 | ν14 = 38.0 |
| R25 = ∞ | | | |

| | Focal Length | | |
|---|---|---|---|
| Variable Separation | 1.00 | 3.24 | 12.65 |
| D5 | 0.21 | 3.61 | 5.88 |
| D11 | 5.96 | 2.56 | 0.29 |
| D15 | 2.91 | 2.28 | 2.91 |

Numerical Example 3:

f = 1–10.0   Fno = 1:1.65–1.85   2ω = 56.4°–6.1°

| | | | |
|---|---|---|---|
| R1 = 13.935 | D1 = 0.321 | N1 = 1.80518 | ν1 = 25.4 |
| R2 = 6.199 | D2 = 1.160 | N2 = 1.60311 | ν2 = 60.7 |
| R3 = −46.242 | D3 = 0.035 | | |
| R4 = 6.062 | D4 = 0.642 | N3 = 1.69680 | ν3 = 55.5 |
| R5 = 18.709 | D5 = Variable | | |
| R6 = 5.215 | D6 = 0.142 | N4 = 1.88300 | ν4 = 40.8 |
| R7 = 1.640 | D7 = 0.653 | | |
| R8 = −2.610 | D8 = 0.142 | N5 = 1.69680 | ν5 = 55.5 |
| R9 = 2.588 | D9 = 0.178 | | |
| R10 = 3.060 | D10 = 0.392 | N6 = 1.84666 | ν6 = 23.8 |
| R11 = −19.876 | D11 = Variable | | |
| R12 = (Stop) | D12 = 0.267 | | |
| R13 = 8.618 | D13 = 0.714 | N7 = 1.60342 | ν7 = 38.0 |
| R14 = −1.616 | D14 = 0.142 | N8 = 1.77250 | ν8 = 49.6 |
| R15 = −19.460 | D15 = Variable | | |
| R16 = −104.168 | D16 = 0.446 | N9 = 1.51633 | ν9 = 64.2 |
| R17 = −4.034 | D17 = 0.026 | | |
| R18 = 8.573 | D18 = 0.178 | N10 = 1.84666 | ν10 = 23.8 |
| R19 = 2.919 | D19 = 0.714 | N11 = 1.48749 | ν11 = 70.2 |
| R20 = −11.679 | D20 = 0.026 | | |
| R21 = 3.431 | D21 = 0.500 | N12 = 1.51633 | ν12 = 64.2 |
| R22 = −22.410 | D22 = 0.714 | | |
| R23 = ∞ | D23 = 0.446 | N13 = 1.51633 | ν13 = 64.2 |
| R24 = ∞ | D24 = 3.571 | N14 = 1.60342 | ν14 = 38.0 |
| R25 = ∞ | | | |

| | Focal Length | | |
|---|---|---|---|
| Variable Separation | 1.00 | 3.17 | 10.00 |
| D5 | 0.28 | 3.33 | 5.36 |
| D11 | 5.35 | 2.30 | 0.27 |
| D15 | 2.46 | 1.89 | 2.46 |

R13: Aspheric Surface:

K = 9.750 e+00   A = −4.632 e−04   B = 6.703 e−04
C = 7.613 e−05   D = 6.047 e−05

Numerical Example 4:

f = 1–10.0   Fno = 1:1.65–1.85   2ω = 56.4°–7.3°

| | | | |
|---|---|---|---|
| R1 = 10.876 | D1 = 0.321 | N1 = 1.80518 | ν1 = 25.4 |
| R2 = 5.631 | D2 = 1.160 | N2 = 1.60311 | ν2 = 60.7 |
| R3 = −32.694 | D3 = 0.035 | | |
| R4 = 6.601 | D4 = 0.571 | N3 = 1.69680 | ν3 = 55.5 |
| R5 = 15.120 | D5 = Variable | | |
| R6 = 6.050 | D6 = 0.142 | N4 = 1.88300 | ν4 = 40.8 |
| R7 = 1.679 | D7 = 0.703 | | |
| R8 = −2.707 | D8 = 0.142 | N5 = 1.69680 | ν5 = 55.5 |
| R9 = 2.918 | D9 = 0.178 | | |
| R10 = 3.235 | D10 = 0.392 | N6 = 1.84666 | ν6 = 23.8 |
| R11 = −23.215 | D11 = Variable | | |
| R12 = (Stop) | D12 = 0.267 | | |
| R13 = 112.150 | D13 = 0.714 | N7 = 1.60342 | ν7 = 38.0 |
| R14 = −1.888 | D14 = 0.142 | N8 = 1.80400 | ν8 = 46.6 |
| R15 = −6.647 | D15 = Variable | | |
| R16 = 3.724 | D16 = 0.642 | N9 = 1.48749 | ν9 = 70.2 |
| R17 = −7.678 | D17 = 0.026 | | |
| R18 = 5.683 | D18 = 0.178 | N10 = 1.84666 | ν10 = 23.8 |
| R19 = 2.652 | D19 = 0.821 | N11 = 1.48749 | ν11 = 70.2 |
| R20 = −4.896 | D20 = 0.714 | | |
| R21 = ∞ | D21 = 0.446 | N12 = 1.51633 | ν12 = 64.2 |
| R22 = ∞ | D22 = 3.571 | N13 = 1.60342 | ν13 = 38.0 |
| R23 = ∞ | | | |

| Variable Separation | Focal Length | | |
|---|---|---|---|
| | 1.00 | 3.10 | 10.00 |
| D5 | 0.19 | 3.24 | 5.27 |
| D11 | 5.35 | 2.30 | 0.27 |
| D15 | 2.88 | 2.36 | 2.88 |

R13: Aspheric Surface:

K = 9.793 e+00   A = −3.707 e−03   B = 3.379 e−03
C = −1.152 e−03   D = −4.489 e−04

R20: Aspheric Surface:

K = −1.430 e−01   A = 1.004 e−02   B = 9.089 e−04
C = −1.559 e−04   D = −2.526 e−05

Numerical Example 5:

f = 1–10.0   Fno = 1:1.65–1.8   2ω = 56.4°–7.3°

| R1 = 9.706 | D1 = 0.321 | N1 = 1.80518 | ν1 = 25.4 |
|---|---|---|---|
| R2 = 5.409 | D2 = 1.160 | N2 = 1.51633 | ν2 = 64.2 |
| R3 = 1713.793 | D3 = 0.035 | | |
| R4 = 6.342 | D4 = 0.625 | N3 = 1.69680 | ν3 = 55.5 |
| R5 = 31.759 | D5 = Variable | | |
| R6 = 4.624 | D6 = 0.142 | N4 = 1.88300 | ν4 = 40.8 |
| R7 = 1.649 | D7 = 0.722 | | |
| R8 = −2.569 | D8 = 0.142 | N5 = 1.69680 | ν5 = 55.5 |
| R9 = 2.896 | D9 = 0.178 | | |
| R10 = 3.254 | D10 = 0.392 | N6 = 1.84666 | ν6 = 23.8 |
| R11 = −34.333 | D11 = Variable | | |
| R12 = (Stop) | D12 = 0.267 | | |
| R13 = 121.593 | D13 = 0.714 | N7 = 1.61293 | ν7 = 37.0 |
| R14 = −1.968 | D14 = 0.142 | N8 = 1.77250 | ν8 = 49.6 |
| R15 = −6.912 | D15 = Variable | | |
| R16 = 3.821 | D16 = 0.642 | N9 = 1.51633 | ν9 = 64.2 |
| R17 = −5.790 | D17 = 0.026 | | |
| R18 = 5.124 | D18 = 0.178 | N10 = 1.84666 | ν10 = 23.8 |
| R19 = 2.187 | D19 = 0.535 | | |
| R20 = 2.335 | D20 = 0.821 | N11 = 1.48749 | ν11 = 70.2 |
| R21 = −4.801 | D21 = 0.714 | | |
| R22 = ∞ | D22 = 0.446 | N12 = 1.51633 | ν12 = 64.2 |
| R23 = ∞ | D23 = 3.571 | N13 = 1.60342 | ν13 = 38.0 |
| R24 = ∞ | | | |

| Variable Separation | Focal Length | | |
|---|---|---|---|
| | 1.00 | 3.08 | 10.00 |
| D5 | 0.19 | 3.24 | 5.27 |
| D11 | 5.35 | 2.30 | 0.27 |
| D15 | 2.25 | 1.75 | 2.25 |

R13: Aspheric Surface:

K = −4.352 e+03   A = −5.040 e−03   B = 1.880 e−03
C = −1.175 e−03   D = −2.798 e−04

R21: Aspheric Surface:

K = −5.510 e−00   A = 3.988 e−03   B = 5.564 e−04
C = 6.141 e−04   D = −2.209 e−04

Numerical Example 6:

f = 1–10.0   Fno = 1:1.65–1.95   2ω = 56.4°–7.3°

| R1 = 12.257 | D1 = 0.285 | N1 = 1.80518 | ν1 = 25.4 |
|---|---|---|---|
| R2 = 5.953 | D2 = 0.267 | | |
| R3 = 7.776 | D3 = 0.803 | N2 = 1.49700 | ν2 = 81.6 |
| R4 = −246.325 | D4 = 0.035 | | |
| R5 = 5.666 | D5 = 0.928 | N3 = 1.69680 | ν3 = 55.5 |
| R6 = 226.941 | D6 = Variable | | |
| R7 = 5.144 | D7 = 0.142 | N4 = 1.88300 | ν4 = 40.8 |
| R8 = 1.664 | D8 = 0.667 | | |
| R9 = −2.600 | D9 = 0.142 | N5 = 1.69680 | ν5 = 55.5 |
| R10 = 2.617 | D10 = 0.178 | | |
| R11 = 3.115 | D11 = 0.392 | N6 = 1.84666 | ν6 = 23.8 |
| R12 = −21.490 | D12 = Variable | | |
| R13 = (Stop) | D13 = 0.267 | | |
| R14 = 8.690 | D14 = 0.714 | N7 = 1.61293 | ν7 = 37.0 |
| R15 = −1.618 | D15 = 0.142 | N8 = 1.77250 | ν8 = 49.6 |
| R16 = −17.470 | D16 = Variable | | |
| R17 = −80.048 | D17 = 0.446 | N9 = 1.48749 | ν9 = 70.2 |
| R18 = −4.119 | D18 = 0.026 | | |
| R19 = 8.509 | D19 = 0.178 | N10 = 1.84666 | ν10 = 23.8 |
| R20 = 2.945 | D20 = 0.714 | N11 = 1.48749 | ν11 = 70.2 |
| R21 = −11.983 | D21 = 0.026 | | |
| R22 = 3.435 | D22 = 0.500 | N12 = 1.51633 | ν12 = 64.2 |
| R23 = −25.034 | D23 = 0.714 | | |
| R24 = ∞ | D24 = 0.446 | N13 = 1.51633 | ν13 = 64.2 |
| R25 = ∞ | D25 = 3.571 | N14 = 1.60342 | ν14 = 38.0 |
| R26 = ∞ | | | |

| Variable Separation | Focal Length | | |
|---|---|---|---|
| | 1.00 | 3.15 | 10.00 |
| D6 | 0.25 | 3.29 | 5.33 |
| D12 | 5.35 | 2.30 | 0.27 |
| D16 | 2.61 | 2.02 | 2.61 |

R14: Aspheric Surface:

K = 9.753 e+00   A = −2.024 e−05   B = −1.009 e−03
C = −2.656 e−05   D = 3.290 e−05

Numerical Example 7:

f = 1–10.0   Fno = 1:1.65–1.96   2ω = 56.4°–7.3°

| R1 = 12.989 | D1 = 0.285 | N1 = 1.80518 | ν1 = 25.4 |
|---|---|---|---|
| R2 = 6.175 | D2 = 0.257 | | |
| R3 = 7.871 | D3 = 0.803 | N2 = 1.49700 | ν2 = 81.6 |
| R4 = −80.049 | D4 = 0.089 | | |
| R5 = 5.647 | D5 = 0.857 | N3 = 1.69680 | ν3 = 55.5 |
| R6 = 85.989 | D6 = Variable | | |
| R7 = 4.788 | D7 = 0.142 | N4 = 1.88300 | ν4 = 40.8 |
| R8 = 1.628 | D8 = 0.691 | | |
| R9 = −2.589 | D9 = 0.142 | N5 = 1.69680 | ν5 = 55.5 |
| R10 = 2.635 | D10 = 0.178 | | |
| R11 = 3.131 | D11 = 0.357 | N6 = 1.84666 | ν6 = 23.8 |
| R12 = −21.153 | D12 = Variable | | |
| R13 = (Stop) | D13 = 0.267 | | |
| R14 = 8.729 | D14 = 0.678 | N7 = 1.61293 | ν7 = 37.0 |
| R15 = −1.896 | D15 = 0.046 | | |
| R16 = −1.765 | D16 = 0.142 | N8 = 1.77250 | ν8 = 49.6 |
| R17 = −12.326 | D17 = Variable | | |
| R18 = −28.412 | D18 = 0.464 | N9 = 1.48749 | ν9 = 70.2 |
| R19 = −4.142 | D19 = 0.026 | | |
| R20 = 8.004 | D20 = 0.160 | N10 = 1.84666 | ν10 = 23.8 |
| R21 = 2.872 | D21 = 0.678 | N11 = 1.48749 | ν11 = 70.2 |
| R22 = −12.333 | D22 = 0.026 | | |
| R23 = 3.713 | D23 = 0.535 | N12 = 1.51633 | ν12 = 64.2 |
| R24 = −11.186 | D24 = 0.714 | | |
| R25 = ∞ | D25 = 0.446 | N13 = 1.51633 | ν13 = 64.2 |
| R26 = ∞ | D26 = 3.571 | N14 = 1.60342 | ν14 = 38.0 |
| R27 = ∞ | | | |

| Variable Separation | Focal Length | | |
|---|---|---|---|
| | 1.00 | 3.14 | 10.00 |
| D6 | 0.25 | 3.30 | 5.33 |
| D12 | 5.35 | 2.30 | 0.27 |
| D17 | 2.49 | 1.92 | 2.49 |

R14: Aspheric Surface:

K = 9.785 e+00   A = 8.820 e−04   B = 2.131 e−03
C = −2.658 e−05   D = 2.341 e−04

Numerical Example 8:

f = 1–8.0   Fno = 1:1.65–2   2ω = 53.1°–7.2°

| R1 = 14.585 | D1 = 0.300 | N1 = 1.80518 | ν1 = 25.4 |
|---|---|---|---|
| R2 = 4.950 | D2 = 1.000 | N2 = 1.60311 | ν2 = 60.7 |
| R3 = −12.965 | D3 = 0.033 | | |

-continued

| | | | |
|---|---|---|---|
| R4 = 3.950 | D4 = 0.500 | N3 = 1.69680 | v3 = 55.5 |
| R5 = 9.147 | D5 = Variable | | |
| R6 = 7.777 | D6 = 0.150 | N4 = 1.88300 | v4 = 40.8 |
| R7 = 1.459 | D7 = 0.538 | | |
| R8 = −1.730 | D8 = 0.133 | N5 = 1.69680 | v5 = 55.5 |
| R9 = 2.114 | D9 = 0.383 | N6 = 1.84666 | v6 = 23.8 |
| R10 = −8.785 | D10 = Variable | | |
| R11 = (Stop) | D11 = 0.250 | | |
| R12 = 7.249 | D12 = 0.666 | N7 = 1.62588 | v7 = 35.7 |
| R13 = −1.513 | D13 = 0.150 | N8 = 1.77250 | v8 = 49.6 |
| R14 = −8.358 | D14 = Variable | | |
| R15 = −107.336 | D15 = 0.416 | N9 = 1.51633 | v9 = 64.2 |
| R16 = −3.600 | D16 = 0.025 | | |
| R17 = 7.512 | D17 = 0.166 | N10 = 1.80518 | v10 = 25.4 |
| R18 = 2.098 | D18 = 0.666 | N11 = 1.48749 | v11 = 70.2 |
| R19 = −12.762 | D19 = 0.025 | | |
| R20 = 3.046 | D20 = 0.550 | N12 = 1.48749 | v12 = 70.2 |
| R21 = −7.730 | D21 = 0.666 | | |
| R22 = ∞ | D22 = 0.416 | N13 = 1.51633 | v13 = 64.2 |
| R23 = ∞ | D23 = 3.000 | N14 = 1.60342 | v14 = 38.0 |
| R24 = ∞ | | | |

| | Focal Length | | |
|---|---|---|---|
| Variable Separation | 1.00 | 2.87 | 8.00 |
| D5 | 0.25 | 2.23 | 3.55 |
| D10 | 3.55 | 1.57 | 0.25 |
| D14 | 2.00 | 1.53 | 2.00 |

R12: Aspheric Surface:

K = 2.994 e+02   A = −1.033 e−03   B = −1.860 e−04
C = −6.948 e−04  D = −1.434 e−04

R21: Aspheric Surface:

K = −1.144 e−02  A = 7.630 e−04    B = −1.593 e−03
C = −3.781 e−05  D = 1.670 e−04

TABLE 1

| | Numerical Example | | | | | | | |
|---|---|---|---|---|---|---|---|---|
| Condition | 1 | 2 | 3 | 4 | 5 | 6 | 7 | 8 |
| (1) | 6.827 | 3.808 | 41.224 | 13.620 | 7.945 | 16.038 | 10.869 | 4.068 |
| (2) | 3.308 | 3.597 | 3.963 | 3.772 | 3.491 | 4.053 | 3.597 | 3.127 |
| (3) | −0.492 | −0.578 | −0.560 | −0.560 | −0.560 | −0.560 | −0.560 | −0.75 |
| (4) | 8.821 | 9.194 | 8.647 | 8.647 | 8.647 | 8.361 | 8.361 | 6.105 |
| (5) | 1.705 | 1.586 | 1.773 | 1.723 | 1.778 | 1.760 | 1.786 | 1.684 |
| (6) | −0.169 | −0.128 | −0.351 | −0.290 | −0.237 | −0.325 | −0.298 | −0.221 |

According to the present embodiment, by using the four constituent lens units as a whole, giving the ranges for the refractive powers of these lens units and employing a focusing configuration of moving the fourth lens unit, as has been described above, it is made possible to achieve good correction of aberrations throughout the entire zooming range in such a manner that the bulk and size of the entire system are minimized. Hence, a zoom lens of the rear focus type which has a large relative aperture, whose back focal distance is sufficiently long, and which maintains good stability of aberration correction during focusing can be realized.

Another embodiment of the invention where improvements are made over the zoom lens described above is described below.

FIGS. 18 to 22 in lens block diagram show the numerical examples 9 to 13 of zoom lenses of the invention.

In these figures, reference character L1 denotes a first lens unit of positive refractive power, reference character L2 denotes a second lens unit of negative refractive power, reference character L3 denotes a third lens unit of positive refractive power and reference character L4 denotes a fourth lens unit of positive refractive power. Reference character SP denotes an aperture stop arranged in front of the third lens unit. Reference character G denotes a glass block such as a color separation prism, face plate, or filter, and reference character IP denotes an image plane.

This zoom lens of the rear focus type comprises, from front to rear, the first lens unit of positive refractive power, the second lens unit of negative refractive power, the third lens unit of positive refractive power having the stop and the fourth lens unit of positive refractive power, totaling four lens units, wherein during zooming from the wide-angle end to the telephoto end, the second lens unit is moved toward the image side, while simultaneously moving the stop and the third lens unit in unison so as to have a locus convex toward the object side, and the fourth lens unit, too, so as to have a locus convex toward the object side, and during focusing, the fourth lens unit is moved, and wherein letting the focal length of the i-th lens unit be denoted by Fi, the following condition is satisfied:

$$2.5 < F3/F4 \quad \quad \ldots (7)$$

The inequality of condition (7) is concerned with the ratio of the focal lengths of the third and fourth lens units and has an aim to achieve improvements of the compact form of the section that follows the stop, while still permitting good optical performance to be sustained with the back focal distance being made sufficiently long. When the focal length of the third lens unit is shorter than the lower limit of the condition (7), it becomes difficult to correct the variation of spherical aberration with zooming or focusing. Another problem arises in that the sufficient back focal distance can hardly be secured, or that the amount of movement for zooming and focusing of the fourth lens unit increases greatly. Therefore, the variation of aberrations with zooming or focusing is increased objectionably.

In the present embodiment, to further improve the compromise between the requirements of minimizing the bulk and size of the entire lens system and of assuring high optical performance over the entire area of the image frame, it is preferred to satisfy at least one of the following conditions or features.

The following condition is satisfied:

$$-0.70 < Fw/F2 < -0.4 \quad \quad \ldots (8)$$

where Fw is the shortest focal length of the entire lens system.

The inequalities of condition (8) are concerned with the ratio of the focal length for the wide-angle end of the entire system to the focal length of the second lens unit. When the focal length of the second lens unit is shorter than the upper limit of the condition (8), the Petzval sum increases in the under direction and the resultant inclination of the image focus and other aberrations become difficult to correct well. Conversely when the focal length of the second lens unit is longer than the lower limit, the total zooming movement of the second lens unit increases, giving rise to a problem in that the front lens members get too large a diameter.

Another preferred feature is that the axial light beam, when emerging from the third lens unit, is made nearly afocal or slightly divergent. With the help of this feature, the back focal distance and the exit pupil distance can be increased with an advantage of as far suppressing the variation of aberrations with zooming or focusing as possible.

By the way, suppose the zoom type used in the present embodiment is combined with the arrangement of the stop in between, for example, the third and fourth lens units, then because the entrance pupil lies deep in from the first lens unit, it would result that the height of incidence of the off-axial light beam on the first lens unit is highest in the middle zooming region at a nearer position to the wide-angle end.

Yet another feature in the present embodiment is, therefore, that the stop is put either on the object side or in the interior of the third lens unit, and is made movable in unison with the third lens unit, while depicting a locus convex toward the object side, as zooming from the wide-angle end to the telephoto end. Thus, the entrance pupil is brought to a nearer position to the first lens unit so that the zooming position at which the height of incidence is highest comes nearer to the wide-angle end. By this, a valuable decrease of the effective diameter of the first lens unit is attained.

It should be noted in the present embodiment that the stop and the third lens unit not only move in the locus convex toward the object side, but also are made to reciprocate almost perfectly, thus assisting in achieving minimization of the diameter of the front lens members and a great increase of the maximum image angle at once with ease.

A further feature in the present embodiment is that with regard to the minimization of the size of the entire lens system, it is preferred to satisfy the following condition:

$$3.5 < Bfw/Fw < 6.0 \qquad \ldots (9)$$

where Bfw is the back focal distance (as measured without the glass block, filter or like part denoted by "G" in the practical examples) in the wide-angle end with an object at infinity.

The inequalities (9) are the necessary ones to advantageously minimize the size of the entire lens system. When the lower limit is exceeded, it results not only that the filter, the color separation prism or the like block is hardly inserted, but also that the exit pupil is rather short. In application of the invention to, for example, a video camera, therefore, the formation of an image onto the image sensor deviates from the telecentric system. When the upper limit is exceeded, the size comes to unduly increase.

With further regard to minimization of the diameter of the front lens members, it is preferred to satisfy the following condition:

$$6.0 < F1/Fw < 15.0 \qquad \ldots (10)$$

These inequalities are concerned with the object point for the second lens unit, or its magnification. To set the entire lens system to a minimum, it is preferred that the second lens unit moves across the unity of magnification. If the unity of magnification occurs at a middle point in the zooming range, the fourth lens unit when zooming moves back and forth in almost equal distances. Therefore, a great increase of the zooming range becomes possible with a highest space efficiency.

In more detail, when the upper limit of the condition (10) is exceeded, the second lens unit gets a far object point with the result of a low magnification of the second lens unit. Thus, it becomes difficult to produce advantages when achieving the minimization. Further, the separation between the first and second lens units increases to increase the difficulty of achieving the minimization of the size. When the lower limit is exceeded, the magnification of the second lens unit increases to increase the difficulty of achieving the great increase of the zooming range.

Now, how much small the interval el between the principal points of the first and second lens units can be made is one of the important points when the maximum image angle is increased. To this purpose, for the first lens unit in a specific example, the following construction and arrangement of its parts are preferable:

The first lens unit comprises, from front to rear, a negative lens of the meniscus form convex toward the object side followed after an air space by a positive lens whose front surface is convex, and another positive lens whose front surface is convex, wherein the air lens defined by the negative and positive lenses has a negative refractive power.

With the use of such constituent parts, the rear principal point of the first lens unit is set nearer to the second lens unit. Thus, the principal point interval e1 between the first and second lens units can be taken short. This is advantageous at increasing the maximum image angle.

The second lens unit is even made to assist in shortening the principal point interval e1 in the wide-angle end. For this purpose, the second lens unit is formed with its front principal point set in a more front position. This is desired for increasing the maximum image angle.

In a specific example, the second lens unit comprises, from front to rear, a negative meniscus lens convex toward the object side and a bi-concave negative lens followed after an air space by a positive lens. By this air separation, the front principal point of the second lens unit is brought to a nearer position to the first lens unit. So, it is easier to take the short principal point interval el on the wide-angle side. This is advantageous at increasing the maximum image angle.

Now, as the total movement of the stop and the third lens unit becomes rather longer, spherical aberration varies with zooming at a rapidly higher rate, particularly in the middle region of the zooming range. So, much over-correction of spherical aberration results. To remove this, it is preferred to introduce at least one aspheric surface into the third lens unit. In a specific example, the aspheric surface is preferably formed to such shape that the positive refractive power gets progressively weaker toward the margin of the lens, or that the negative refractive power gets progressively stronger.

It is also preferred to apply aspheric sphere to at least one lens surface in the fourth lens unit, so that coma is well corrected.

Next, numerical examples 9 to 13 of the invention are shown. The values of the factors in the above-described conditions (7) to (10) for the numerical examples 9 to 13 are listed in Table-2. The shape of an aspheric surface is expressed in the coordinates with an X axis in the axial direction and an H axis in the direction perpendicular to the optical axis, the direction in which light advances being taken as positive, by the following equation:

$$X = (1/R)H^2 / (1 + \sqrt{1 - (1+K)(H/R)^2}) + AH^4 + BH^6 + CH^8 + DH^{10} + EH^{12}$$

where R is the radius of the osculating sphere, and K, A, B, C, D and E are the aspheric coefficients.

Numerical Example 9:

$f = 1–12.65 \quad Fno = 1:1.6–1.9 \quad 2\omega = 66.2°–5.9°$

| | | | |
|---|---|---|---|
| R1 = 35.931 | D1 = 0.391 | N1 = 1.80518 | ν1 = 25.4 |
| R2 = 8.393 | D2 = 0.342 | | |
| R3 = 12.050 | D3 = 1.239 | N2 = 1.69680 | ν2 = 55.5 |
| R4 = −36.035 | D4 = 0.043 | | |
| R5 = 6.370 | D5 = 1.043 | N3 = 1.69680 | ν3 = 55.5 |
| R6 = 58.643 | D6 = Variable | | |
| R7 = 9.634 | D7 = 0.173 | N4 = 1.88300 | ν4 = 40.8 |
| R8 = 1.857 | D8 = 0.844 | | |
| R9 = −3.185 | D9 = 0.152 | N5 = 1.69680 | ν5 = 55.5 |
| R10 = 3.140 | D10 = 0.217 | | |
| R11 = 3.696 | D11 = 0.500 | N6 = 1.84666 | ν6 = 23.8 |
| R12 = −21.979 | D12 = Variable | | |
| R13 = (Stop) | D13 = 0.326 | | |
| R14 = −31.104 | D14 = 0.152 | N7 = 1.60311 | ν7 = 60.7 |
| R15 = 4.653 | D15 = 0.264 | | |
| R16 = −9.342 | D16 = 0.434 | N8 = 1.60342 | ν8 = 38.0 |
| R17 = −4.592 | D17 = 0.652 | | |
| R18 = 4.592 | D18 = 0.239 | N9 = 1.60342 | ν9 = 38.0 |
| R19 = −2.721 | D19 = 0.195 | N10 = 1.78590 | ν10 = 44.2 |
| R20 = −51.472 | D20 = Variable | | |
| R21 = 47.709 | D21 = 0.652 | N11 = 1.51633 | ν11 = 64.2 |
| R22 = −4.925 | D22 = 0.032 | | |
| R23 = 11.157 | D23 = 0.195 | N12 = 1.80518 | ν12 = 25.4 |
| R24 = 2.984 | D24 = 1.130 | N13 = 1.48749 | ν13 = 70.2 |
| R25 = −23.396 | D25 = 0.032 | | |
| R26 = 5.008 | D26 = 0.739 | N14 = 1.48749 | ν14 = 70.2 |
| R27 = −15.870 | D27 = 0.869 | | |
| R28 = ∞ | D28 = 0.543 | N15 = 1.51633 | ν15 = 64.2 |
| R29 = ∞ | D29 = 4.347 | N16 = 1.60342 | ν16 = 38.0 |
| R30 = ∞ | | | |

| | Focal Length | | |
|---|---|---|---|
| Variable Separation | 1.00 | 3.45 | 12.65 |
| D6 | 0.31 | 3.95 | 6.37 |
| D12 | 6.38 | 1.96 | 0.33 |
| D20 | 1.84 | 1.77 | 1.84 |

Numerical Example 10:

$f = 1–12.65 \quad Fno = 1:1.8–1.9 \quad 2\omega = 66.2°–5.9°$

| | | | |
|---|---|---|---|
| R1 = 35.975 | D1 = 0.391 | N1 = 1.80518 | ν1 = 25.4 |
| R2 = 8.396 | D2 = 0.272 | | |
| R3 = 11.644 | D3 = 1.130 | N2 = 1.69680 | ν2 = 55.5 |
| R4 = −37.605 | D4 = 0.043 | | |
| R5 = 6.400 | D5 = 1.195 | N3 = 1.69680 | ν3 = 55.5 |
| R6 = 60.254 | D6 = Variable | | |
| R7 = 8.615 | D7 = 0.173 | N4 = 1.88300 | ν4 = 40.8 |
| R8 = 1.785 | D8 = 0.823 | | |
| R9 = −3.019 | D9 = 0.152 | N5 = 1.69680 | ν5 = 55.5 |
| R10 = 3.112 | D10 = 0.217 | | |
| R11 = 3.676 | D11 = 0.500 | N6 = 1.84666 | ν6 = 23.8 |
| R12 = −16.603 | D12 = Variable | | |
| R13 = (Stop) | D13 = 1.413 | | |
| R14 = 5.119 | D14 = 1.043 | N7 = 1.60342 | ν7 = 38.0 |
| R15 = −3.506 | D15 = 0.195 | N8 = 1.88300 | ν8 = 40.8 |
| R16 = −46.563 | D16 = Variable | | |
| R17 = 58.011 | D17 = 0.434 | N9 = 1.51633 | ν9 = 64.2 |
| R18 = −5.449 | D18 = 0.032 | | |
| R19 = 7.785 | D19 = 0.195 | N10 = 1.80518 | ν10 = 25.4 |
| R20 = 2.794 | D20 = 0.869 | N11 = 1.48749 | ν11 = 70.2 |
| R21 = −14.358 | D21 = 0.032 | | |
| R22 = 3.399 | D22 = 0.434 | N12 = 1.48749 | ν12 = 70.2 |
| R23 = 23.023 | D23 = 0.869 | | |
| R24 = ∞ | D24 = 0.543 | N13 = 1.51633 | ν13 = 64.2 |
| R25 = ∞ | D25 = 3.260 | N14 = 1.60342 | ν14 = 38.0 |
| R26 = ∞ | | | |

| | Focal Length | | |
|---|---|---|---|
| Variable Separation | 1.00 | 3.43 | 12.65 |
| D6 | 0.17 | 3.81 | 6.23 |
| D12 | 6.38 | 1.96 | 0.33 |
| D16 | 2.11 | 2.05 | 2.11 |

| Aspheric Coefficients: Surface R14 | K = 2.597 × 10$^{-2}$ |
|---|---|
| | A = −9.137 × 10$^{-4}$ |
| | B = 1.986 × 10$^{-4}$ |
| | C = −1.129 × 10$^{-4}$ |
| | D = −1.168 × 10$^{-5}$ |

Numerical Example 11:

$f = 1–12.65 \quad Fno = 1:1.8–1.9 \quad 2\omega = 66.2°–5.9°$

| | | | |
|---|---|---|---|
| R1 = 36.928 | D1 = 0.391 | N1 = 1.80518 | ν1 = 25.4 |
| R2 = 8.368 | D2 = 0.312 | | |
| R3 = 11.877 | D3 = 1.130 | N2 = 1.69680 | ν2 = 55.5 |
| R4 = −36.615 | D4 = 0.043 | | |
| R5 = 6.411 | D5 = 1.195 | N3 = 1.69680 | ν3 = 55.5 |
| R6 = 66.685 | D6 = Variable | | |
| R7 = 9.469 | D7 = 0.173 | N4 = 1.88300 | ν4 = 40.8 |
| R8 = 1.788 | D8 = 0.820 | | |
| R9 = −3.019 | D9 = 0.152 | N5 = 1.69680 | ν5 = 55.5 |
| R10 = 3.123 | D10 = 0.217 | | |
| R11 = 3.695 | D11 = 0.500 | N6 = 1.84666 | ν6 = 23.8 |
| R12 = −14.962 | D12 = Variable | | |
| R13 = (Stop) | D13 = 1.413 | | |
| R14 = 5.247 | D14 = 0.652 | N7 = 1.60342 | ν7 = 38.0 |
| R15 = 17.260 | D15 = Variable | | |
| R16 = −13.719 | D16 = 0.434 | N8 = 1.51633 | ν8 = 64.2 |
| R17 = −5.243 | D17 = 0.032 | | |
| R18 = 7.556 | D18 = 0.195 | N9 = 1.80518 | ν9 = 25.4 |
| R19 = 2.779 | D19 = 0.869 | N10 = 1.48749 | ν10 = 70.2 |
| R20 = −23.427 | D20 = 0.032 | | |
| R21 = 3.644 | D21 = 0.434 | N11 = 1.48749 | ν11 = 70.2 |
| R22 = −16.329 | D22 = 0.869 | | |
| R23 = ∞ | D23 = 0.543 | N12 = 1.51633 | ν12 = 64.2 |
| R24 = ∞ | D24 = 3.260 | N13 = 1.60342 | ν13 = 38.0 |
| R25 = ∞ | | | |

| | Focal Length | | |
|---|---|---|---|
| Variable Separation | 1.00 | 3.42 | 12.65 |
| D6 | 0.24 | 3.87 | 6.29 |
| D12 | 6.38 | 1.96 | 0.33 |
| D15 | 2.37 | 2.31 | 2.37 |

| Aspheric Coefficients: Surface R14 | K = −2.612 × 10$^{-1}$ |
|---|---|
| | A = −2.388 × 10$^{-3}$ |
| | B = 2.364 × 10$^{-4}$ |
| | C = −6.451 × 10$^{-5}$ |
| | D = −3.051 × 10$^{-5}$ |

Numerical Example 12:

$f = 1–12.65 \quad Fno = 1:1.8–1.9 \quad 2\omega = 66.2°–5.9°$

| | | | |
|---|---|---|---|
| R1 = 25.907 | D1 = 0.391 | N1 = 1.84666 | ν1 = 23.8 |
| R2 = 8.416 | D2 = 0.312 | | |
| R3 = 12.008 | D3 = 1.130 | N2 = 1.69680 | ν2 = 55.5 |
| R4 = −45.235 | D4 = 0.043 | | |
| R5 = 6.531 | D5 = 1.195 | N3 = 1.69680 | ν3 = 55.5 |
| R6 = 73.064 | D6 = Variable | | |
| R7 = 8.118 | D7 = 0.173 | N4 = 1.88300 | ν4 = 40.8 |
| R8 = 1.730 | D8 = 0.861 | | |
| R9 = −2.748 | D9 = 0.152 | N5 = 1.69680 | ν5 = 55.5 |
| R10 = 3.014 | D10 = 0.217 | | |
| R11 = 3.614 | D11 = 0.434 | N6 = 1.84666 | ν6 = 23.8 |
| R12 = −11.227 | D12 = Variable | | |
| R13 = (Stop) | D13 = 1.413 | | |
| R14 = 5.282 | D14 = 0.434 | N7 = 1.60311 | ν7 = 60.7 |
| R15 = 15.536 | D15 = Variable | | |

-continued

| | | | |
|---|---|---|---|
| R16 = −5.179 | D16 = 0.434 | N8 = 1.51742 | ν8 = 52.4 |
| R17 = −4.751 | D17 = 0.032 | | |
| R18 = 6.988 | D18 = 0.195 | N9 = 1.80518 | ν9 = 25.4 |
| R19 = 3.039 | D19 = 0.760 | N10 = 1.48749 | ν10 = 70.2 |
| R20 = −5.586 | D20 = 0.032 | | |
| R21 = 3.239 | D21 = 0.543 | N11 = 1.48749 | ν11 = 70.2 |
| R22 = 13.677 | D22 = 0.869 | | |
| R23 = ∞ | D23 = 0.543 | N12 = 1.51633 | ν12 = 64.2 |
| R24 = ∞ | D24 = 3.260 | N13 = 1.60342 | ν13 = 38.0 |
| R25 = ∞ | | | |

| | Focal Length | | |
|---|---|---|---|
| Variable Separation | 1.00 | 3.42 | 12.65 |
| D6 | 0.17 | 3.80 | 6.22 |
| D12 | 6.38 | 1.96 | 0.33 |
| D15 | 2.54 | 2.49 | 2.54 |

Aspheric Coefficients: Surface R14
$K = 3.610 \times 10^{-3}$
$A = -1.746 \times 10^{-3}$
$B = 4.681 \times 10^{-5}$
$C = 4.104 \times 10^{-5}$
$D = -3.320 \times 10^{-5}$ Numerical Example 13:

$f = 1-10 \quad Fno = 1:1.6-1.7 \quad 2\omega = 60.0°-6.6°$

| | | | |
|---|---|---|---|
| R1 = 12.083 | D1 = 0.346 | N1 = 1.80518 | ν1 = 25.4 |
| R2 = 5.692 | D2 = 1.538 | N2 = 1.60311 | ν2 = 60.7 |
| R3 = −26.824 | D3 = 0.038 | | |
| R4 = 5.854 | D4 = 0.653 | N3 = 1.71300 | ν3 = 53.8 |
| R5 = 15.975 | D5 = Variable | | |
| R6 = 9.280 | D6 = 0.173 | N4 = 1.88300 | ν4 = 40.8 |
| R7 = 1.826 | D7 = 0.685 | | |
| R8 = −2.629 | D8 = 0.158 | N5 = 1.69680 | ν5 = 55.5 |
| R9 = 2.658 | D9 = 0.192 | | |
| R10 = 3.057 | D10 = 0.403 | N6 = 1.84666 | ν6 = 23.8 |
| R11 = 145.551 | D11 = Variable | | |
| R12 = −13.497 | D12 = 0.134 | N7 = 1.60311 | ν7 = 60.7 |
| R13 = 4.849 | D13 = 0.192 | | |
| R14 = −10.238 | D14 = 0.384 | N8 = 1.60342 | ν8 = 38.0 |
| R15 = −4.381 | D15 = 0.288 | | |
| R16 = (Stop) | D16 = 0.288 | | |
| R17 = 4.709 | D17 = 0.961 | N9 = 1.60342 | ν9 = 38.0 |
| R18 = −2.543 | D18 = 0.173 | N10 = 1.78590 | ν10 = 44.2 |
| R19 = −52.529 | D19 = Variable | | |
| R20 = 24.257 | D20 = 0.576 | N11 = 1.51633 | ν11 = 64.2 |
| R21 = −5.630 | D21 = 0.028 | | |
| R22 = 10.997 | D22 = 0.211 | N12 = 1.80518 | ν12 = 25.4 |
| R23 = 3.332 | D23 = 0.961 | N13 = 1.48749 | ν13 = 70.2 |
| R24 = −8.681 | D24 = 0.028 | | |
| R25 = 4.292 | D25 = 0.576 | N14 = 1.48749 | ν14 = 70.2 |
| R26 = 128.098 | D26 = 0.769 | | |
| R27 = ∞ | D27 = 0.384 | N15 = 1.51633 | ν15 = 64.2 |
| R28 = ∞ | D28 = 3.846 | N16 = 1.60342 | ν16 = 38.0 |
| R29 = ∞ | | | |

| | Focal Length | | |
|---|---|---|---|
| Variable Separation | 1.00 | 3.05 | 10.00 |
| D5 | 0.19 | 2.82 | 4.57 |
| D11 | 4.67 | 1.67 | 0.29 |
| D19 | 3.14 | 2.89 | 3.14 |

TABLE 2

| | Numerical Example | | | | |
|---|---|---|---|---|---|
| Condition | 9 | 10 | 11 | 12 | 13 |
| (7) F3/F4 | 3.889 | 2.823 | 3.003 | 76.718 | 9.645 |
| (8) Fw/F2 | −0.541 | −0.541 | −0.541 | −0.541 | −0.650 |
| (9) Bfw/Fw | 4.911 | 4.002 | 3.995 | 4.124 | 4.812 |
| (10) F1/Fw | 9.333 | 9.333 | 9.333 | 9.333 | 7.712 |

Another embodiment of the invention where further improvements are made is described below.

FIGS. 28 to 31 in lens block diagrams show numerical examples 14 to 17 of zoom lenses of the invention. FIGS. 32(A) and 32(B) to FIGS. 35(A) and 35(B) show the aberration curves.

In these figures, reference character L1 denotes a first lens unit of positive refractive power, reference character L2 denotes a second lens unit of negative refractive power, reference character L3 denotes a third lens unit of positive refractive power, reference character L4 denotes a fourth lens unit of positive refractive power and reference character L5 denotes a fifth lens unit of positive refractive power. Reference character SP denotes an aperture stop arranged within the third lens unit or in front of the third lens unit. Reference character G denotes a glass block such as color separation prism, face plate or filter. Reference character IP denotes an image plane.

In the present embodiment, a zoom lens of the rear focus type comprises, from front to rear, the first lens unit of positive refractive power, the second lens unit of negative refractive power, the third lens unit of positive refractive power having the stop, the fourth lens unit of positive refractive power and the fifth lens unit of positive refractive power, wherein during zooming from the wide-angle end to the telephoto end, the second lens unit is moved toward the image side and, at the same time, the stop and the third lens unit are moved in unison, while simultaneously moving the fourth lens unit to compensate for the image shift, and during focusing, the fourth lens unit is moved.

In such a manner, focusing in the present embodiment is performed by using the fourth lens unit. As compared with the use of the first lens unit for focusing purposes, or the so-called front focus type, it is, therefore, made easier to secure the light beam going to the corners of the image frame when shooting an object at the minimum distance with the setting in the wide-angle side. With the help of this, the effective diameter of the front or first lens unit is shortened.

Another feature is that the aperture stop is positioned either within the third lens unit or in between the second and third lens units. When zooming, the stop is moved in unison with the third lens unit, as described before. By this, the variation of aberrations with zooming is lessened. By shortening the separations between the stop and the preceding lens units, it is made easier to achieve the reduction of the effective diameter of the first lens unit.

If, in this zoom type, the stop lies in between, for example, the third and fourth lens units, as this means that the entrance pupil lies deep in from the first lens unit, the maximum possible height of incidence of the off-axial light beam on the first lens unit would occur in the middle zooming region at a nearer position to the wide-angle end.

So, in the invention, the stop is arranged either in the interior of the third lens unit or on the object side of the third lens unit. By this, when zooming from the wide-angle end to the telephoto end, the stop is moved in unison with the third lens unit so as to have a locus convex toward the object side. Thus, the entrance pupil takes its place close to the first lens unit. In turn, the maximum possible height of incidence occurs at or near the wide-angle end. By this, the effective diameter of the first lens unit is reduced advantageously.

In connection with their convex locus of motion toward the object side, it should be noted that, in the invention, the stop and the third lens unit are made to reciprocate almost perfectly. This assists in easily achieving the minimization of the diameter of the front lens members and the great increase of the maximum image angle.

To achieve further improvements of the compromise between the requirements of minimizing the bulk and size of the entire lens system and of securing high optical performance over the entire area of the image frame, it is preferred to satisfy at least one of the following conditions or features.

Letting the focal length of the i-th lens unit be denoted by Fi, the following condition is satisfied:

$$2.5<F3/F4 \quad \ldots (11)$$

The inequality of condition (11) has an aim to prevent the entire lens system from unduly increasing in the bulk and size, while still permitting good optical performance to be maintained throughout the entire zooming range, thereby obtaining a zoom lens of the rear focus type which has a long back focal distance and is of simple form.

That is, the condition (11) is concerned with the focal lengths of the third and fourth lens units and has an aim to sustain the good optical performance when to make a sufficiently long back focal distance, while still permitting improvements of the compact form of that section which follows the stop to be achieved. When the lower limit of the condition (11) is exceeded, as this means that the focal length of the third lens unit is too short, it becomes difficult to correct the variation of spherical aberration with zooming or focusing. Another problem arises in that the sufficient back focal distance becomes difficult to secure, or in that the amount of movement of the fourth lens unit increases to increase the variation of aberrations with zooming or focusing.

Another feature is that, letting the shortest focal length of the entire lens system be denoted by Fw, the condition $$-0.8<Fw/F2<-0.4 \quad \ldots (12)$$

$$0.1<F4/F5<1.2 \quad \ldots (13)$$

are satisfied.

The inequalities of condition (12) are concerned with the ratio of the focal length for the wide-angle end of the entire lens system to the focal length of the second lens unit. When the upper limit of the condition (12) is exceeded, as this means that the focal length of the second lens unit is too short, the Petzval sum increases in the under direction. The resultant inclination of the image focus and other aberrations become difficult to correct well. Conversely when the lower limit is exceeded, as this means that the focal length of the second lens unit is too long, the total zooming movement of the second lens unit increases largely, giving rise to a problem in that the front lens members get too large a diameter.

The inequalities of condition (13) are concerned with the ratio of the focal lengths of the fourth and fifth lens units and have an aim to make a sufficiently long back focal distance while still permitting improvements of the compact form of that section which follows the stop to be achieved, and nonetheless to sustain the good optical performance. When the lower limit of the condition (13) is exceeded, as this means that the focal length of the fifth lens unit is too long and the focal length of the fourth lens unit is too short, it becomes difficult to correct well spherical aberration and others in such a manner that the sufficient back focal distance is secured. Conversely when the upper limit is exceeded, as this means that the focal length of the fourth lens unit is too long, a problem arises in that the amount of movement of the fourth lens unit during zooming and during focusing increases greatly. This is accompanied with another problem that the variation of aberrations with zooming or focusing increases greatly.

Also, in the present embodiment, the axial light beam when emerging from the third lens unit is made almost afocal or slightly divergent, thereby making it possible to advantageously increase the back focal distance and the exit pupil, while as far suppressing the variation of aberrations with zooming or focusing as possible.

With regard to a valuable minimization of the diameter of the front lens members, it is preferred that the first lens unit is constructed as comprising, from front to rear, a negative first lens of meniscus form convex toward the object side followed after an air separation by a positive second lens having a convex surface facing the object side and further a positive third lens having a convex surface facing the object side, wherein the air lens defined by the first and second lenses has a negative refractive power.

Further with regard to the minimization of the size of the entire lens system, it is preferred to satisfy the following condition:

$$3.5<Bfw/Fw<6.0 \quad \ldots (14)$$

where Bfw is the back focal distance in the wide-angle end with an object at infinity (without the "G" such as glass block or filter in the specific examples).

These inequalities of condition (14) are the necessary one to advantageously minimize the size of the entire lens system. When the lower limit is exceeded, the filter or like block not only can hardly be inserted, but also the exit pupil becomes rather short. In application of the invent ion to, for example, a video camera, therefore, the formation of an image onto the image sensor comes to deviate from the telecentric system. When the upper limit is exceeded, a large size results.

To minimize the diameter of the front lens members, it is preferred also to satisfy the following condition:

$$6.0<F1/Fw<15.0 \quad \ldots (15)$$

These inequalities are concerned with the object point for the second lens unit, that is, its magnification. To set the entire lens system to a minimum, it is preferred that the second lens unit when zooming moves across the unity of magnification. If the unity of magnification occurs at the middle region, the locus of zooming movement of the fourth lens unit takes an almost doubled form, making it possible to obtain the high zoom ratio with the maximum space efficiency.

In more detail, when the upper limit of this condition (15) is exceeded, the second lens unit is given a far object point, causing the magnification of the second lens unit to become low. Therefore, it becomes difficult to obtain the valuable minimization. Further, the separation between the first and second lens units increases to increase the difficulty of achieving the minimization of the bulk and size. When the lower limit is exceeded, the magnification of the second lens unit increases to increase the difficulty of achieving the valuable increase of the zoom ratio.

Also, the zoom lens of the present embodiment is made included with an aspherical lens. By this, it is made possible to further improve the performance, increase the speed in F-number, and reduce the number of constituent lens elements.

Particularly when the aspherical lens is used in the fourth lens unit, a valuable decrease of the number of constituent lens elements becomes possible. At the same time, it becomes possible to advantageously correct spherical aberration by the aspheric surface.

Further, by using another aspherical lens in the fifth lens unit, it becomes possible to advantageously correct coma and others.

For the second lens unit, it is preferred, from the standpoint of the minimum variation of aberrations with zooming, that it comprises, from front to rear, a negative first lens of meniscus form convex toward the object side, a negative second lens of bi-convex form and a positive third lens.

Next, numerical examples 14 to 17 of the invention are shown. The values of the factors in the above-described conditions (11) to (15) for the numerical examples 14 to 17 are also listed in a Table-3. The expression of the aspheric surface is the same as described before.

Numerical Example 14:

f = 1–10.0    Fno = 1:1.65    2ω = 60.0°–6.6°

| | | | |
|---|---|---|---|
| R1 = 16.764 | D1 = 0.365 | N1 = 1.80518 | v1 = 25.4 |
| R2 = 6.729 | D2 = 1.500 | N2 = 1.60311 | v2 = 60.7 |
| R3 = −27.650 | D3 = 0.038 | | |
| R4 = 6.196 | D4 = 0.730 | N3 = 1.71300 | v3 = 53.8 |
| R5 = 18.529 | D5 = Variable | | |
| R6 = 8.884 | D6 = 0.173 | N4 = 1.88300 | v4 = 40.8 |
| R7 = 1.979 | D7 = 0.923 | | |
| R8 = −2.438 | D8 = 0.173 | N5 = 1.69680 | v5 = 55.5 |
| R9 = 2.653 | D9 = 0.576 | N6 = 1.84666 | v6 = 23.8 |
| R10 = −22.105 | D10 = Variable | | |
| R11 = 100.867 | D11 = 0.134 | N7 = 1.60311 | v7 = 60.7 |
| R12 = 2.619 | D12 = 0.769 | | |
| R13 = (Stop) | D13 = 0.288 | | |
| R14 = 5.736 | D14 = 0.769 | N8 = 1.60342 | v8 = 38.0 |
| R15 = −7.212 | D15 = Variable | | |
| R16 = 14.834 | D16 = 0.653 | N9 = 1.51633 | v9 = 64.2 |
| R17 = −7.247 | D17 = 0.028 | | |
| R18 = 8.312 | D18 = 0.173 | N10 = 1.80518 | v10 = 25.4 |
| R19 = 3.021 | D19 = 1.153 | N11 = 1.48749 | v11 = 70.2 |
| R20 = −6.831 | D20 = Variable | | |
| R21 = 4.127 | D21 = 0.500 | N12 = 1.48749 | v12 = 70.2 |
| R22 = 8.802 | D22 = 0.769 | | |
| R23 = ∞ | D23 = 0.480 | N13 = 1.51633 | v13 = 64.2 |
| R24 = ∞ | D24 = 3.846 | N14 = 1.60342 | v14 = 38.0 |
| R25 = ∞ | | | |

Aspheric Coefficients: Surface R14    $K = -6.822 \times 10^{-2}$
$A = 1.348 \times 10^{-4}$
$B = 1.975 \times 10^{-5}$
$C = 7.452 \times 10^{-5}$
$D = -4.393 \times 10^{-5}$

| | Focal Length | | |
|---|---|---|---|
| Variable Separation | 1.00 | 3.39 | 10.00 |
| D5 | 0.22 | 3.17 | 5.14 |
| D10 | 5.22 | 2.03 | 0.29 |
| D15 | 3.89 | 2.73 | 3.89 |
| D20 | 0.77 | 2.16 | 0.77 |

Numerical Example 15:

f = 1–8    Fno = 1:1.65    2ω = 58.1°–7.9°

| | | | |
|---|---|---|---|
| R1 = 12.184 | D1 = 0.296 | N1 = 1.84666 | v1 = 23.8 |
| R2 = 5.537 | D2 = 1.277 | N2 = 1.60311 | v2 = 60.7 |
| R3 = −19.188 | D3 = 0.037 | | |
| R4 = 4.609 | D4 = 0.629 | N3 = 1.69680 | v3 = 55.5 |
| R5 = 12.642 | D5 = Variable | | |
| R6 = 13.075 | D6 = 0.166 | N4 = 1.88300 | v4 = 40.8 |
| R7 = 1.692 | D7 = 0.720 | | |
| R8 = −2.032 | D8 = 0.166 | N5 = 1.69680 | v5 = 55.5 |
| R9 = 2.173 | D9 = 0.444 | N6 = 1.84666 | v6 = 23.8 |
| R10 = −15.701 | D10 = Variable | | |
| R11 = −274.990 | D11 = 0.129 | N7 = 1.60311 | v7 = 60.7 |
| R12 = 2.469 | D12 = 0.740 | | |
| R13 = (Stop) | D13 = 0.277 | | |
| R14 = 5.816 | D14 = 0.648 | N8 = 1.60342 | v8 = 38.0 |
| R15 = −6.169 | D15 = Variable | | |
| R16 = 12.953 | D16 = 0.629 | N9 = 1.51633 | v9 = 64.2 |
| R17 = −6.978 | D17 = 0.027 | | |
| R18 = 5.893 | D18 = 0.166 | N10 = 1.84666 | v10 = 23.8 |
| R19 = 2.746 | D19 = 1.111 | N11 = 1.48749 | v11 = 70.2 |
| R20 = −7.051 | D20 = Variable | | |
| R21 = 3.844 | D21 = 0.407 | N12 = 1.48749 | v12 = 70.2 |
| R22 = 6.512 | D22 = 0.740 | | |
| R23 = ∞ | D23 = 0.493 | N13 = 1.51633 | v13 = 64.2 |
| R24 = ∞ | D24 = 3.703 | N14 = 1.60342 | v14 = 38.0 |
| R25 = ∞ | | | |

Aspheric Coefficients: Surface R14    $K = -3.954 \times 10^{-1}$
$A = 1.510 \times 10^{-4}$
$B = 1.041 \times 10^{-4}$
$C = 2.429 \times 10^{-4}$
$D = 1.345 \times 10^{-4}$

| | Focal Length | | |
|---|---|---|---|
| Variable Separation | 1.00 | 3.08 | 8.00 |
| D5 | 0.22 | 2.28 | 3.65 |
| D10 | 3.70 | 1.41 | 0.26 |
| D15 | 3.71 | 2.85 | 3.71 |
| D20 | 0.74 | 1.83 | 0.74 |

Numerical Example 16:

f = 1–8    Fno = 1:1.65    2ω = 58.1°–7.9°

| | | | |
|---|---|---|---|
| R1 = 10.019 | D1 = 0.277 | N1 = 1.80518 | v1 = 25.4 |
| R2 = 4.876 | D2 = 1.259 | N2 = 1.60311 | v2 = 60.7 |
| R3 = −39.080 | D3 = 0.037 | | |
| R4 = 4.790 | D4 = 0.703 | N3 = 1.69680 | v3 = 55.5 |
| R5 = 15.516 | D5 = Variable | | |
| R6 = 12.553 | D6 = 0.166 | N4 = 1.88300 | v4 = 40.8 |
| R7 = 1.538 | D7 = 0.635 | | |
| R8 = −2.510 | D8 = 0.129 | N5 = 1.69680 | v5 = 55.5 |
| R9 = 2.733 | D9 = 0.185 | | |
| R10 = 3.114 | D10 = 0.370 | N6 = 1.84666 | v6 = 23.8 |
| R11 = −25.032 | D11 = Variable | | |
| R12 = 43.470 | D12 = 0.129 | N7 = 1.60311 | v7 = 60.7 |
| R13 = 2.717 | D13 = 0.740 | | |
| R14 = (Stop) | D14 = 0.277 | | |
| R15 = 5.891 | D15 = 0.648 | N8 = 1.60342 | v8 = 38.0 |
| R16 = −5.939 | D16 = Variable | | |
| R17 = 10.288 | D17 = 0.629 | N9 = 1.51633 | v9 = 64.2 |
| R18 = −6.932 | D18 = 0.027 | | |
| R19 = 7.417 | D19 = 0.166 | N10 = 1.80518 | v10 = 25.4 |
| R20 = 2.617 | D20 = 1.111 | N11 = 1.48749 | v11 = 70.2 |
| R21 = −6.833 | D21 = Variable | | |
| R22 = 3.163 | D22 = 0.370 | N12 = 1.58313 | v12 = 59.4 |
| R23 = 4.993 | D23 = 0.740 | | |
| R24 = ∞ | D24 = 0.463 | N13 = 1.51633 | v13 = 64.2 |
| R25 = ∞ | D25 = 3.703 | N14 = 1.60342 | v14 = 38.0 |
| R26 = ∞ | | | |

Aspheric Coefficients: Surface R15    $K = -2.530 \times 10^{-1}$
$A = -1.968 \times 10^{-4}$
$B = 1.898 \times 10^{-4}$
$C = 1.111 \times 10^{-4}$
$D = -9.399 \times 10^{-5}$ Aspheric Coefficients: Surface R22    $K = 1.392 \times 10^{-1}$
$A = -3.106 \times 10^{-5}$
$B = -3.892 \times 10^{-4}$
$C = 1.106 \times 10^{-4}$

| | Focal Length | | |
|---|---|---|---|
| Variable Separation | 1.00 | 3.05 | 8.00 |
| D5 | 0.19 | 2.26 | 3.63 |
| D11 | 3.70 | 1.41 | 0.26 |
| D16 | 3.55 | 2.62 | 3.55 |
| D21 | 0.74 | 1.89 | 0.74 |

Numerical Example 17:

f = 1–12.65   Fno = 1:1.7–2.4   2ω = 64.0°–5.7°

| | | | |
|---|---|---|---|
| R1 = 21.532 | D1 = 0.312 | N1 = 1.84666 | ν1 = 23.8 |
| R2 = 8.061 | D2 = 0.091 | | |
| R3 = 9.418 | D3 = 0.916 | N2 = 1.69680 | ν2 = 55.5 |
| R4 = –49.597 | D4 = 0.041 | | |
| R5 = 6.245 | D5 = 0.645 | N3 = 1.69680 | ν3 = 55.5 |
| R6 = 31.447 | D6 = Variable | | |
| R7 = 9.270 | D7 = 0.166 | N4 = 1.88300 | ν4 = 40.8 |
| R8 = 1.615 | D8 = 0.713 | | |
| R9 = –2.851 | D9 = 0.145 | N5 = 1.69680 | ν5 = 55.5 |
| R10 = 4.253 | D10 = 0.208 | | |
| R11 = 4.042 | D11 = 0.416 | N6 = 1.84666 | ν6 = 23.8 |
| R12 = –15.249 | D12 = Variable | | |
| R13 = (Stop) | D13 = 0.937 | | |
| R14 = 5.515 | D14 = 1.000 | N7 = 1.60342 | ν7 = 38.0 |
| R15 = –5.139 | D15 = 0.187 | N8 = 1.88300 | ν8 = 40.8 |
| R16 = –70.309 | D16 = Variable | | |
| R17 = 14.435 | D17 = 0.479 | N9 = 1.51633 | ν9 = 64.2 |
| R18 = –6.403 | D18 = 0.031 | | |
| R19 = 6.120 | D19 = 0.187 | N10 = 1.80518 | ν10 = 25.4 |
| R20 = 2.617 | D20 = 0.937 | N11 = 1.48749 | ν11 = 70.2 |
| R21 = –6.615 | D21 = Variable | | |
| R22 = 3.194 | D22 = 0.416 | N12 = 1.48749 | ν12 = 70.2 |
| R23 = 4.564 | D23 = 0.833 | | |
| R24 = ∞ | D24 = 0.520 | N13 = 1.51633 | ν13 = 64.2 |
| R25 = ∞ | D25 = 3.125 | N14 = 1.60342 | ν14 = 38.0 |
| R26 = ∞ | | | |

Aspheric Coefficients: Surface R14
$K = -1.049 \times 10^{-0}$
$A = -2.648 \times 10^{-3}$
$B = 5.360 \times 10^{-4}$
$C = -3.779 \times 10^{-4}$
$D = 4.930 \times 10^{-5}$

| | Focal Length | | |
|---|---|---|---|
| Variable Separation | 1.00 | 3.98 | 12.65 |
| D6 | 0.17 | 3.65 | 5.97 |
| D12 | 6.11 | 1.88 | 0.31 |
| D16 | 2.75 | 1.71 | 2.75 |
| D21 | 0.21 | 1.99 | 0.21 |

| | Numerical Example | | | |
|---|---|---|---|---|
| Condition | 14 | 15 | 16 | 17 |
| (11) F3/F4 | 12.323 | 18.157 | 4.111 | 2.749 |
| (12) Fw/F2 | –0.578 | –0.720 | –0.720 | –0.656 |
| (13) F4/F5 | 0.401 | 0.290 | 0.414 | 0.261 |
| (14) Bfw/Fw | 4.273 | 4.094 | 3.730 | 3.563 |
| (15) F1/Fw | 8.860 | 8.588 | 6.520 | 6.502 |

According to the invention, by setting forth the rules of design as described above, it is made possible to realize a zoom lens of the rear focus type having a long back focal distance, which, while being minimized in the bulk and size of the entire lens system, has as wide an image angle as 60 degrees in the wide-angle end and a high zoom ratio with maintenance of good optical performance throughout the entire zooming range and throughout the entire focusing range.

What is claimed is:

1. A zoom lens of the rear focus type comprising, from front to rear, a first lens unit of positive refractive power, a second lens unit of negative refractive power, a third lens unit of positive refractive power and a fourth lens unit of positive refractive power, said second lens unit and said fourth lens unit being moved to effect zooming, and said fourth lens unit being moved to effect focusing, wherein letting the focal length of the i-th lens unit be denoted by Fi, the following condition is satisfied:

$$3.5 < F3/F4$$

2. A zoom lens of the rear focus type according to claim 1, wherein said second lens unit comprises, from front to rear, a negative first lens whose rear surface is concave and has a stronger refracting power than that of the front surface thereof, an air space, a negative second lens of bi-concave form, an air space and a positive third lens whose front surface is convex and has a stronger refracting power than that of the rear surface thereof.

3. A zoom lens of the rear focus type according to claim 1, wherein, from front to rear, said first lens unit comprises a negative first lens, a positive second lens and a positive third lens, said second lens unit comprises a negative first lens, a negative second lens and a positive third lens, said third lens unit comprises a positive first lens and a negative second lens, or a negative first lens and a positive second lens, and said fourth lens unit comprises a positive first lens, a negative second lens and a positive third lens, or a positive first lens, a negative second lens, a positive third lens and a positive fourth lens.

4. A zoom lens of the rear focus type according to claim 2, further including a stop arranged on the object side of said third lens unit.

5. A zoom lens of the rear focus type according to claim 4, further satisfying the following conditions:

$$3 < Bfw/Fw < 5$$

$$-0.8 < Fw/F2 < -0.4$$

$$5 < F1/Fw < 12$$

where Fw is the shortest focal length of the entire lens system and Bfw is the back focal distance in the wide-angle end.

6. A zoom lens of the rear focus type according to claim 1, wherein said first lens unit and said third lens unit always remain stationary.

* * * * *

UNITED STATES PATENT AND TRADEMARK OFFICE
CERTIFICATE OF CORRECTION

PATENT NO. : 5,530,592
DATED : June 25, 1996
INVENTOR(S) : NOBUYUKI TOCHIGI

It is certified that error appears in the above-indentified patent and that said Letters Patent is hereby corrected as shown below:

COLUMN 4:

Line 9, "invent ion." should read --invention.--.

COLUMN 6:

Line 10, "particular" should read --a particular--.

COLUMN 16:

Line 16, "el" should read --e1--.
Line 45, "el" should read --e1--.

UNITED STATES PATENT AND TRADEMARK OFFICE
CERTIFICATE OF CORRECTION

PATENT NO. : 5,530,592
DATED : June 25, 1996
INVENTOR(S) : NOBUYUKI TOCHIGI

It is certified that error appears in the above-indentified patent and that said Letters Patent is hereby corrected as shown below:

COLUMN 22:

Line 31, "invent ion" should read --invention--.

COLUMN 23:

Line 15, "in a" should read --in--.

Signed and Sealed this

Fifteenth Day of October, 1996

Attest:

BRUCE LEHMAN

Attesting Officer

Commissioner of Patents and Trademarks